US012361223B2

(12) United States Patent
Galitsky

(10) Patent No.: US 12,361,223 B2
(45) Date of Patent: *Jul. 15, 2025

(54) CHATBOT PROVIDING A DEFEATING REPLY

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 18/456,138

(22) Filed: Aug. 25, 2023

(65) Prior Publication Data

US 2023/0401388 A1 Dec. 14, 2023

Related U.S. Application Data

(63) Continuation of application No. 17/112,081, filed on Dec. 4, 2020, now Pat. No. 11,775,772.

(60) Provisional application No. 62/944,227, filed on Dec. 5, 2019.

(51) Int. Cl.
*G06F 40/35* (2020.01)
*G06F 40/253* (2020.01)
*G06F 40/279* (2020.01)
*H04L 51/02* (2022.01)
*G06F 40/211* (2020.01)

(52) U.S. Cl.
CPC ............ *G06F 40/35* (2020.01); *G06F 40/253* (2020.01); *G06F 40/279* (2020.01); *H04L 51/02* (2013.01); *G06F 40/211* (2020.01)

(58) Field of Classification Search
CPC ....... G06F 40/35; G06F 40/253; G06F 40/279
See application file for complete search history.

(56) References Cited

U.S. PATENT DOCUMENTS

| 5,495,605 A | 2/1996 | Cadot |
| 6,112,168 A | 8/2000 | Corston et al. |
| 6,181,909 B1 | 1/2001 | Burstein et al. |

(Continued)

FOREIGN PATENT DOCUMENTS

WO 2020214011 10/2020

OTHER PUBLICATIONS

Adamic et al., "Knowledge Sharing and Yahoo Answers: Everyone Knows Something", WWW 2008 / Refereed Track: Social Networks & Web 2.0—Analysis of Social Networks & Online Interaction, Apr. 2008, pp. 665-674.

(Continued)

*Primary Examiner* — Bryan S Blankenagel
(74) *Attorney, Agent, or Firm* — Kilpatrick Townsend & Stockton LLP

(57) ABSTRACT

Techniques are disclosed for generating defeating textual replies. A computer-implemented method generates a first communicative discourse tree from an utterance and as second communicative discourse tree from a candidate answer derived from a search of keywords in the utterance. The method translates the first communicative discourse tree into a first logical formula from and the second communicative discourse tree into a second logical formula. The method determines that the first logical formula is a negation of the second logical formula. The method further provides the candidate answer to a user device responsive to the determining.

20 Claims, 24 Drawing Sheets

(56) References Cited

U.S. PATENT DOCUMENTS

| | | |
|---|---|---|
| 6,731,307 B1 | 5/2004 | Strubbe et al. |
| 7,152,031 B1 | 12/2006 | Jensen et al. |
| 7,519,529 B1 | 4/2009 | Horvitz |
| 7,840,556 B1 | 11/2010 | Dayal et al. |
| 9,037,464 B1 | 5/2015 | Mikolov et al. |
| 9,292,490 B2 | 3/2016 | Kimelfeld et al. |
| 9,390,706 B2 | 7/2016 | Gustafson et al. |
| 9,559,993 B2 | 1/2017 | Palakovich et al. |
| 9,582,501 B1 | 2/2017 | Salmon et al. |
| 10,019,716 B1 | 7/2018 | Ainslie et al. |
| 10,052,769 B2 | 8/2018 | Houssin et al. |
| 10,079,029 B2 | 9/2018 | Amini et al. |
| 10,599,885 B2 | 3/2020 | Galitsky |
| 10,679,011 B2 | 6/2020 | Galitsky |
| 10,796,102 B2 | 10/2020 | Galitsky |
| 11,449,682 B2 | 9/2022 | Galitsky |
| 11,775,772 B2 | 10/2023 | Galitsky |
| 2001/0007987 A1 | 7/2001 | Igata |
| 2002/0040292 A1 | 4/2002 | Marcu |
| 2002/0046018 A1 | 4/2002 | Marcu et al. |
| 2003/0138758 A1 | 7/2003 | Burstein et al. |
| 2004/0044519 A1 | 3/2004 | Polanyi et al. |
| 2004/0148170 A1 | 7/2004 | Acero et al. |
| 2005/0086592 A1 | 4/2005 | Polanyi et al. |
| 2007/0073533 A1 | 3/2007 | Thione et al. |
| 2007/0136284 A1 | 6/2007 | Cobb et al. |
| 2007/0192306 A1 | 8/2007 | Papakonstantinou et al. |
| 2007/0294229 A1 | 12/2007 | Au |
| 2008/0096533 A1 | 4/2008 | Manfredi et al. |
| 2008/0228467 A1 | 9/2008 | Womack et al. |
| 2009/0100053 A1 | 4/2009 | Boschee et al. |
| 2009/0248399 A1 | 10/2009 | Au |
| 2010/0169309 A1 | 7/2010 | Barrett et al. |
| 2010/0169359 A1 | 7/2010 | Barrett et al. |
| 2011/0119049 A1 | 5/2011 | Ylonen |
| 2011/0153673 A1 | 6/2011 | Boschee et al. |
| 2011/0161937 A1 | 6/2011 | Bounimova et al. |
| 2013/0046757 A1 | 2/2013 | Salvetti et al. |
| 2013/0204611 A1 | 8/2013 | Tsuchida et al. |
| 2014/0040288 A1 | 2/2014 | Galitsky |
| 2014/0122083 A1 | 5/2014 | Xiaojiang |
| 2014/0136188 A1 | 5/2014 | Wroczynski et al. |
| 2015/0039295 A1 | 2/2015 | Soschen |
| 2015/0046492 A1 | 2/2015 | Balachandran |
| 2015/0149461 A1 | 5/2015 | Aguilar Lemarroy et al. |
| 2015/0161512 A1 | 6/2015 | Byron et al. |
| 2016/0034457 A1 | 2/2016 | Bradley et al. |
| 2016/0055240 A1 | 2/2016 | Tur et al. |
| 2016/0085743 A1 | 3/2016 | Haley |
| 2016/0086601 A1 | 3/2016 | Chotimongkol et al. |
| 2016/0232152 A1 | 8/2016 | Mahamood |
| 2016/0245779 A1 | 8/2016 | Khalaj Amineh et al. |
| 2016/0246779 A1 | 8/2016 | Ho et al. |
| 2016/0247068 A1 | 8/2016 | Lin |
| 2017/0032053 A1 | 2/2017 | LeTourneau |
| 2017/0060831 A1 | 3/2017 | Smythe |
| 2017/0116982 A1 | 4/2017 | Gelfenbeyn et al. |
| 2017/0228368 A1 | 8/2017 | Carter et al. |
| 2017/0286390 A1 | 10/2017 | Yashpe et al. |
| 2018/0181648 A1 | 6/2018 | Chen |
| 2018/0189385 A1 | 7/2018 | Sun et al. |
| 2018/0314689 A1 | 11/2018 | Wang et al. |
| 2018/0329879 A1 | 11/2018 | Galitsky |
| 2018/0357220 A1 | 12/2018 | Galitsky |
| 2018/0365228 A1 | 12/2018 | Galitsky |
| 2019/0005027 A1 | 1/2019 | He et al. |
| 2019/0057157 A1 | 2/2019 | Mandal et al. |
| 2019/0103111 A1 | 4/2019 | Tiwari et al. |
| 2019/0172454 A1 | 6/2019 | Kitajima et al. |
| 2019/0236140 A1 | 8/2019 | Canim |
| 2019/0251965 A1 | 8/2019 | Dharne |
| 2020/0111012 A1 | 4/2020 | Wan |

OTHER PUBLICATIONS

Amgoud et al., "Representing and Reasoning about Arguments Mined from Texts and Dialogues", 13th European Conference, ECSQARU 2015, Jul. 2015, 10 pages.

Apotheloz et al., "The Function of Negation in Argumentation", Journal of Pragmatics, vol. 19, Issue 1, Jan. 1993, pp. 23-38.

Banerjee et al., "WikiWrite: Generating Wikipedia Articles Automatically", IJCAI, Available Online at: https://dl.acm.org/doi/10.5555/3060832.3061004, Jul. 2016, pp. 2740-2746.

Baroni et al., "Cleaneval: a Competition for Cleaning Web Pages", Proceedings of the Sixth International Language Resources and Evaluation (LREC'08), Available Online at: https://www.kilgarriff.co.uk/Publications/2008-BaroniChantreeKilgSharoff-LREC-cleaneval.pdf, May 2008, 6 pages.

Blei et al., "Latent Dirichlet Allocation", Journal of Machine Learning Research 3, Available Online at: https://jmlr.org/papers/volume3/blei03a/blei03a.pdf, 2003, pp. 993-1022.

Bridle, "Training Stochastic Model Recognition Algorithms as Networks can Lead to Maximum Mutual Information Estimation of Parameters", Advances in Neural Information Processing Systems 2, Available Online at: http://papers.neurips.cc/paper/195-training-stochastic-model-recognition-algorithms-as-networks-can-lead-to-maximum-mutual-information-estimation-of-parameters.pdf, Jan. 1989, pp. 211-217.

Cai et al., "Extracting Content Structure for Web Pages based on Visual Representation", vol. 2642 of LNCS, Available Online at https://www.researchgate.net/publication/221239815_Extracting_Content_Structure_for_Web_Pages_Based_on_Visual_Representation, Apr. 2003, pp. 406-417.

Galitsky, "A Tool for Efficient Content Compilation", Proceedings of COLING 2016, the 26th International Conference on Computational Linguistics: System Demonstrations, Available Online at: https://www.aclweb.org/anthology/C16-2042.pdf, Dec. 11-17, 2016, pp. 198-202.

Galitsky et al., "A Web Mining Tool for Assistance with Creative Writing", Conference: Proceedings of the 35th European conference on Advances in Information Retrieval, Mar. 2013, pp. 828-831.

Galitsky et al., "Analyzing Conflicts with Concept-Based Learning", F. Dau, M.-L. Mugnier, G. Stumme (Eds.): ICCS 2005, LNAI 3596, 2005, pp. 307-322.

Galitsky et al., "Chatbot with a Discourse Structure-Driven Dialogue Management", Proceedings of the EACL 2017 Software Demonstrations, Apr. 3-7, 2017, pp. 87-90.

Galitsky et al., "Concept-Based Learning of Human Behavior for Customer Relationship Management", Special Issue on Information Engineering Applications Based on Lattices. Information Sciences, vol. 181, Issue 10, May 15, 2011, pp. 2016-2035.

Galitsky, "Finding a Lattice of Needles in a Haystack: Forming a Query from a Set of Items of Interest", FCA4AI@IJCAI, Available Online at: https://www.researchgate.net/publication/283487911_Finding_a_lattice_of_needles_in_a_haystack_Forming_a_query_from_a_set_of_items_of_interest, Jan. 2015, 9 pages.

Galitsky et al., "Inferring the Semantic Properties of Sentences by Mining Syntactic Parse Trees", Data & Knowledge Engineering, vols. 81-82, Nov.-Dec. 2012, pp. 21-45.

Galitsky, "Learning Parse Structure of Paragraphs and Its Applications in Search", Engineering Applications of Artificial Intelligence, vol. 32, Jun. 2014, pp. 160-184.

Galitsky, "Machine Learning of Syntactic Parse Trees for Search and Classification of Text", Engineering Application of AI, vol. 26, Issue 3, Mar. 2013, pp. 1072-1091.

Galitsky, "Matching Parse Thickets for Open Domain Question Answering", Data & Knowledge Engineering, vol. 107, Jan. 2017, pp. 24-50.

Galitsky et al., "Parse Thicket Representations for Answering Multi-Sentence Questions", 20th International Conference on Conceptual Structures, ICCS, 2013.

Galitsky, "Transfer Learning of Syntactic Structures for Building Taxonomies for Search Engines", Engineering Applications of Artificial Intelligence, vol. 26, Issue 10, Nov. 2013, pp. 2504-2515.

(56) References Cited

OTHER PUBLICATIONS

Galitsky et al., "Using Generalization of Syntactic Parse Trees for Taxonomy Capture on the Web", ICCS, Available Online at: https://rd.springer.com/chapter/10.1007/978-3-642-22688-5_8, Jul. 2011, pp. 104-117.
Garcia et al., "Defeasible Logic Programming: An Argumentative Approach Alejandro Javier Garcia, Guillermo Ricardo Simari", Theory and Practice of Logic Programming, vol. 4, No. 2, Jan. 2004, pp. 95-138.
Gomez et al., "CICBUAPnlp: Graph-Based Approach for Answer Selection in Community Question Answering Task", Proceedings of the 9th International Workshop on Semantic Evaluation (SemEval 2015), Jun. 4-5, 2015, pp. 18-22.
Gomez et al., "Reasoning With Inconsistent Ontologies Through Argumentation", Applied Artificial Intelligence. vol. 24, Issue 1 and 2, Feb. 2010, pp. 102-148.
Hendrikx et al., "Procedural Content Generation for Games: A Survey", ACM Transactions on Multimedia Computing, Communications, and Applications, vol. 9, Issue 1, Article 1, Feb. 2013, 22 pages.
Johnson, "Procedural Generation of Linguistics, Dialects, Naming Conventions and Spoken Sentences", Proceedings of 1st International Joint Conference of DiGRA and FDG, 2016.
Karapalidis, "Neural Storytelling: How AI is Attempting Content Creation", Available Online at: https://www.thedrum.com/opinion/2019/01/22/neural-storytelling-how-ai-attempting-content-creation, 2019, 9 pages.
Kipper et al., "A Large-Scale Classification of English Verbs", Language Resources and Evaluation, vol. 42, Issue 1, 2008, pp. 21-40.
Liapis et al., "Sentient Sketchbook: Computer-aided Game Level Authoring", In Proceedings of ACM Conference on Foundations of Digital Games, 2013, pp. 213-220.
Magnolini et al., "FBK-HLT: A New Framework for Semantic Textual Similarity", Proceedings of the 9th International Workshop on Semantic Evaluation (SemEval 2015), Association for Computational Linguistics, Jun. 4-5, 2015, pp. 102-106.
Makhalova et al., "Information Retrieval Chatbots Based on Conceptual Models", Available Online at: https://www.hse.ru/data/2020/03/25/1567345492/%D0%A1%D1%82%D0%B0%D1%82%D1%80%D1%8F_chatbots.pdf, 2019, pp. 230-238.
Makhalova et al., "News Clustering Approach Based on Discourse Text Structure", Proceedings of the First Workshop on Computing News Storylines, Association for Computational Linguistics and The Asian Federation of Natural Language Processing, Jul. 2015, pp. 16-20.
Malmi et al., "Automatic Prediction of Discourse Connectives", Available Online at: https://arxiv.org/pdf/1702.00992.pdf, Proceedings of LREC, Feb. 1, 2018, 6 pages.
Muller et al., "Constrained Decoding for Text-Level Discourse Parsing", Proceedings of COLING 2012, Available Online at: https://www.aclweb.org/anthology/C12-1115.pdf, Dec. 2012, pp. 1883-1900.
Pasternack et al., "Extracting Article Text from the Web with Maximum Subsequence Segmentation", WWW 2009, Proceedings of the 18th International Conference on World Wide Web, 2009, pp. 971-980.
Prasad et al., "The Penn Discourse TreeBank 2.0.", Proceedings of the Sixth International Conference on Language Resources and Evaluation (LREC'08), May 2008, pp. 2961-2968.
Rahwan et al., "An Argumentation-based Approach for Practical Reasoning", In International Joint Conference on Autonomous Agents and Multi Agent Systems, May 2006, pp. 347-354.
Sauper et al., "Automatically Generating Wikipedia Articles: A Structure-Aware Approach", Proceedings of the Joint Conference of the 47th Annual Meeting of the ACL and the 4th International Joint Conference on Natural Language Processing of the AFNLP, Aug. 2009, pp. 208-216.
Sidorov, "Should Syntactic N-grams Contain Names of Syntactic Relations?", International Journal of Computational Linguistics and Applications, vol. 5, No. 1, 2014, pp. 139-158.
Sidorov, "Syntactic Dependency Based N-grams in Rule Based Automatic English as Second Language Grammar Correction", International Journal of Computational Linguistics and Applications, vol. 4, No. 2, 2013, pp. 169-188.
2009 Annual Study: Global Cost of a Data Breach, Ponemon Institute, LLC, PGP, Apr. 2010, 36 pages.
Data Loss Prevention, Trend Micro, Available online at: http://www.trendmicro.co.in/cloud-content/us/pdfs/business/datasheets/ds_data-loss-prevention.pdf, 2010, 2 pages.
Data Loss Prevention & Protection, Symantec, Available online at: http://www.symantec.com/business/theme.jsp?themeid=vontu, Accessed from Internet on Aug. 30, 2018, 6 pages.
Exploring Dialog Management for Bots, Chatbots Magazine, Available online at: https://chatbotsmagazine.com/exploring-dialog-management-for-bots-cbb8665a2fd3, Jul. 11, 2016, 7 pages.
Global Security Report 2010, Trustwave, Available online at: https://www.trustwave.com/Resources/Library/Documents/2010-Trustwave-Global-Security-Report/, 2010, 49 pages.
Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, pp. 1-8.
Malaysia Airlines Flight 17, Wikipedia, Available Online At: https://en.wikipedia.org/wiki/Malaysia_Airlines_Flight_17, 2016, pp. 1-38.
Shadow Chairman of Investigative Committee, Crime Russia, Available online at: https://crimerussia.com/corruption/tenevoy-direktor-skr/, Aug. 25, 2016, 5 pages.
Welcome to Apache Lucene, Apache Lucene 7.5.0 and Apache Solr 7.5.0, Available online at: www.lucene.apache.org, Sep. 24, 2018, 38 pages.
U.S. Appl. No. 15/975,683, Non-Final Office Action, mailed on Mar. 19, 2020, 16 pages.
U.S. Appl. No. 15/975,683, Non-Final Office Action, mailed on Oct. 31, 2019, 27 pages.
U.S. Appl. No. 15/975,683, Notice of Allowance, mailed on Jun. 12, 2020, 17 pages.
U.S. Appl. No. 15/975,685, Non-Final Office Action, mailed on Apr. 1, 2020, 23 pages.
U.S. Appl. No. 15/975,685, Non-Final Office Action, mailed on Nov. 15, 2019, 23 pages.
U.S. Appl. No. 15/975,685, Notice of Allowance, mailed on Jul. 24, 2020, 17 pages.
U.S. Appl. No. 16/010,091, Non-Final Office Action, mailed on Nov. 18, 2019, 26 pages.
U.S. Appl. No. 16/010,091, Notice of Allowance, mailed on Mar. 19, 2020, 13 pages.
U.S. Appl. No. 16/010,141, Final Office Action, mailed on Jul. 30, 2020, 14 pages.
U.S. Appl. No. 16/010,141, Non-Final Office Action, mailed on Feb. 24, 2020, 12 pages.
U.S. Appl. No. 16/010,156, Notice of Allowance, mailed on Feb. 6, 2020, 13 pages.
U.S. Appl. No. 16/010,156, Notice of Allowance, mailed on Nov. 7, 2019, 13 pages.
U.S. Appl. No. 16/145,702, Final Office Action, mailed on May 6, 2020, 19 pages.
U.S. Appl. No. 16/145,702, Non-Final Office Action, mailed on Feb. 5, 2020, 30 pages.
U.S. Appl. No. 16/145,702, Final Office Action, mailed on Sep. 10, 2019, 25 pages.
U.S. Appl. No. 16/145,702, First Action Interview Office Action Summary, mailed on Apr. 29, 2019, 8 pages.
U.S. Appl. No. 16/145,702, First Action Interview Pilot Program Pre-Interview Communication, mailed on Feb. 7, 2019, 6 pages.
U.S. Appl. No. 16/145,702, Notice of Allowance, mailed on Jul. 1, 2020, 15 pages.
U.S. Appl. No. 16/145,777, Non-Final Office Action, mailed on Apr. 3, 2020, 18 pages.
U.S. Appl. No. 16/145,777, Notice of Allowance, mailed on Jul. 15, 2020, 17 pages.

(56) References Cited

OTHER PUBLICATIONS

U.S. Appl. No. 16/260,930, Non-Final Office Action, mailed on Aug. 12, 2020, 9 pages.
U.S. Appl. No. 16/260,939, Non-Final Office Action, mailed on May 1, 2020, 10 pages.
U.S. Appl. No. 16/260,939, Notice of Allowance, mailed on Jun. 12, 2020, 14 pages.
Airenti et al., Conversation and Behavior Games in the Pragmatics of Dialogue, Cognitive Science, vol. 17, No. 2, Apr.-Jun. 1993, pp. 197-256.
Allen et al., Analyzing Intention in Utterances, Artificial Intelligence, vol. 15, No. 3, Dec. 1980, pp. 143-178.
Bengio et al., A Neural Probabilistic Language Model, Journal of Machine Learning Research, vol. 3, Feb. 3, 2003, pp. 1137-1155.
Blaylock, Managing Communicative Intentions in Dialogue Using a Collaborative Problem-Solving Model, The University of Rochester, Computer Science Department, Technical Report 774, Apr. 2002, 56 pages.
Blaylock et al., Managing Communicative Intentions with Collaborative Problem Solving, Current and New Directions in Discourse and Dialogue, Chapter—4, 2003, pp. 63-84.
Boyer et al., MJRTY—A Fast Majority Vote Algorithm, Chapter 5, Automated Reasoning, 1991, pp. 105-117.
Traum, Rhetorical Relations, Action and Intentionality in Conversation, Proceedings ACL SIG Workshop on Intentionality and Structure in Discourse Relations, Jun. 1993, pp. 132-135.
Carlson et al., Discourse Tagging Reference Manual, Available online at: https://www.isi.edu/~marcu/discourse/tagging-ref-manual.pdf, Sep. 11, 2001, 87 pages.
Chali et al., Complex Question Answering: Unsupervised Learning Approaches and Experiments, Journal of Artificial Intelligence Research, vol. 35, May 2009, pp. 1-47.
Chen, Understanding Mental States in Natural Language, Proceedings of the 8th International Conference on Computational Semantics, Jan. 2009, pp. 61-72.
Cohen, Enron Email Dataset, Available online at: https://www.cs.cmu.edu/~enron/, Jul. 10, 2016, 1 page.
Cohen et al., Intention is Choice with Commitment, Artificial Intelligence, vol. 42, Nos. 2-3, Mar. 1990, pp. 213-261.
Collins et al., New Ranking Algorithms for Parsing and Tagging: Kernels Over Discrete Structures, and The Voted Perceptron, Proceedings of the 40th Annual Meeting of the Association for Computational Linguistics (ACL), Jul. 2002, pp. 263-270.
Cristea et al., Veins Theory: A Model of Global Discourse Cohesion and Coherence, In C. Boitet & P. Whitelock (Eds.), 17th International Conference on Computational Linguistics, 1998, pp. 281-285.
Croft et al., Search Engines-Information Retrieval in Practice, Pearson Education, 2010, 542 pages.
De Boni, Using Logical Relevance for Question Answering, Journal of Applied Logic, vol. 5, No. 1, 2007, pp. 92-103.
De Mori et al., Spoken Language Understanding, Institute of Electrical and Electronics Engineers Signal Processing Magazine, vol. 25, No. 3, May 2008, pp. 50-58.
Dijkstra, Programming Considered as a Human Activity, Proc. IFIP Congress, 1965, 7 pages.
Ebrahim, NLP Tutorial Using Python NLTK (Simple Examples), Dzone, Available online at: https://dzone.com/articles/nlp-tutorial-using-python-nltk-simple-examples, Sep. 24, 2017, pp. 1-10.
Endres-Niggemeyer et al., Summarizing Text for Intelligent Communication, Dagstuhl Seminar Report 79, 1995, 36 pages.
Feng et al., A Linear-Time Bottom-Up Discourse Parser with Constraints and Post-Editing, Proceedings of the 52nd Annual Meeting of the Association for Computational Linguistics, Jun. 23-25, 2014, pp. 511-521.
Feng et al., Classifying Arguments by Scheme, Proceedings of the 49th Annual Meeting of the Association for Computational Linguistics, vol. 1, Jun. 19-24, 2011, pp. 987-996.
Feng et al., Distributional Footprints of Deceptive Product Reviews, Proceedings of the Sixth International Association for the Advancement of Artificial Intelligence Conference on Weblogs and Social Media, The Association for the Advancement of Artificial Intelligence Press, Jan. 2012, pp. 98-105.
Feng, RST-Style Discourse Parsing and Its Applications in Discourse Analysis, University of Toronto, Jun. 2015, 189 pages.
Feng et al., Syntactic Stylometry for Deception Detection, In Association for Computational Linguistics 12, Proceedings of the 50th Annual Meeting of the Association for Computational Linguistics, Jul. 8-14, 2012, pp. 171-175.
Ferraiolo et al., Role-Based Access Controls, Proceedings of the 15th NIST-NSA National Computer Security Conference, Oct. 13-16, 1992, pp. 554-563.
Finn, A Question Writing Algorithm, Journal of Reading Behavior, VII, vol. 4, 1975, pp. 341-367.
Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Galitsky et al., A Novel Approach for Classifying Customer Complaints Through Graphs Similarities in Argumentative Dialogues, Decision Support Systems, vol. 46, No. 3, Feb. 2009, pp. 717-729.
International Application No. PCT/US2019/015696, International Preliminary Report on Patentability, mailed on Aug. 13, 2020, 8 pages.
Galitsky, Discovering Rhetorical Agreement between a Request and Response, Dialogue & Discourse, vol. 8, No. 2, Dec. 1, 2017, pp. 167-205.
Galitsky et al., Finding Maximal Common Sub-Parse Thickets for Multi-Sentence Search, Graph Structures for Knowledge Representation and Reasoning, 2014, 19 pages.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, 2014, pp. 28-35.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Noisy Discourse Trees, Computational Linguistics and Intellectual Technologies, Proceedings of the International Conference Dialogue 2017. Available online at: http://www.dialog-21.ru/media/3911/galitskyb.pdf, May 31-Jun. 3, 2017, 14 pages.
Galitsky et al., Matching Sets of Parse Trees for Answering Multi-Sentence Questions, Proceedings of Recent Advances in Natural Language Processing, Sep. 2013, pp. 285-293.
Galitsky, Natural Language Question Answering System, Technique of Semantic Headers, Advanced Knowledge International, vol. 2, Apr. 2003, 333 pages.
Galitsky et al., On a Chat Bot Finding Answers with Optimal Rhetoric Representation, RANLP—Recent Advances in Natural Language Processing Meet Deep Learning, Nov. 10, 2017, pp. 253-259.
Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.
Galitsky et al., Style and Genre Classification by Means of Deep Textual Parsing, Computational Linguistics and Intellectual Technologies: Proceedings of the International Conference Dialogue 2016, Jun. 2016, pp. 1-45.
Galitsky et al., Text Classification Based on Deep Textual Parsing, Available Online at: http://ceur-ws.org/Vol-1886/paper_8.pdf, 2011, 9 pages.
Galitsky et al., Text Classification into Abstract Classes Based on Discourse Structure, Proceedings of Recent Advances in Natural Language Processing, Sep. 2015, pp. 200-207.
Galitsky et al., Text Integrity Assessment: Sentiment Profile vs Rhetoric Structure, CICLing, Springer International Publishing, Apr. 2015, pp. 126-139.
Galitsky, Using Extended Tree Kernels to Recognize Metalanguage in Text, Studies in Computational Intelligence, Feb. 2017, 26 pages.

(56) References Cited

OTHER PUBLICATIONS

Grefenstette et al., Multi-Step Regression Learning for Compositional Distributional Semantics, Proceedings of the 10th International Conference on Computational Semantics, Mar. 2013, 11 pages.

Grefenstette, Towards a Formal Distributional Semantics: Simulating Logical Calculi with Tensors, University of Oxford, Apr. 2013, 10 pages.

Grosz et al., Attention, Intentions, and the Structure of Discourse, Computational Linguistics, vol. 12, No. 3, Jul.-Sep. 1986, pp. 175-204.

Grosz et al., Discourse Analysis, in Understanding Spoken Language, Elsevier North-Holland, 1978, pp. 234-268.

Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.

Hart et al., Text Classification for Data Loss Prevention, Proceedings of the 11th International Conference on Privacy Enhancing Technologies, Hewlett-Packard Development Company, L.P., Jul. 27-29, 2011, 21 pages.

Haussler, Convolution Kernels on Discrete Structures UCSC-CRL-99-10, University of California, Santa Barbara Technical Report, Jul. 8, 1999, 38 pages.

Hernault et al., A Sequential Model for Discourse Segmentation, International Conference on Intelligent Text Processing and Computational Linguistics, CICLing 2010: Computational Linguistics and Intelligent Text Processing, Mar. 21-27, 2010, pp. 315-326.

Houngbo et al., An Automated Method to Build a Corpus of Rhetorically-Classified Sentences in Biomedical Texts, Proceedings of the First Workshop on Argumentation Mining, Association for Computational Linguistics, Jun. 26, 2014, pp. 19-23.

Iruskieta et al., A Qualitative Comparison Method for Rhetorical Structures: Identifying Different Discourse Structures in Multilingual Corpora, Lang Resources & Evaluation, vol. 49, No. 2, May 8, 2014, 47 pages.

Jansen et al., Discourse Complements Lexical Semantics for Non-Factoid Answer Reranking, Proceedings of the 52nd Annual Meeting of the Association for Computational Linguistics, vol. 1, Jun. 23-25, 2014, pp. 977-986.

John et al., Estimating Continuous Distributions in Bayesian Classifiers, Proceedings of the Eleventh Conference on Uncertainty in Artificial Intelligence, 1995, pp. 338-345.

Johnson et al., The FrameNet Tagset for Frame-Semantic and Syntactic Coding of Predicate-Argument Structure, Proceedings of the First Meeting of the North American Chapter of the Association for Computational Linguistics, Apr. 2000, pp. 56-62.

Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.

Joty et al., CODRA: A Novel Discriminative Framework for Rhetorical Analysis, Computational Linguistics, vol. 41, No. 3, Mar. 18, 2015, pp. 385-435.

Joty et al., Combining Intra- and Multi-Sentential Rhetorical Parsing for Document-Level Discourse Analysis, 51st Annual Meeting of the Association for Computational Linguistics, vol. 1, Aug. 4-9, 2013, pp. 486-496.

Joty et al., Discriminative Reranking of Discourse Parses Using Tree Kernels, Proceedings of the 2014 Conference on Empirical Methods in Natural Language Processing, Oct. 25-29, 2014, pp. 2049-2060.

Jurafsky et al., Speech and Language Processing: An Introduction to Natural Language Processing, Computational Linguistics, and Speech Recognition, Pearson, Prentice Hall, 2000, pp. 719-761.

Kate et al., Learning to Transform Natural to Formal Languages, Conference: Proceedings, The Twentieth National Conference on Artificial Intelligence and the Seventeenth Innovative Applications of Artificial Intelligence Conference, Jul. 2005, pp. 1062-1068.

Kipper et al., A Large-Scale Classification of English Verbs, Language Resources and Evaluation, vol. 42, No. 1, Mar. 2008, pp. 21-40.

Kipper et al., VerbNet Overview, Extensions, Mappings and Applications, Proceedings of Human Language Technologies, Annual Conference of the North American Chapter of the Association for Computational Linguistics, Companion, vol. Tutorial Abstracts, Jun. 2009, pp. 13-14.

Kirschner et al., Linking the Thoughts: Analysis of Argumentation Structures in Scientific Publications, Proceedings of the 2nd Workshop on Argumentation Mining, Jun. 4, 2015, pp. 1-11.

Kohavi, A Study of Cross-Validation and Bootstrap for Accuracy Estimation and Model Selection, IJCAI'95: Proceedings of the 14th international joint conference on Artificial intelligence, vol. 2, Aug. 1995, pp. 1137-1143.

Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.

Kontos et al., Question Answering and Rhetoric Analysis of Biomedical Texts in the Aroma System, National and Kapodistrian University of Athens, Unpublished Manuscript, 2006, 6 pages.

Levinson, Presumptive Meanings: The Theory of Generalized Conversational Implicature, Cambridge, MA: The Massachusetts Institute of Technology Press, 2000, 10 pages.

Li et al., Recursive Deep Models for Discourse Parsing, Conference: Proceedings of the 2014 Conference on Empirical Methods in Natural Language Processing (EMNLP), Jan. 2014, 10 pages.

Lin et al., Recognizing Implicit Discourse Relations in the Penn Discourse Treebank, Conference: Proceedings of the 2009 Conference on Empirical Methods in Natural Language Processing, EMNLP, Aug. 6-7, 2009, pp. 343-351.

Litman et al., A Plan Recognition Model for Subdialogues in Conversations, Cognitive Science, vol. 11, No. 2, Apr. 1987, pp. 163-200.

Makhalova et al., Pattern Structures for News Clustering, Proceedings of the 4th International Conference on What can FCA do for Artificial Intelligence, vol. 1430, Jul. 2015, pp. 35-42.

Mann et al., Discourse Structures for Text Generation, Proceedings of the 10th International Conference on Computational Linguistics and 22nd annual meeting on Association for Computational Linguistics, Jul. 2-6, 1984, pp. 367-375.

Mann et al., Rhetorical Structure Theory and Text Analysis, Discourse Description: Diverse Linguistic Analyses of a Fund-Raising Text, Apr. 8, 1992, pp. 39-78.

Mann et al., Rhetorical Structure Theory: Toward a Functional Theory of Text Organization, Text-Interdisciplinary Journal for the Study of Discourse, vol. 8, No. 3, Jan. 1988, pp. 243-281.

Marcu et al., An Unsupervised Approach to Recognizing Discourse Relations, Proceedings of the 40th Annual Meeting of the Association for Computational Linguistics (ACL), 2002, 8 pages.

Mercier et al., Why Do Humans Reason? Arguments for an Argumentative Theory, Behavioral and Brain Sciences, vol. 34, No. 2, Apr. 2011, pp. 57-111.

Mikolov et al., Distributed Representations of Words and Phrases and Their Compositionality, Advances in Neural Information Processing Systems, vol. 26, Oct. 2013, 9 pages.

Mitchell et al., Composition in Distributional Models of Semantics, Cognitive Science, vol. 34, No. 8, Mar. 25, 2010, pp. 1388-1429.

Mitocariu et al., Comparing Discourse Tree Structures, Computational Linguistics and Intelligent Text Processing: 14th International Conference, vol. 7816, Mar. 24-30, 2013, 11 pages.

Mochales et al., Argumentation Mining, Artificial Intelligence and Law, vol. 19, No. 1, Mar. 2011, pp. 1-22.

Mukherjee et al., Fake Review Detection: Classification and Analysis of Real and Pseudo Reviews, Technical Report, Department of Computer Science, 2013, 11 pages.

Mukherjee et al., What Yelp Fake Review Filter Might Be Doing? Proceedings of the Seventh International Association for the Advancement of Artificial Intelligence Conference on Weblogs and Social Media, Jan. 2013, pp. 409-418.

(56) References Cited

OTHER PUBLICATIONS

Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.

Ott et al., Negative Deceptive Opinion Spam, Proceedings of the Conference of the North American Chapter of the Association for Computational Linguistics, Jun. 9-14, 2013, pp. 497-501.

International Application No. PCT/US2018/031890, International Preliminary Report on Patentability, mailed on Nov. 21, 2019, 9 pages.

International Application No. PCT/US2018/053392, International Preliminary Report on Patentability, mailed on Apr. 9, 2020, 7 pages.

International Application No. PCT/US2018/053392, International Search Report and Written Opinion, mailed on Dec. 17, 2018, 11 pages.

International Application No. PCT/US2019/015696, International Search Report and Written Opinion, mailed on Apr. 23, 2019, 12 pages.

International Application No. PCT/US2019/031580, International Search Report and Written Opinion, mailed on Jul. 5, 2019, 12 pages.

Peldszus et al., From Argument Diagrams to Argumentation Mining in Texts: A Survey, International Journal of Cognitive Informatics and Natural Intelligence, vol. 7, No. 1, Jan. 2013, pp. 1-31.

Pendyala et al., Towards a Truthful World Wide Web from a Humanitarian Perspective, Institute of Electrical and Electronics Engineers 2015 Global Humanitarian Technology Conference, Oct. 8-11, 2015, 7 pages.

Ponti, Machine Learning Techniques Applied to Dependency Parsing, Available online at: https://vision.unipv.it/AI/AIRG/MachineLearningTechniquesAppliedToDependencyParsingRevised.pdf, Oct. 2015, 45 pages.

Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.

Popescu-Belis, Dialogue Acts: One or More Dimensions?, ISSCO Working Paper No. 62, University of Geneva, Nov. 2005, 46 pages.

Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.

Radev et al., Centroid-Based Summarization of Multiple Documents: Sentence Extraction, Utility-Based Evaluation, 60 and User Studies, Proceedings of the NAACL-ANLP Workshop on Automatic Summarization, vol. 4, Dec. 2000, 10 pages.

Rayana et al., Collective Opinion Spam Detection: Bridging Review Networks and Metadata, Proceedings of the 21st Association for Computing Machinery Special Interest Group on Knowledge Discovery and Data Mining International Conference on Knowledge Discovery and Data Mining, Aug. 11-14, 2015, 10 pages.

Recasens et al., The Life and Death of Discourse Entities: Identifying Singleton Mentions, Proceedings of NAACL-HLT, Jun. 9-14, 2013, pp. 627-633.

Reed et al., Language Resources for Studying Argument, Proceedings of the 6th Conference on Language Resources and Evaluation, LREC2008, ELRA, May 2010, pp. 2613-2618.

Reichman, Getting Computers to Talk Like You and Me, Discourse Context, Focus and Semantics (An ATN Model), Massachusetts Institute of Technology Press, Jul. 1985, pp. 35-49.

Salton et al., On the Specification of Term Values in Automatic Indexing, Journal of Documentation, vol. 29, No. 4, Apr. 1973, pp. 351-372.

Salton et al., Term Weighting Approaches in Automatic Text Retrieval, Information Processing & Management, vol. 24, No. 5, Nov. 1987, 22 pages.

Santhosh et al., Discourse Based Advancement on Question Answering System, International Journal on Soft Computing, Artificial Intelligence and Applications (IJSCAI), vol. 1, No. 2, Oct. 2012, 12 pages.

Scholman et al., A Step-Wise Approach to Discourse Annotation: Towards a Reliable Categorization of Coherence 64 Relations, Categories of Coherence Relations in Discourse Annotation, Dialogue & Discourse, vol. 7, No. 2, Feb. 2016, 28 pages.

Searle, Speech Acts: An Essay in the Philosophy of Language, Cambridge University Press, Jan. 1969, pp. 22-53.

Sjoera, The Linguistics Behind Chat Bots, iCapps, Available online at: http://www.icapps.com/the-linguistics-behind-chatbots/, Feb. 22, 2017, 9 pages.

Socher et al., Learning Continuous Phrase Representations and Syntactic Parsing with Recursive Neural Networks, Proceedings of the NIPS Deep Learning and Unsupervised Feature Learning Workshop, Jan. 2010, 9 pages.

Sperber et al., Relevance: Communication and Cognition, Blackwell, Oxford and Harvard University Press, Cambridge, MA, 1986, 331 pages.

Sun et al., Exploiting Product Related Review Features for Fake Review Detection, Mathematical Problems in Engineering, vol. 2016, Article ID 4935792, Jul. 4, 2016, 7 pages.

Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.

Surdeanu et al., Two Practical Rhetorical Structure Theory Parsers, Proceedings of the Conference of the North American Chapter of the Association for Computational Linguistics—Human Language Technologies, Jun. 5, 2015, pp. 1-5.

Tai et al., Improved Semantic Representations from Tree-Structured Long Short-Term Memory Networks, Available Online at: https://arxiv.org/pdf/1503.00075.pdf, May 30, 2015, 11 pages.

Traum et al., Conversation Acts in Task-Oriented Spoken Dialogue, University of Rochester Computer Science, Computational Intelligence, vol. 8, No. 3, Aug. 1992, 31 pages.

Traum et al., Discourse Obligations in Dialogue Processing, Proceedings of the 32nd Annual Meeting on Association for Computational Linguistics, Jun. 27-30, 1994, pp. 1-8.

Trstenjak et al., KNN with TF-IDF Based Framework for Text Categorization, Procedia Engineering, vol. 69, 24th Danube Adria Association for Automation and Manufacturing International Symposium on Intelligent Manufacturing and Automation, 2014, pp. 1356-1364.

Tsui, English Conversation. Describing English Language, Oxford University Press, 1994, 37 pages.

Uliyar, A Primer: Oracle Intelligent Bots, Powered by Artificial Intelligence, White Paper, Sep. 2017, 28 pages.

Van Der Wees et al., Five Shades of Noise: Analyzing Machine Translation Errors in User-Generated Text, Proceedings of the ACL, Workshop on Noisy User-generated Text, Jul. 2015, pp. 28-37.

Vapnik, The Nature of Statistical Learning Theory, Springer Science, 1995, 201 pages.

Walker et al., Quantitative and Qualitative Evaluation of Darpa Communicator Spoken Dialogue Systems, Proceedings of the 39th Annual Meeting of the Association for Computational Linguistics, Jul. 6-11, 2001, pp. 515-522.

Wang et al., Kernel Based Discourse Relation Recognition with Temporal Ordering Information, Proceedings of the 48th Annual Meeting of the Association for Computational Linguistics, Jul. 11-16, 2010, pp. 710-719.

Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.

Wu et al., Enhancing Text Representation for Classification Tasks with Semantic Graph Structures, International Journal of Innovative Computing, Information and Control, vol. 7, No. 5 (B), May 2011, pp. 2689-2698.

Wuchner et al., Data Loss Prevention Based on Data-Driven Usage Control, Proceedings of the Institute of Electrical and Electronics

(56) References Cited

OTHER PUBLICATIONS

Engineers 23rd International Symposium on Software Reliability Engineering, Nov. 27-30, 2012, pp. 151-160.

Yao et al., Online Deception Detection Refueled by Real World Data Collection, Proceedings of Recent Advances in Natural Language Processing, Jul. 28, 2017, 10 pages.

Yessenalina et al., Compositional Matrix-Space Models for Sentiment Analysis, Proceedings of the 2011 Conference on Empirical Methods in Natural Language Processing, Jul. 27-31, 2011, pp. 172-182.

Zanzotto et al., Estimating Linear Models for Compositional Distributional Semantics, Proceedings of the 23rd International Conference on Computational Linguistics (COLING 2010), Aug. 23-27, 2010, pp. 1263-1271.

Zeilenga, Lightweight Directory Access Protocol (LDAP) Read Entry Controls, Standards Track, Network Working Group, IETF, RFC 4527, Jun. 2006, 8 pages.

Zhao et al., Facilitating Discourse Analysis with Interactive Visualization, Institute of Electrical and Electronics Engineers Transactions on Visualization and Computer Graphics, vol. 18, No. 12, Dec. 2012, 10 pages.

U.S. Appl. No. 16/869,013, First Action Interview Office Action Summary mailed on May 24, 2022, 7 pages.

U.S. Appl. No. 16/869,013, First Action Interview Pilot Program Pre-Interview Communication mailed on Mar. 28, 2022, 6 pages.

U.S. Appl. No. 16/869,013, Notice of Allowance, Mailed on Jul. 14, 2022, 10 pages.

Alm et al., Emotions from Text: Machine Learning for Text-Based Emotion Prediction, Proceedings of the Conference on Human Language Technology and Empirical Methods in Natural Language Processing, Oct. 6-8, 2005, pp. 579-586.

Balahur et al., Emotinet: A knowledge Base for Emotion Detection in Text Built on the Appraisal Theories, In International Conference on Application of Natural Language to Information Systems, Jun. 28-30, 2011, pp. 27-39.

Calefato et al., EmoTxt: A Toolkit for Emotion Recognition from Text, arXiv:1708.03892, Available Online at: https://arxiv.org/abs/1708.03892, Jul. 2017, 2 pages.

Denecke et al., Towards Emotion-Sensitive Conversational User Interfaces in Healthcare Applications, Studies in Health Technology and Informatics, Aug. 2019, pp. 1164-1168.

Gupta et al., Emotion Detection in Email Customer Care, Proceedings of the NAACL HLT 2010 Workshop on Computational Approaches to Analysis and Generation of Emotion in Text, Jun. 2010, pp. 10-16.

Jain et al., EMIA: Emotion Model for Intelligent Agent, Journal of Intelligent Systems, vol. 24, No. 4, 2015, pp. 449-465.

Kraus et al., Sentiment Analysis Based on Rhetorical Structure Theory: Learning Deep Neural Networks from Discourse Trees, Expert Systems with Applications, vol. 118, Apr. 2017, pp. 1-36.

Kshirsagar et al., A Multilayer Personality Model, Proceedings of the 2nd International Symposium on Smart Graphics, Jun. 2002, pp. 107-115.

Mairesse et al., Using Linguistic Cues for the Automatic Recognition of Personality in Conversation and Text, Journal of Artificial Intelligence Research, vol. 30, 2007, pp. 457-500.

Socher et al., Recursive Deep Models for Semantic Compositionality Over a Sentiment Treebank, Proceedings of the 2013 Conference on Empirical Methods in Natural Language Processing, Oct. 2013, pp. 1631-1642.

Thornton et al., Mental Models Accurately Predict Emotion Transitions, Proceedings of the National Academy of Sciences, vol. 114, No. 23, Jun. 6, 2017, pp. 5982-5987.

Vu et al., Acquiring a Dictionary of Emotion-Provoking Events, Proceedings of the 14th Conference of the European Chapter of the Association for Computational Linguistics, Apr. 26-30, 2014, pp. 128-132.

Chesñevar et al., "Argumentation in Artificial Intelligence", Empowering Recommendation Technologies Through Argumentation, Jan. 2009, pp. 403-421.

Galitsky et al., "Detecting Logical Argumentation in Text via Communicative Discourse Tree", Journal of Experimental & Theoretical Artificial Intelligence, vol. 30, Issue 5, Sep. 2018, pp. 1-27.

Harris et al., "Sublanguage: Studies of Language in Restricted Semantic Domains", Discourse and Sublanguage, 1982, pp. 231-236.

U.S. Appl. No. 17/112,081, First Action Interview, mailed Aug. 12, 2022, 28 pages.

U.S. Appl. No. 17/112,081, Final Office Action, mailed Nov. 30, 2022, 22 pages.

U.S. Appl. No. 17/112,081, Office Action, mailed Apr. 7, 2023, 11 pages.

U.S. Appl. No. 17/112,081, Notice of Allowance, mailed Jul. 31, 2023, 10 pages.

U.S. Appl. No. 17/112,081, Corrected Notice of Allowability mailed on Aug. 11, 2023, 3 pages.

U.S. Appl. No. 17/112,081, First Action Interview Office Action Summary mailed on Sep. 27, 2022, 23 pages.

300

CHATBOT PROVIDING A DEFEATING REPLY

CROSS-REFERENCES TO RELATED APPLICATIONS

This application is a continuation of U.S. patent application Ser. No. 17/112,081 filed on Dec. 4, 2020, which claims the benefit of U.S. Provisional Application No. 62/944,227 filed Dec. 5, 2019, the contents of both which are incorporated herein for all purposes.

TECHNICAL FIELD

This disclosure is generally concerned with linguistics. More specifically, this disclosure relates to improved autonomous agents that use communicative discourse trees in conjunction with logical analysis to create a reply that defeats an utterance.

BACKGROUND

Computer-implemented applications of linguistics are increasing due to the greatly increased speed of processors and capacity of memory. For example, computer-based analysis of language discourse facilitates numerous applications, such as automated agents that can answer questions received from user devices. But improved autonomous agents that can generate more complete and appropriate responses to user utterances are needed.

BRIEF SUMMARY

Techniques are disclosed for autonomous agents that crate a defeating reply. For instance, the autonomous agent identifies a first claim in a user utterance. The autonomous agent obtains candidate answers that are related to a topic of the user utterance. The autonomous agent identifies, from the candidate answer, a candidate answer that includes text representing a second claim that negates the first claim, thereby defeating the user's claim.

In an aspect, a computer-implemented method involves accessing a user utterance including fragments of text. Each fragment is an elementary discourse unit. The method further involves generating, from the user utterance, a first discourse tree that represents rhetorical relationships between the fragments of text of the user utterance. The discourse tree includes nodes. Each nonterminal node representing a rhetorical relationship between two of the fragments and each terminal node of the nodes of the discourse tree being associated with one of the fragments. The method further involves constructing, from the discourse tree, a first communicative discourse tree by matching each fragment that has a verb in the discourse tree with a predetermined verb signature. The method further involves translating the first communicative discourse tree into a first logical formula. The method further involves identifying topic keywords from the user utterance. The method further involves providing the topic keywords to a search engine. The method further involves obtaining, from the search engine, a candidate answer including fragments of text. The method further involves generating, from the candidate answer, a second discourse tree that represents rhetorical relationships between the fragments of text of the candidate answer. The method further involves constructing, from the second discourse tree, a second communicative discourse tree. The method further involves translating the second communicative discourse tree into a second logical formula. The method further involves determining that the first logical formula is a negation of the second logical formula. The method further involves providing the candidate answer to a user device responsive to the determining.

In a further aspect, the translating of each communicative discourse tree includes identifying, from the respective communicative discourse tree, a rhetorical relation that corresponds to a nucleus elementary discourse unit and a satellite elementary discourse unit. Translating of each communicative discourse tree further involves constructing, from the identified rhetorical relation, a logical formula that has a reason and a conclusion by mapping the nucleus elementary discourse unit to the reason and the satellite elementary discourse unit to the conclusion. Translating of each communicative discourse tree further involves identifying, from the nucleus elementary discourse unit, a first logical atom that corresponds to text of the nucleus elementary discourse unit. Translating of each communicative discourse tree further involves identifying, from the satellite elementary discourse unit, a second logical atom that corresponds to text of the satellite elementary discourse unit. Translating of each communicative discourse tree further involves substituting, in the logical formula, the first logical atom for the reason. Translating of each communicative discourse tree further involves substituting, in the logical formula, the second logical atom for the conclusion.

In an aspect, the logical atom is compatible with logical atomism.

In an aspect, identifying a logical atom includes identifying an entity, an action associated with the entity, and a condition associated with the entity.

In an aspect, the identified rhetorical relation includes one of cause, explanation, condition, or reason.

In an aspect, the identifying a negation includes, iteratively, for a predefined number of iterations performing operations. The operations include creating a theorem by applying a set of argumentation rules to a set of axioms and the second logical formula. The operations further include comparing the theorem to the first logical formula. The operations further include, responsive to determining that the theorem is a negation of the first logical formula, identifying the first logical formula as a negation of the second logical formula.

In an aspect, identifying topic keywords includes identifying, in the user utterance, one or more nouns or entities.

In an aspect, the method of claim 1, further including receiving the user utterance from the user device.

In an aspect, matching each fragment that has a verb in a discourse tree to a predetermined verb signature includes accessing verb signatures. Each verb signature includes the verb of the fragment and a sequence of thematic roles and each thematic roles describes a respective relationship between the verb and related words. The matching includes determining, for each verb signature of the verb signatures, thematic roles of the respective signature that match a role of a word in the fragment. The matching includes selecting a particular verb signature from the verb signatures based on the particular verb signature including a highest number of matches. The matching includes associating the particular verb signature with the fragment In an aspect, the logical formula is an expression of formal logic that includes logical atoms derived from text.

The exemplary methods discussed above can be implemented on systems including one or more processors or stored as instructions on a non-transitory computer-readable medium.

DETAILED DESCRIPTION

Figure 1:
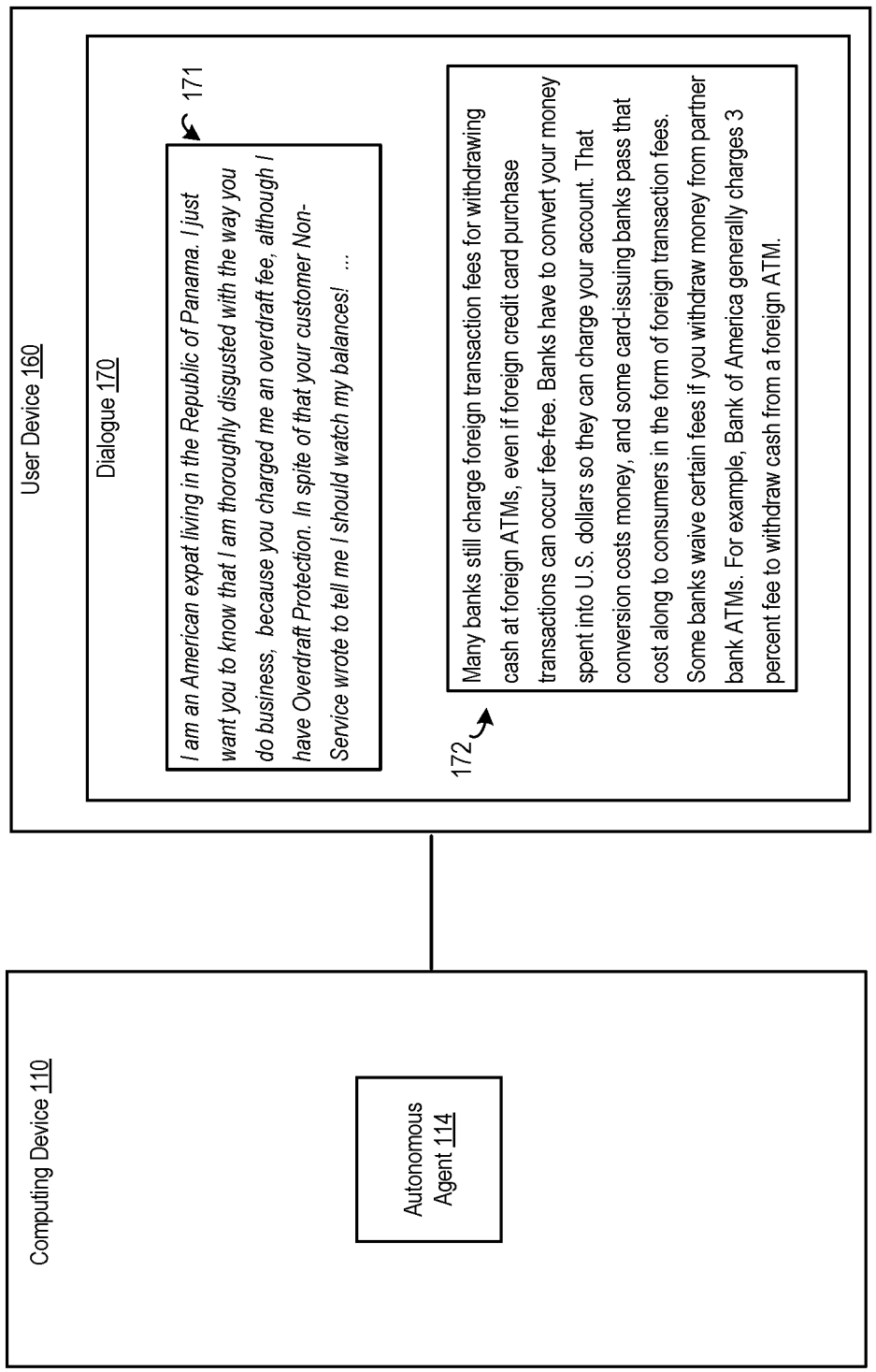
FIG. 1 shows an exemplary autonomous agent environment, in accordance with an aspect.

Aspects of the present disclosure relate to autonomous agents ("chatbots") that can generate responses that overcome, or defeat, claims made in an utterance. To do so, disclosed solutions employ various techniques such as rhetorical analysis, logical analysis, and textual analysis to identify claims in the utterance and form an answer in the form of a textual response that defeats the claims. The answer, which can be referred, into as a defeating reply, can be provided to a user device by an autonomous agent for the purposes of concluding a session with the user.

Despite the success of autonomous agents, deployment is not yet widespread. As mobile and portable devices become popular and enable a number of new products and services, expectations for the quality and availability of support, including autonomous agents to provide this support have significantly risen. For instance, expectations include not just answers to basic questions, but also assistance with resolving problems such as unsatisfactory product features or problems with a service. More effective autonomous agents, therefore, are increasingly useful.

For instance, in some cases, interactions with agents include attempts to take advantage of an organization or the making of unreasonable demands. An autonomous agent can provide an authoritative answer that defeats the false claims made by breaking argumentation patterns. Such a defeating reply can attack any claim made by the user. The defeating reply therefore, provides an authoritative, conclusive answer to attempt to satisfy this user or at a minimum to end the conversation.

But existing solutions are unable to develop such a defeating reply. Moreover, such solutions are often unable to control a dialogue session between autonomous agent and user. Such deficiencies are in part due to deep learning solutions, which are not well-suited given dialogue complexity.

In contrast, disclosed solutions are able to generate textual responses that address statements, misstatements, or exaggerations made in a textual statement received from a user device. Moreover, because logical analysis is used, this defeating reply can be explained. Disclosed solutions use techniques such as communicative discourse trees (CDTs) and logical analysis. "Communicative discourse trees" or "CDTs" include discourse trees that are supplemented with communicative actions. A communicative action is a cooperative action undertaken by individuals based on mutual deliberation and argumentation.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

As used herein, a "predicate" is a Boolean-valued function that takes multiple arguments ranging over objects such as people, place, and times. It may include functions with other types of output ranges or numbers or types of variables, or as otherwise known in the art. Examples of predicates include "a fee was charged" and "Socrates is a philosopher." As an example, "a fee was charged" can be encoded as charge (Agent, Fee) and "Socrates is a philosopher" can be encoded as philosopher (socrates) following logical conventions.

As used herein, an "atom," or an "atomic formula," is a formula with no deeper propositional structure, that is, a formula that contains no logical connectives or equivalently a formula that has no strict sub-formulas. Atoms are thus the simplest well-formed formulas of logic. An example of an atom is operational (credit card), which evaluates to 1 if the credit card is operational and 0 if the credit card is not operational. A logical formula can contain one or more atoms, e.g., (if v(y) AND z(a)).

FIG. 1 shows an exemplary autonomous agent environment, in accordance with an aspect. Autonomous agent environment 100 includes computing device 110 and user device 160. In the example depicted in FIG. 1, computing device 101 implements an autonomous agent that engages in a conversation with user device 160 and generates a defeating reply. Computing device 101 uses techniques such as communicative discourse trees and logical analysis.

Computing device 110 includes autonomous agent 114. Examples of computing device 101 are distributed system 2200 and client computing devices 2202, 2204, 2206, and 2208. User device 160 can be any mobile device such as a mobile phone, smart phone, tablet, laptop, smart watch, and the like. Examples of user device 160 include client computing devices 2202, 2204, 2206, and 2208.

Computing device 110 can process text. Examples of suitable text include electronic text sources such as text files, Portable Document Format (PDF)® documents, rich text documents, and the like. In some cases, preprocessing may be performed on the input text to remove unwanted characters or formatting fields. Input text can be organized by using one or more structural or organizational approaches such as sections, paragraphs, pages, and the like.

In the example depicted, computing device 110 and user device 160 are engaged in a dialogue 170. For example purposes, the dialogue 170 is depicted on user device 160. But dialogue 170 could be depicted on any other device. User device 160 transmits utterance 171 to computing device 110. Utterance 171 illustrates frustration experienced by an expatriate who has been charged banking fees, which the user views as excessive.

Continuing the example, autonomous agent 114, executing on computing device 110, analyzes utterance 171. An example of a method for creating a defeating reply is discussed with respect to FIG. 17. Autonomous agent 114 creates reply 172, which addresses the user's statements by explaining the rationale for the banking fees.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
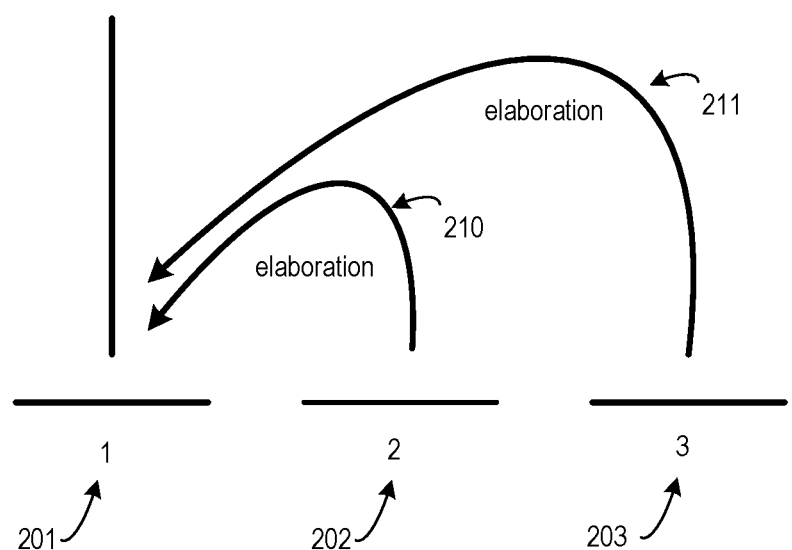
FIG. 2 depicts an example of a discourse tree in accordance with an aspect.
Figure 3:
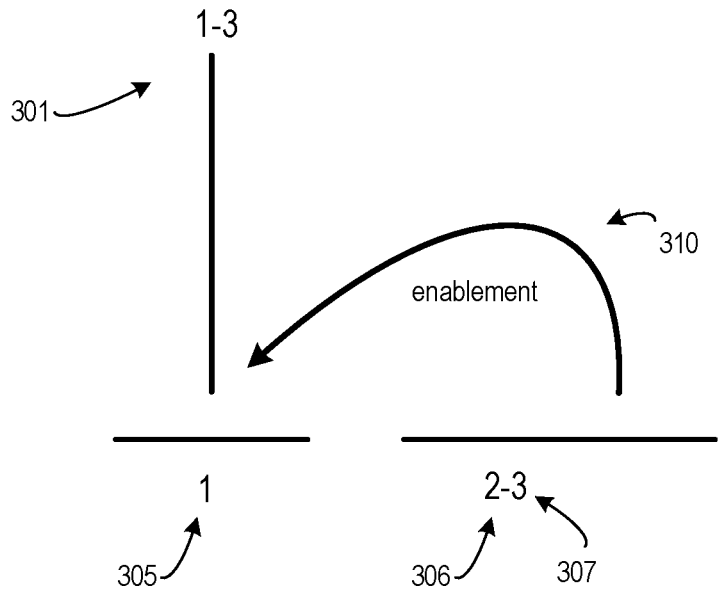
FIG. 3 depicts a further example of a discourse tree in accordance with an aspect.
Figure 3:
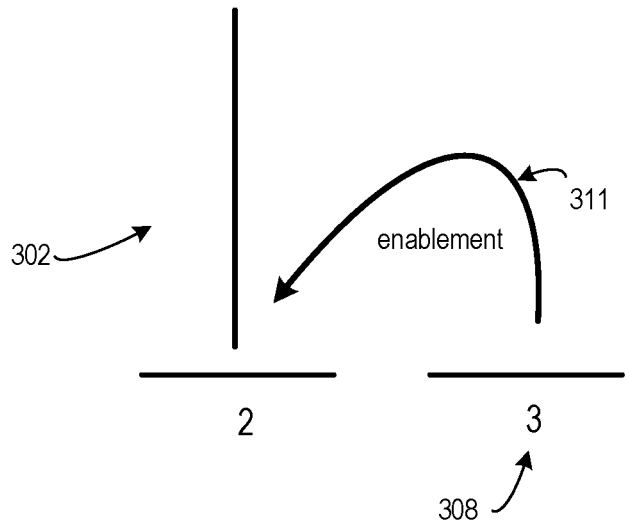

FIG. 2 depicts an example of a discourse tree, in accordance with an aspect. FIG. 2 includes discourse tree 190. Discourse tree includes text span 191, text span 192, text span 193, relation 210 and relation 228. The numbers in FIG. 2 correspond to the three text spans. FIG. 3 corresponds to the following example text with three text spans numbered 1, 2, 3:

1. Honolulu, Hawaii will be site of the 1917 Conference on Hawaiian History
2. It is expected that 190 historians from the U.S. and Asia will attend
3. The conference will be concerned with how the Polynesians sailed to Hawaii For example, relation 210, or elaboration, describes the relationship between text span 191 and text span 192. Relation 228 depicts the relationship, elaboration, between text span 193 and 194. As depicted, text spans 192 and 193 elaborate further on text span 191. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relation 310, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:
(1) Divide the discourse text into units by:
   (a) Unit size may vary, depending on the goals of the analysis
   (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
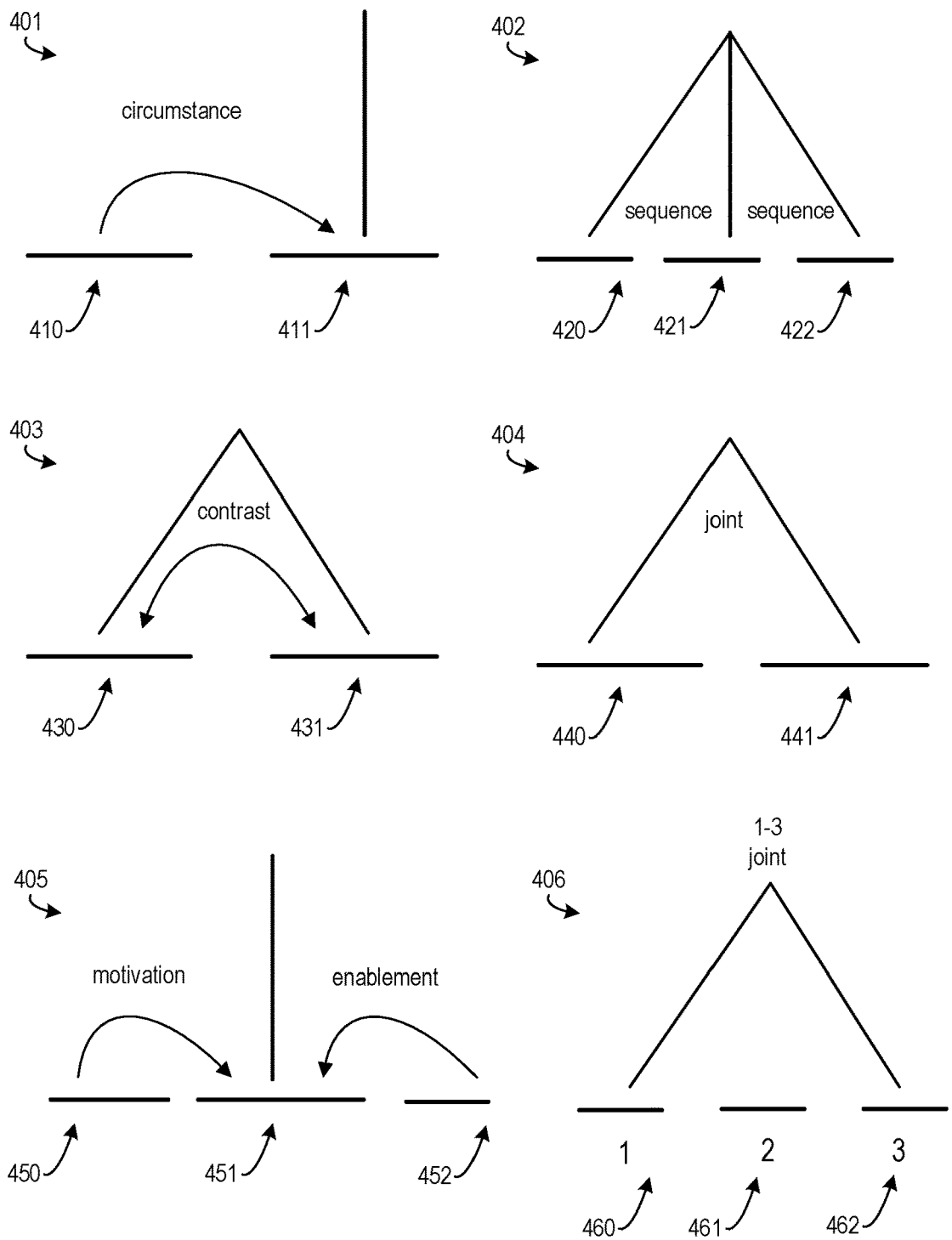
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 419 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:
1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
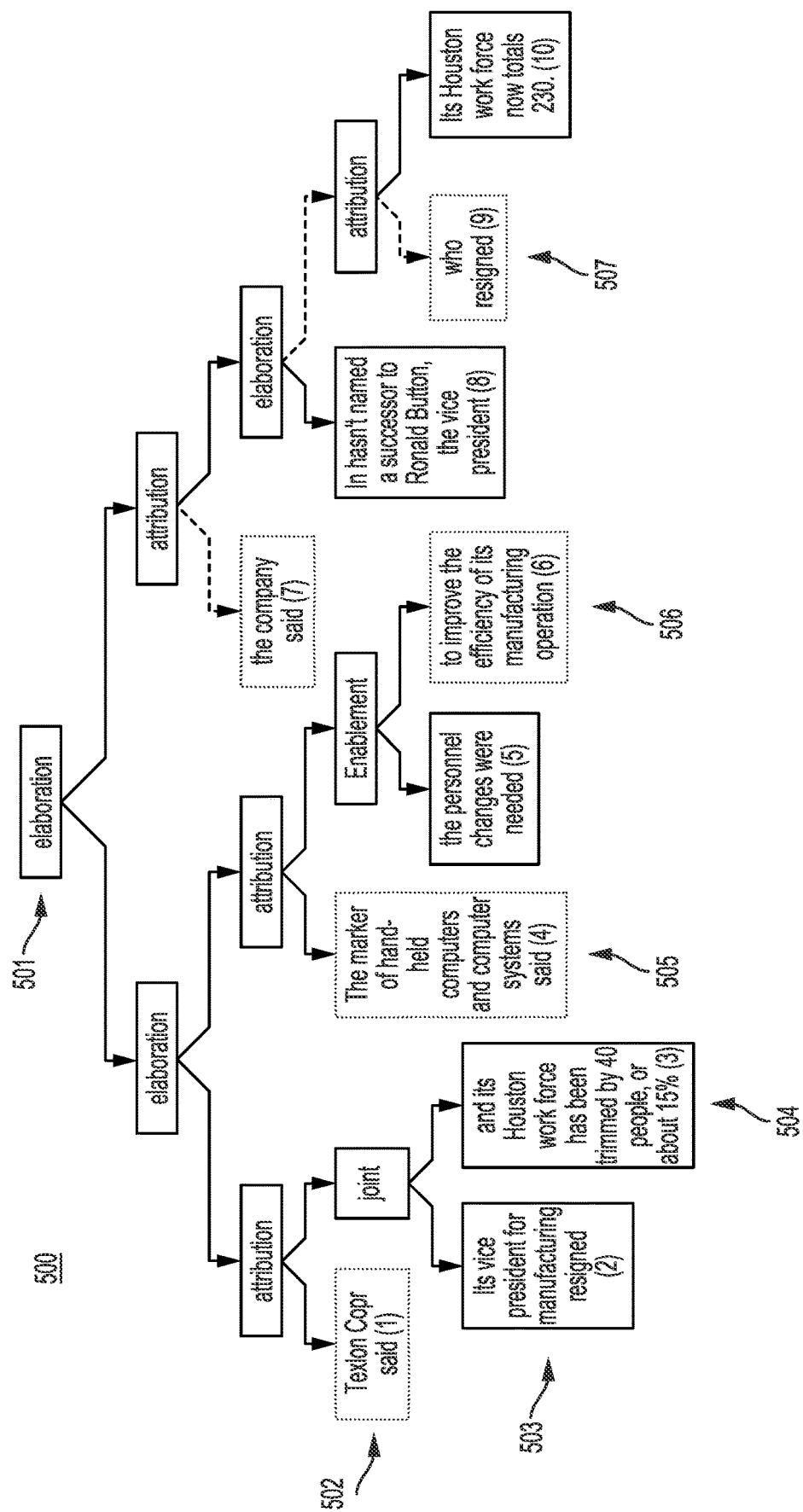
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 1913. Combining intra- and multi-sentential rhetorical parsing for document-level discourse analysis. In ACL (1), pages 486-496.

Figure 6:
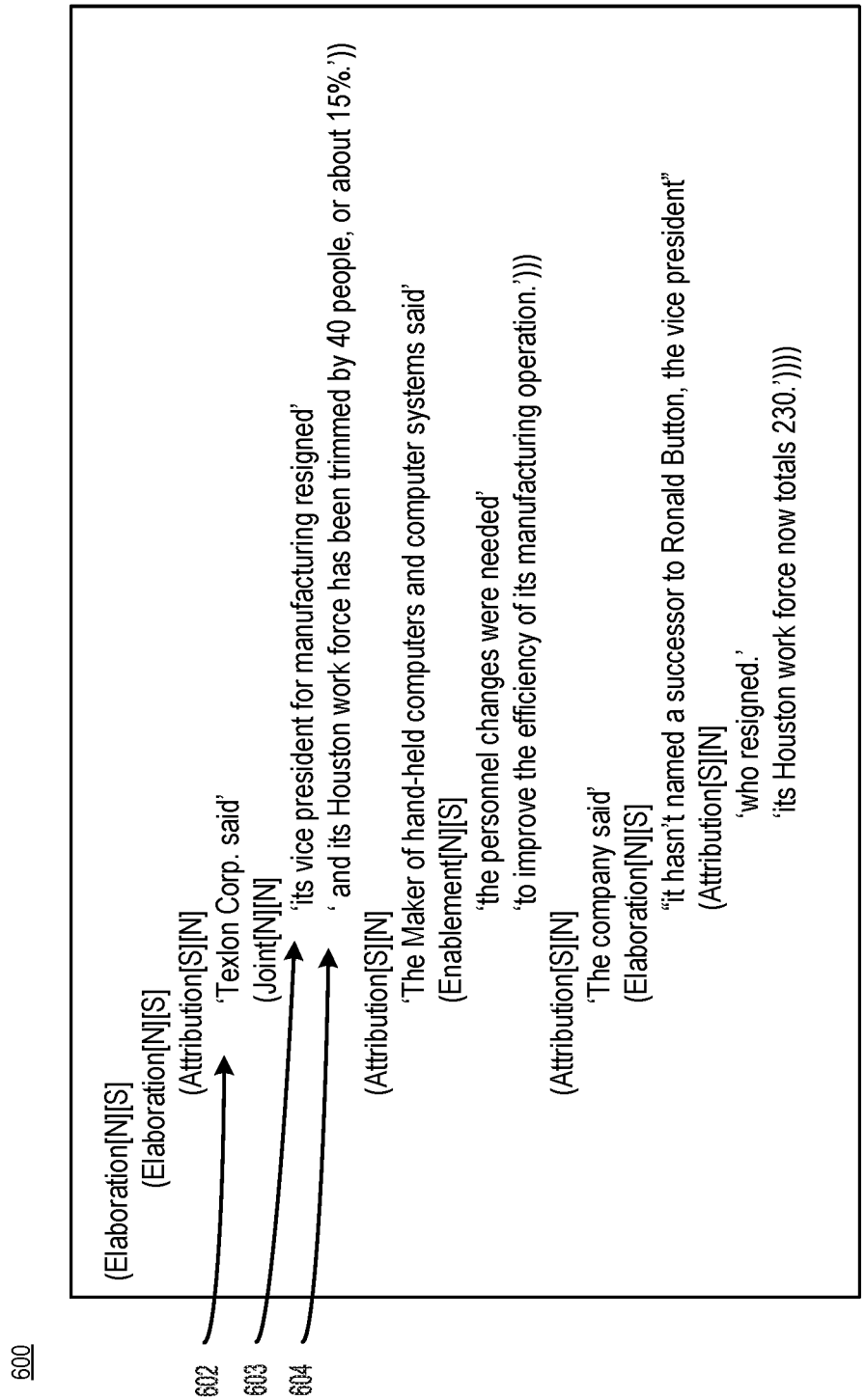
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (1915).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (1900). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is $5/8$ while its recall is $5/12$. When a search engine returns 30 pages only 19 of which were relevant while failing to return 40 additional relevant pages, its precision is $19/30=2/3$ while its recall is $19/60=1/3$. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2×((precision× recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
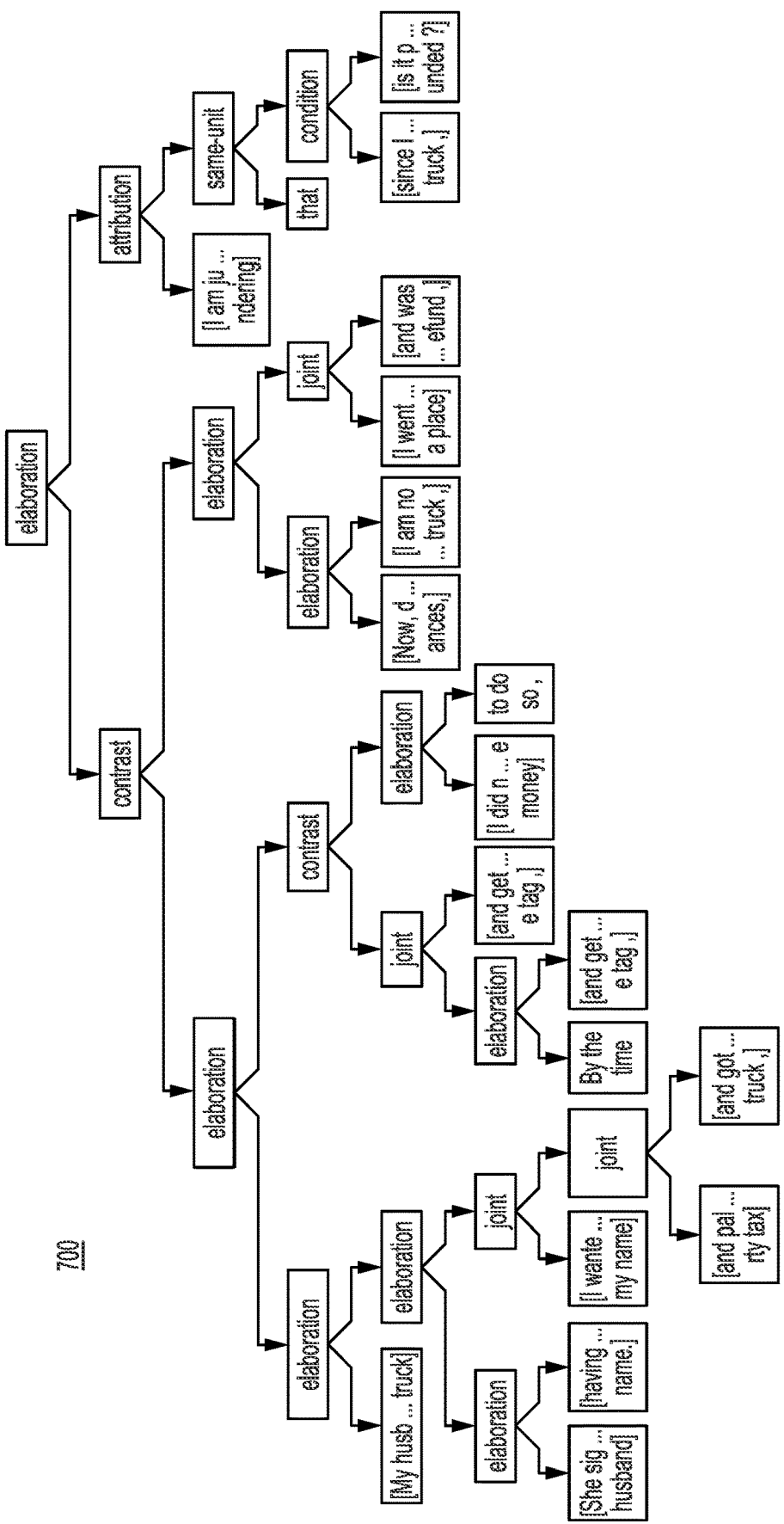
FIG. 7 depicts an exemplary discourse tree for an example request about property tax in accordance with an aspect.

FIG. 7 depicts an exemplary discourse tree for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;
- "I didn't have the money" elaborated by "to do so" contrasted with
- "By the time" elaborated by "it came to sending off the title"
- "and getting the tag"
- "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with
- "Now, due to circumstances," elaborated with "I am not going to be able to afford the truck." which is elaborated with
- "I went to the insurance place"
- "and was refused a refund"
- "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with
- "I am just wondering that since I am not going to have a tag on this truck, is it possible to get the property tax refunded?"
- "I am just wondering" has attribution to
- "that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo!Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
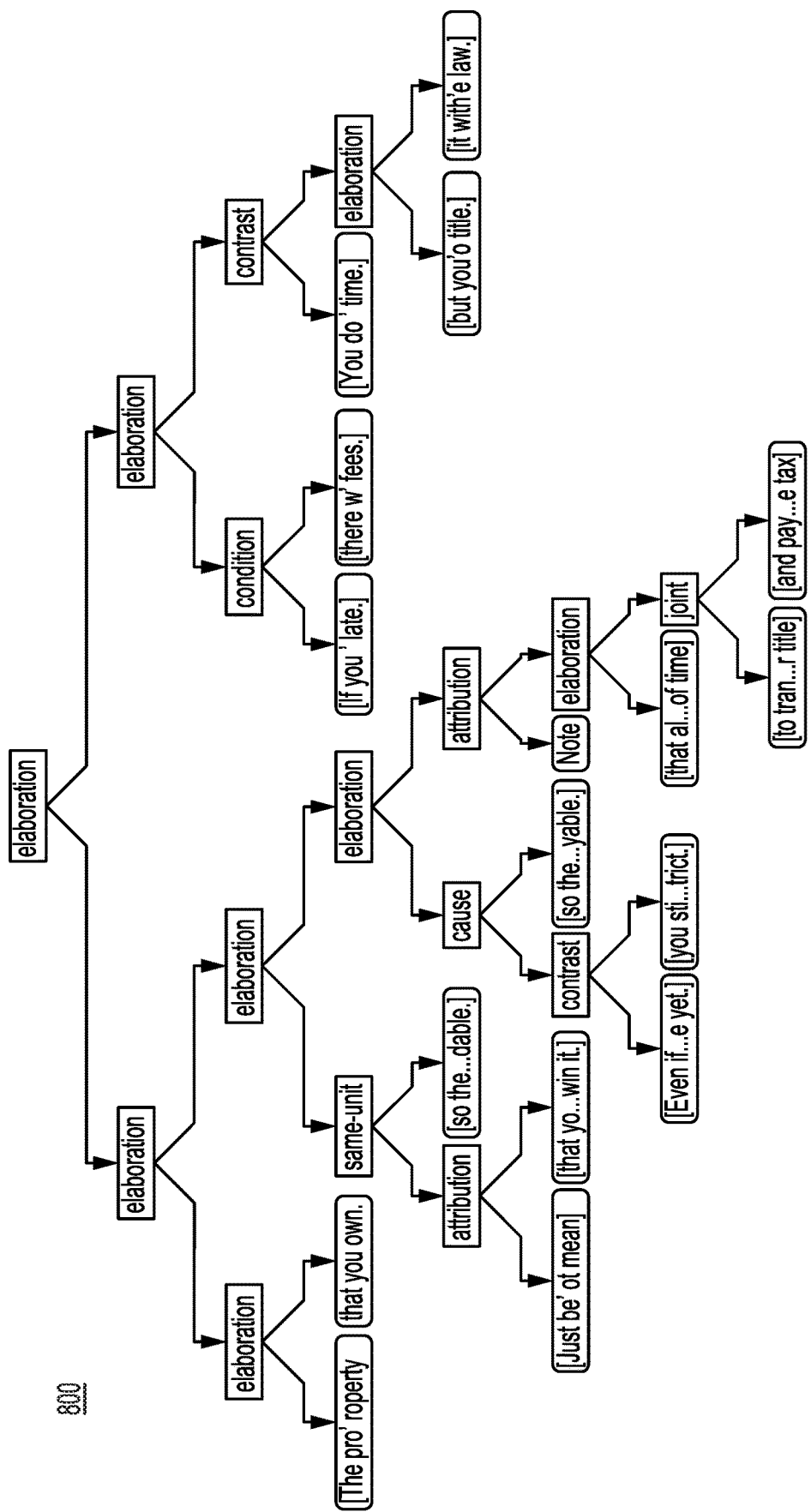
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
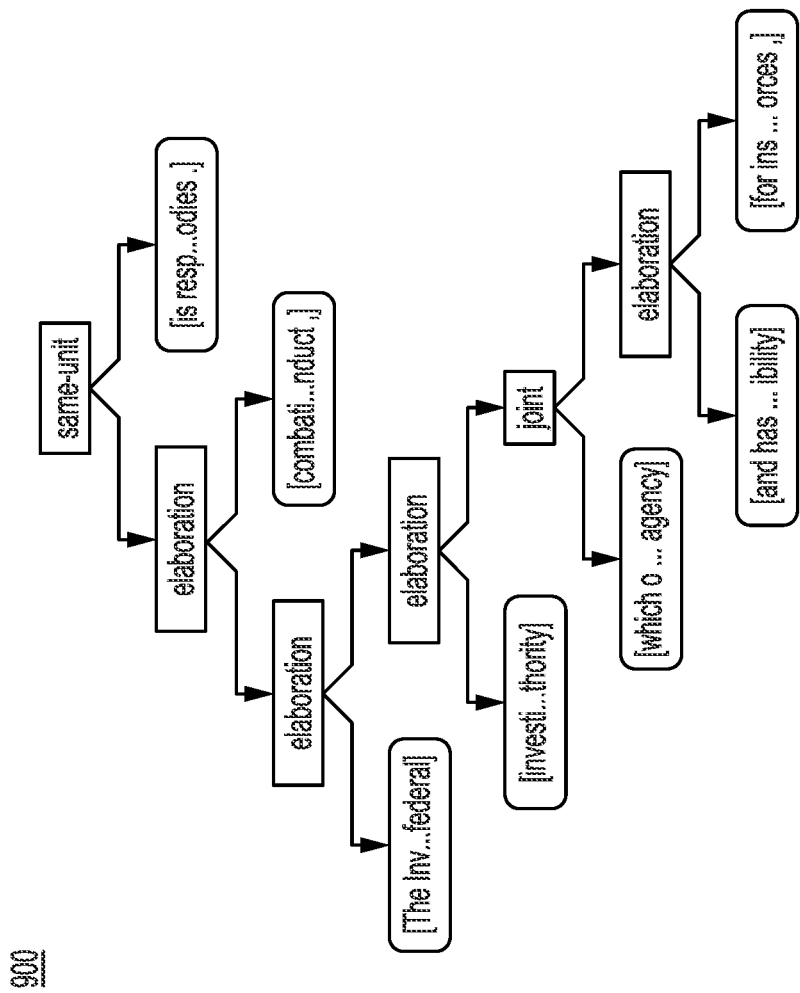
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
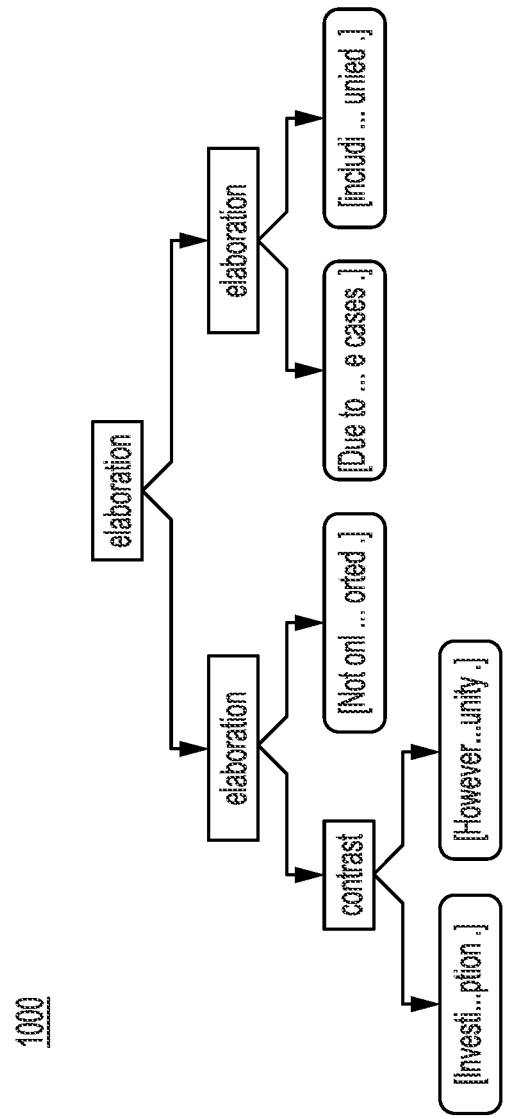
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Autonomous agent 114 can determine whether a given answer or response, such as an answer obtained from answer database 105 or a public database, is responsive to a given question, or request. More specifically, autonomous agent 114 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Autonomous agent 114 can determine similarity between question-answer pairs using different methods. For example, autonomous agent 114 can determine level of similarity between an individual question and an individual answer. Alternatively, autonomous agent 114 can determine a measure of similarity between a first pair including a question and an answer, and a second pair including a question and answer.

For example, autonomous agent 114 uses rhetoric agreement classifier 119 trained to predict matching or non-matching answers. Autonomous agent 114 can process two pairs at a time, for example <q1,a1> and <q2,a2>. Autonomous agent 114 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2,a2> can be processed so that rather than "guessing" correctness based on words or structures shared by q2 and a2, both q2 and a2 can be compared with their corresponding components q1 and a2 of the labeled pair <q2,a2> on the grounds of such words or structures. Because this approach targets a domain-independent classification of an answer, only the structural cohesiveness between a question and answer can be leveraged, not 'meanings' of answers.

In an aspect, autonomous agent 114 uses training data 125 to train rhetoric agreement classifier 119. In this manner, rhetoric agreement classifier 119 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, autonomous agent 114 provides a training pair to rhetoric agreement classifier 119 and receives, from the model, a level of complementarity. Autonomous agent 114 calculates a loss function by determining a difference between the determined level of complementarity and an expected level of complementarity for the particular training pair. Based on the loss function, autonomous agent 114 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Autonomous agent 114 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov SO. Rhetoric Map of an Answer to Compound Queries Knowledge Trail Inc. ACL 1915, 681-686. ("Galitsky 1915"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
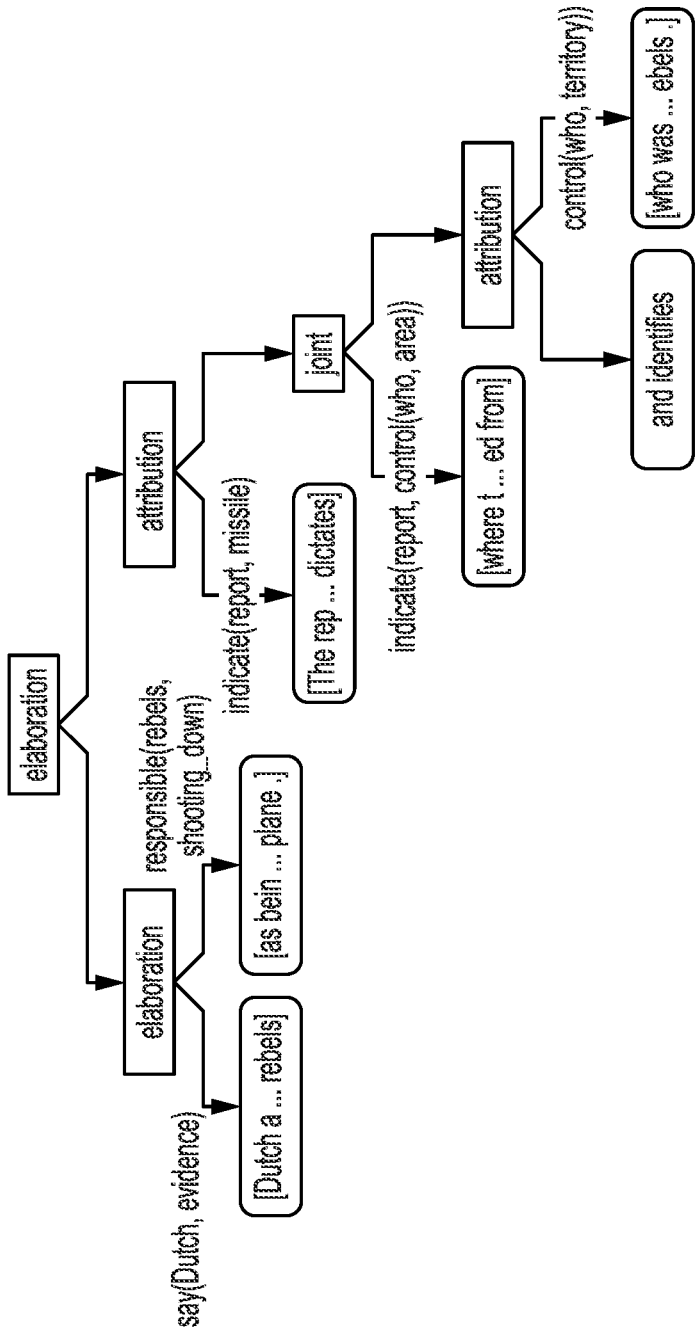
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 1100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 1908. and/or Karin Kipper Schuler, Anna Korhonen, Susan W. Brown, VerbNet overview, extensions, mappings and apps, Tutorial, NAACL-HLT 1909, Boulder, Colorado.

Figure 12:
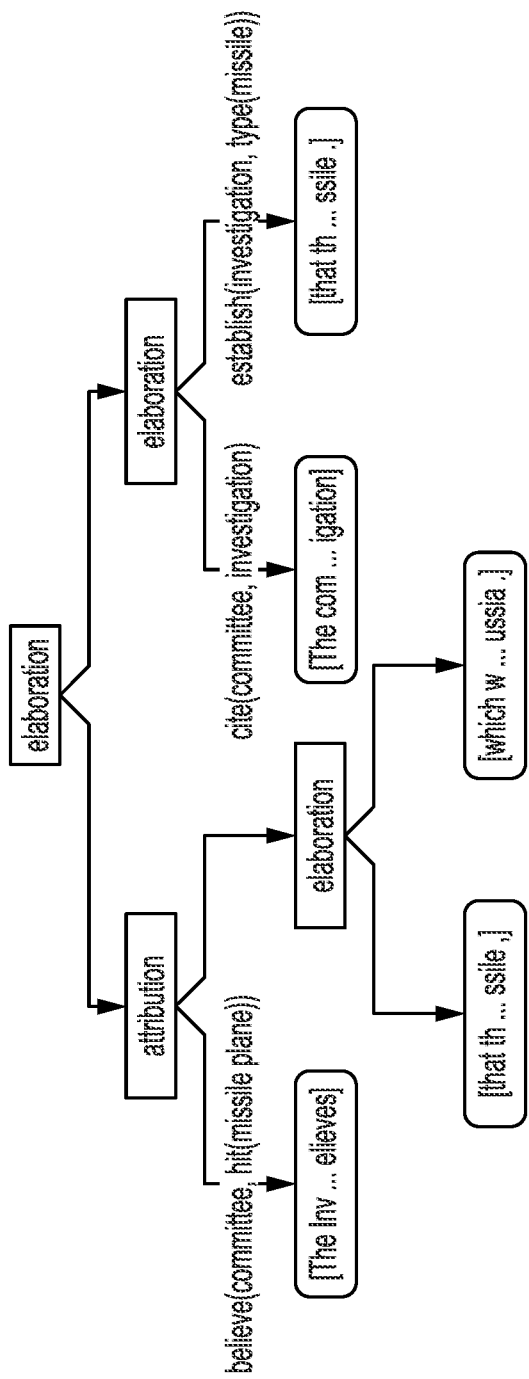
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1190, which represents the following text: "The Investigative Committee of the Russian Federation believes that the plane was hit by a missile, which was not produced in Russia. The committee cites an investigation that established the type of the missile."

Figure 13:
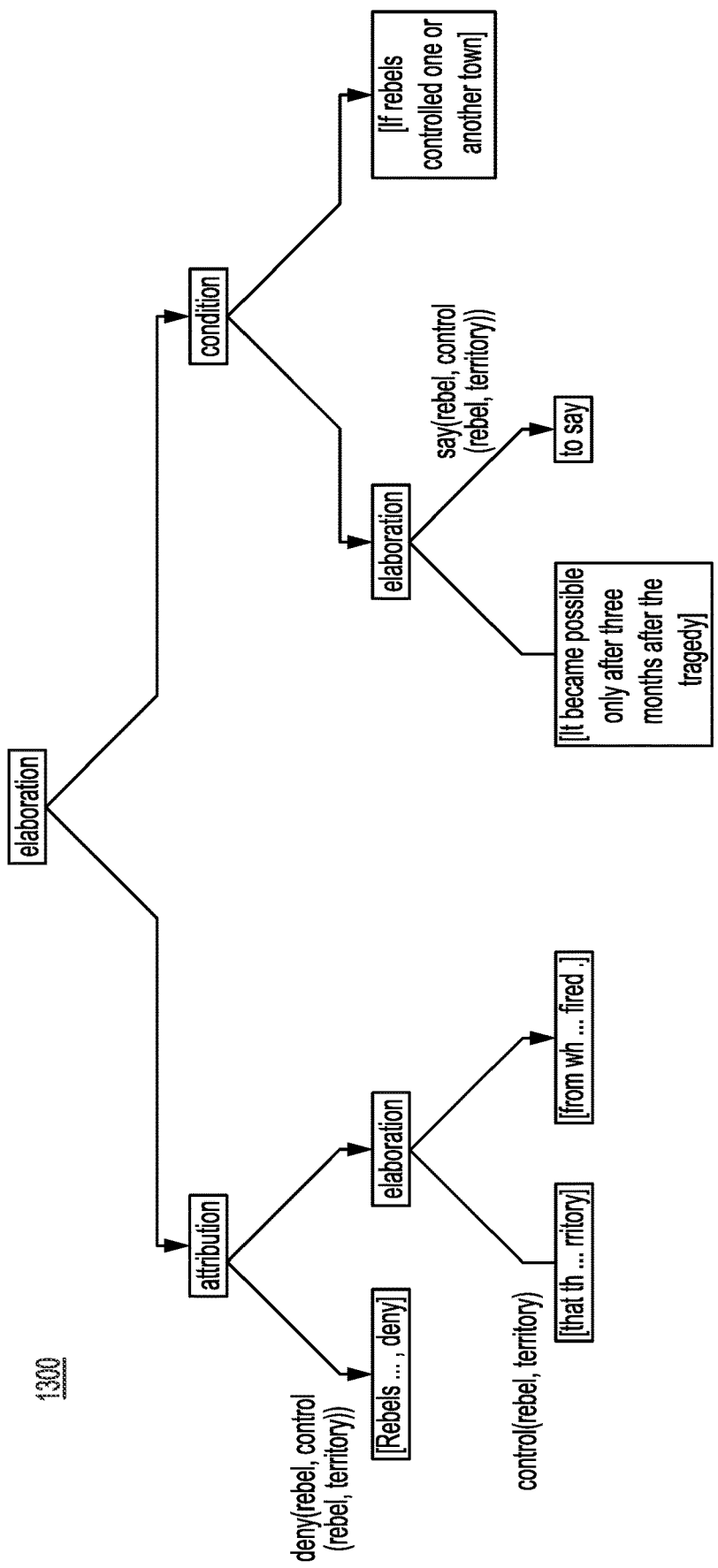
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1190 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 1908), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse (Experiencer, Prop):-, property(Experiencer, Prop), adv (Prop).

NP V NP-PRO-ARB. Example "The teacher amused." Syntax Stimulus V. amuse(Stimulus, E, Emotion, Experiencer):. cause(Stimulus, E), emotional_state(result (E), Emotion, Experiencer).

NP.cause V NP. Example "The teacher's dolls amused the children." syntax Stimulus <+genitive>('s) V Experiencer. amuse(Stimulus, E, Emotion, Experiencer):. cause(Stimulus, E), emotional_state(during(E), Emotion, Experiencer).

NP V NP ADJ. Example "This performance bored me totally." syntax Stimulus V Experiencer Result. amuse (Stimulus, E, Emotion, Experiencer). cause(Stimulus, E), emotional_state(result(E), Emotion, Experiencer), Pred(result(E), Experiencer).

Communicative actions can be characterized into clusters, for example:
- Verbs with Predicative Complements (Appoint, characterize, dub, declare, conjecture, masquerade, orphan, captain, consider, classify), Verbs of Perception (See, sight, peer).
- Verbs of Psychological State (Amuse, admire, marvel, appeal), Verbs of Desire (Want, long).
- Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer (message), inquire, interrogate, tell, manner (speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 1915. Topical similarity between question and answer can expressed as common sub-graphs of parse thickets. The higher the number of common graph nodes, the higher the similarity.

Figure 14:
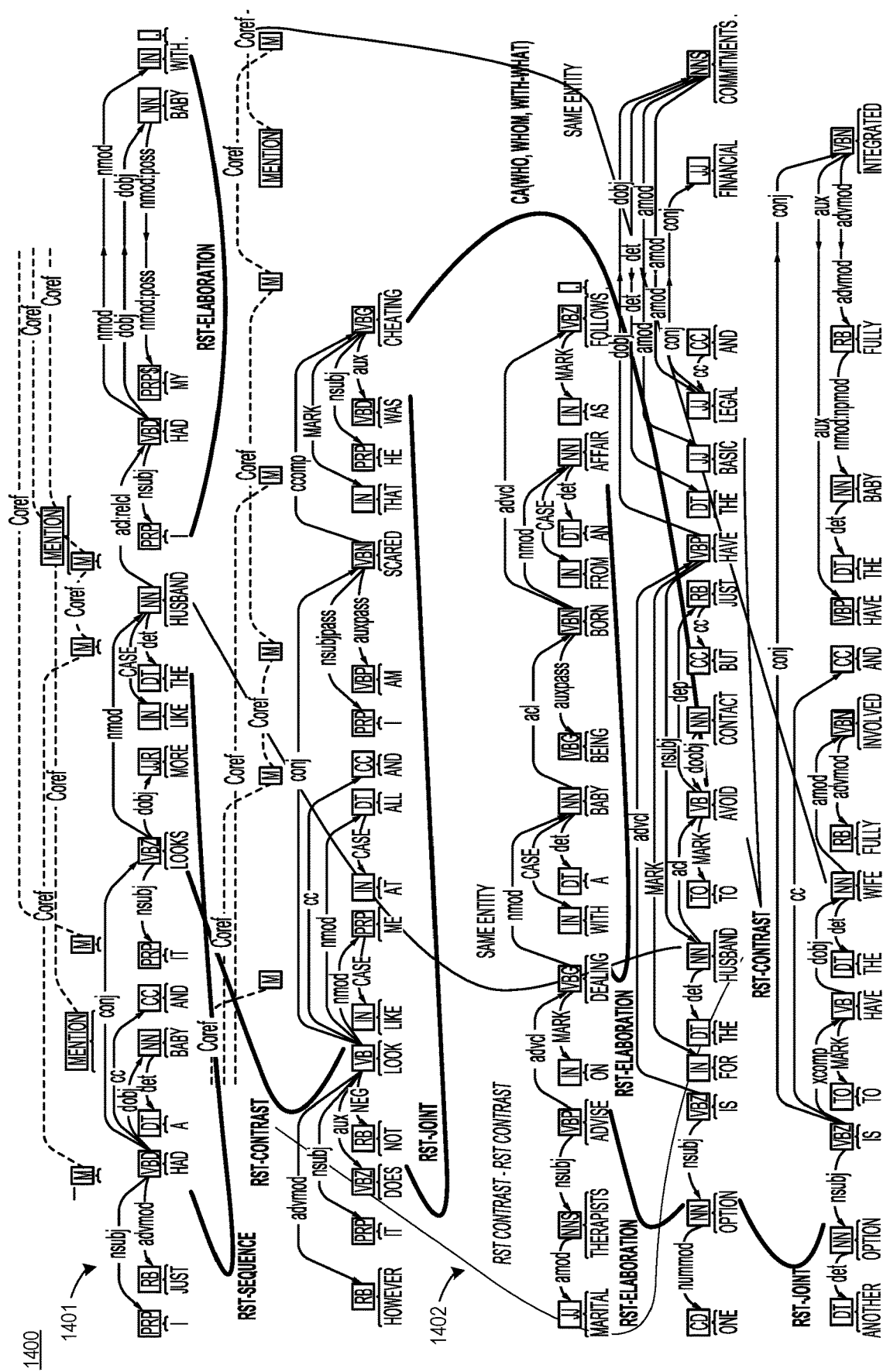
FIG. 14 illustrates parse thickets in accordance with an aspect.

FIG. 14 illustrates parse thickets in accordance with an aspect. FIG. 14 depicts parse thicket 1400 including a parse tree for a request 1401, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V,A), where V={$action_1$, $action_2$ . . . $action_n$} is a finite set of vertices corresponding to communicative actions, and A is a finite set of labeled arcs (ordered pairs of vertices), classified as follows:

Each arc $action_i$, $action_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j = s_i$ or different subjects. Each arc $action_i$, $action_j \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 1913). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he (she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\hat{}rst2(N2,S2,W2,R2)=(rst1\hat{}rst2)$$
$$(N1\hat{}N2,S1\hat{}S2,W1\hat{}W2,R1\hat{}R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1)^sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 1915, Volume 49, Issue 2.

For example, the meaning of rst-background^rst-enablement=(S increases the ability of R to comprehend an element in N)^(R comprehending S increases the ability of R to perform the action in N)=increase-VB the-DT ability-NN of-IN R-NN to-IN.

Because the relations rst-background^rst-enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
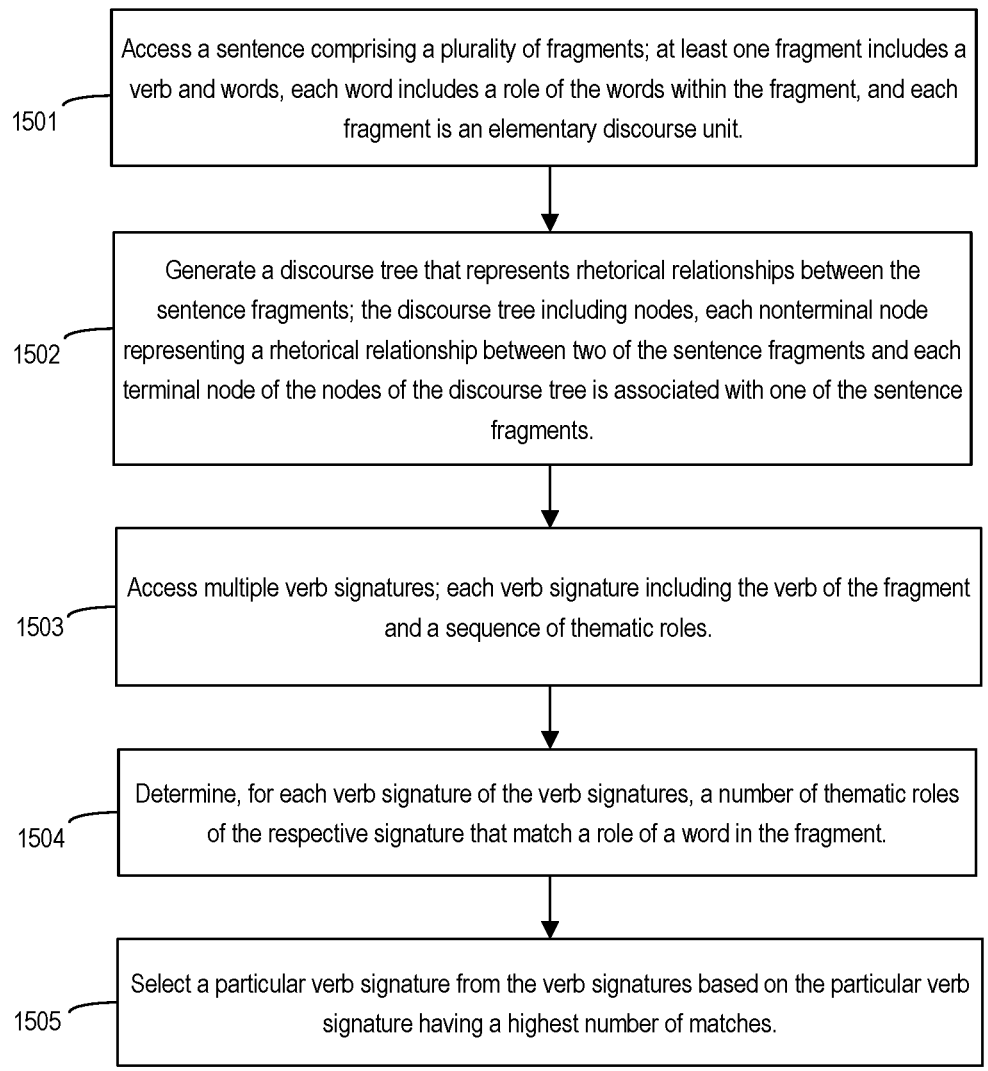
FIG. 15 illustrates an exemplary process for building a communicative discourse tree in accordance with an aspect.

FIG. 15 illustrates an exemplary process for building a communicative discourse tree in accordance with an aspect. Autonomous agent 114 can implement process 1500. As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, autonomous agent 114 accesses a sentence such as "Rebels, the self-proclaimed Donetsk People's Republic, deny that they controlled the territory from which the missile was allegedly fired" as described with respect to FIG. 13.

Continuing the example, autonomous agent 114 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, autonomous agent 114 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, autonomous agent 114 accesses a list of verbs, e.g., from VerbNet. Each verb matches or is related to the verb of the fragment. For example, the for the first fragment, the verb is "deny." Accordingly, autonomous agent 114 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," autonomous agent 114 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Autonomous agent 114 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, rhetorical classification autonomous agent 114 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Generating a Defeating Reply

Certain aspects relate to autonomous agents that create a defeating reply. To form a defeating reply, certain aspects use rhetorical analysis, logical analysis, and textual analysis to identify claims in the utterance and form a reply that defeats the claims. In some cases, a set of candidate answers is obtained, for instance from a search engine, and is vetted. Only candidate answers that defeat the claims raised by the utterance are used. More specifically, to ensure that the candidate answer defeats the user's claims, arguments are extracted from both the question and each candidate answer and a correspondence between these arguments is established.

While aspects of the present disclosure are discussed in relation to a "defeating reply," it will be appreciated that such textual responses can be applied to different systems and scenarios. For instance, text that defeats a user question can be applied to information sharing, encouragement, clarification, and rejection, in addition to generating a comprehensive long answer. Additional information can be found in co-pending U.S. patent application Ser. No. 16/654,258 filed on Oct. 16, 2019 and entitled "Constructing conclusive answers for autonomous agents," the entirety of which is incorporated herein by reference for all purposes.

To represent an argument, Communicative Discourse Trees (CDTs) are constructed and one or more elementary discourse units and/or rhetorical relations are identified and extracted from the CDT. Building a CDT is discussed with respect to FIG. 15 and accompanying text. Logical arguments are derived from these elementary discourse units and/or rhetorical relations.

Rules for mapping elementary discourse units and/or rhetorical relations from a CDT can vary in complexity. In some cases, a discourse parser determines a generic Elaboration and Joint relations which need to be further clarified and turned into Cause, Reason, Explanation, Conclusion and others. In other cases, a rhetorical relation of type cause, explanation, condition, or reason is directly identified. The two corresponding elementary discourse units, nucleus and satellite, each include logical atoms that are combined to create a reason-conclusion logical formula.

In a more elaborate case, a particular pattern of elementary discourse units and/or rhetorical relations are matched against known cases or rules. Examples are shown in Table 1. These cases can be domain specific, for instance, relating to finance or law. Such rules can be applied after discourse parsing.

The reason-conclusion approach enables a determination of whether text in a candidate answer defeats a claim in the utterance. If the reasoning confirms that it is the case, this candidate answer is provided as a defeating reply.

Figure 16:
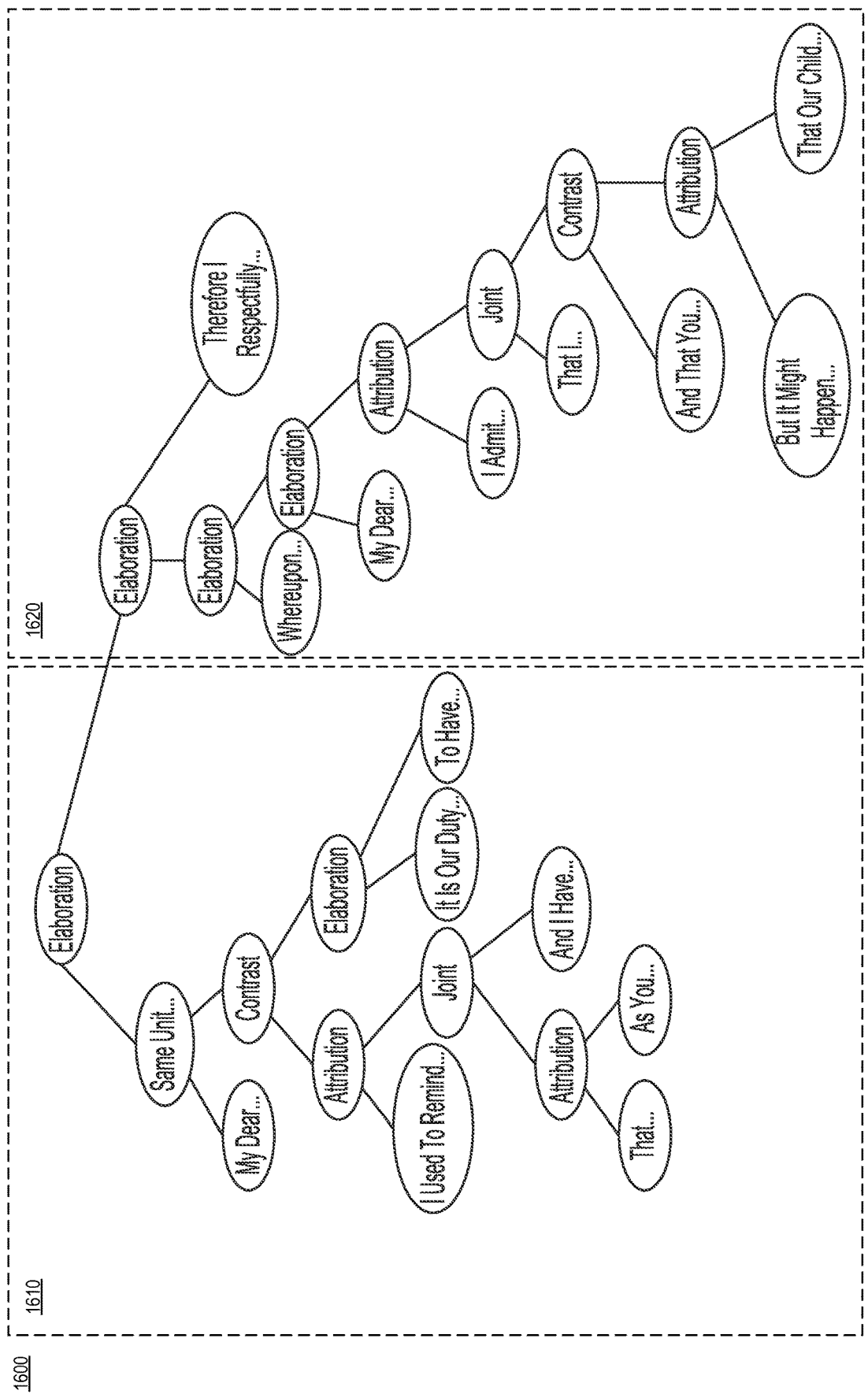
FIG. 16 illustrates a discourse tree for an example text in accordance with an aspect.

FIG. 16 illustrates a discourse tree for an example text in accordance with an aspect. FIG. 16 includes discourse tree 1600, which represents the following textual example: Miss Duncan: 'My dear Mr. Shaw: I beg to remind you that as you have the greatest brain in the world, and I have the most beautiful body, it is our duty to posterity to have a child.' Whereupon Mr. Shaw replied to Miss Duncan: 'My dear Miss Duncan: I admit that I have the greatest brain in the world and that you have the most beautiful body, but it might happen that our child would have my body and your brain. Therefore, I respectfully decline.'

Discourse tree 1600 is formed of two sub-trees, sub-tree 1610 and sub-tree 1620. Sub-tree 1610 represents Miss Duncan's utterance and sub-tree 1620 represents Mr. Shaw's reply. A more detailed discourse tree is shown in text form below:

elaboration (LeftToRight)
  same-unit
    TEXT:My dear Mr. Shaw :
    contrast (RightToLeft)
    attribution (RightToLeft)
      TEXT:I beg to remind you
    joint
      attribution (LeftToRight)

-continued

```
            TEXT:that
               TEXT:as you have the greatest brain in the world ,
               TEXT:and I have the most beautiful body,
         elaboration (LeftToRight)
            TEXT:it is our duty to posterity
            TEXT:to have a child .
      elaboration (LeftToRight)
         elaboration (LeftToRight)
            TEXT:Whereupon Mr. Shaw replied to Miss Duncan :
         elaboration (LeftToRight)
            TEXT:My dear Miss Duncan :
            attribution (RightToLeft)
               TEXT:I admit
               joint
                  TEXT:that I have the greatest brain in the world
                  contrast
                     TEXT:and that you have the most beautiful body,
                     attribution (RightToLeft)
                        TEXT:but it might happen
                        TEXT:that our child would have my body and your
                           brain .
TEXT:Therefore , I respectfully decline .
```

As can be seen, the thoughts in the text above are split into "atomic thoughts", which can be part of elementary discourse units. Additionally, the thoughts are organized in a hierarchical structure interconnected by rhetorical relations. These rhetorical relations range from default types of Elaboration to more specific ones showing the flow of author thoughts such as Contrast and Attribution. Contrast here is essential to show that Miss Duncan proposed a thing, but it was rejected in Mr. Shaw's reply. Multiple relations of Attribution attach the subjects What of what was said by the agents to the communicative actions (such as admit(Who, What)). Hence discourse tree is essential to represent a logic of a text expressing various interactions between people such as a defeating reply of Mr. Shaw. It does not matter which words and which semantic means are used to defeat a proposal: what is essential is a logical structure of this defeat. Discourse trees are associated with genre of texts; shorts articles can be clustered based on discourse information only, without involving keywords.

The utterances include a suggestion and a denial. As can be seen, the main feature of a concise, convincing answer is proper handling of entities. In this case, the reply should characterize body and brain. To defeat the proposal of the initiator of this conversation, the reply must include opposite sentiments to what was proposed. Hence, there exists a mapping, shown in the text above shown in underlined font, of "you ... brain-I ... body" to "my ... body-your ... brain" with "you" mapped to "my," "brain" mapped to "body," "I" mapped to "your," and "body" mapped to "brain."

Figure 17:
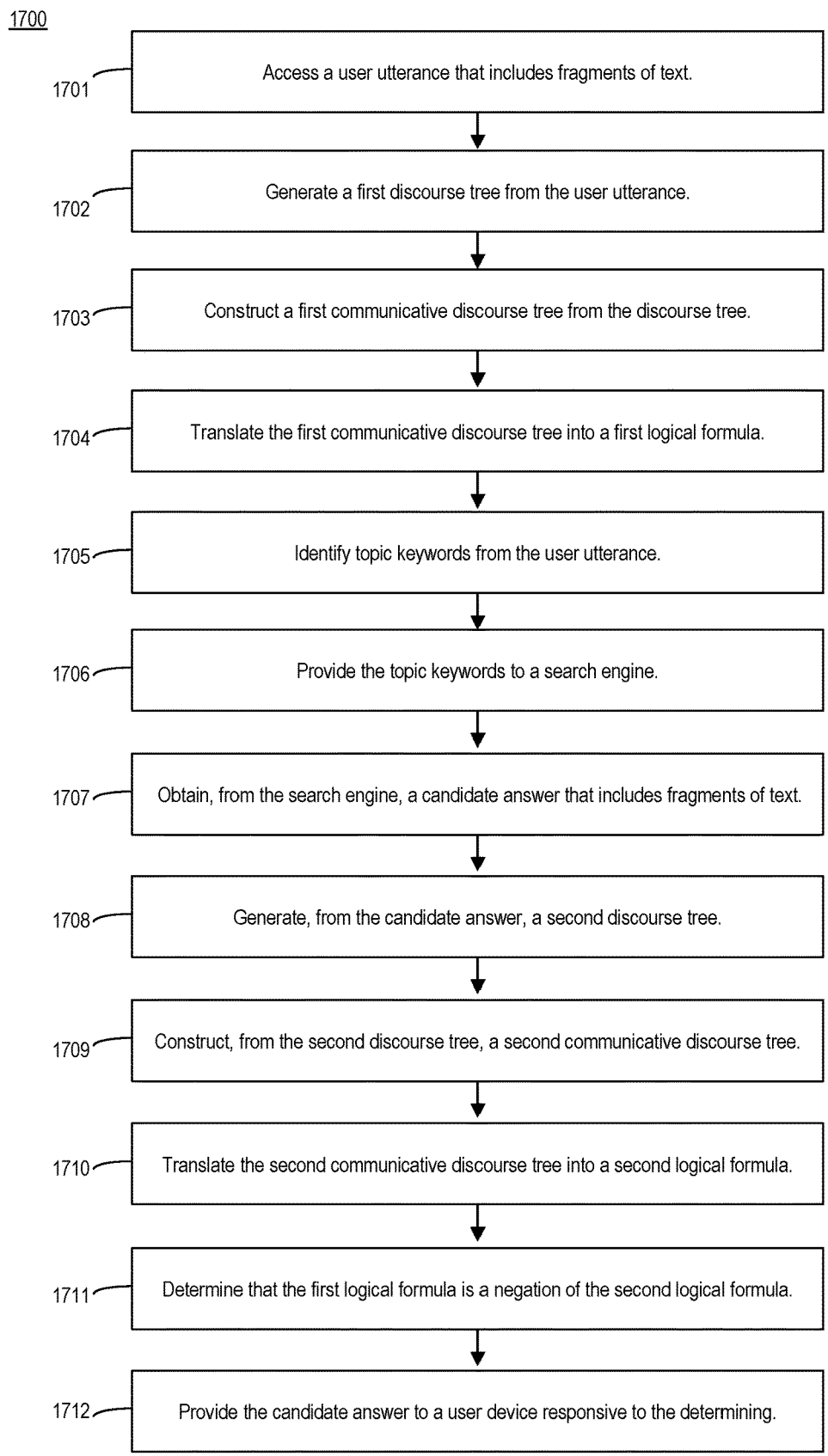
FIG. 17 illustrates an exemplary process for constructing a defeating reply to an utterance, in accordance with an aspect.

FIG. 17 illustrates an exemplary process 1700 for constructing a defeating reply to an utterance, in accordance with an aspect. Autonomous agent 114 can implement process 1700 on computing device 110. In some cases, some of the operations in process 1700 may not be necessary, and therefore are not performed. It will be appreciated that process 1700 can repeat additional times in the event that a candidate answer is not sufficiently appropriate or accurate.

Further, process 1700 can iterate multiple times to generate multiple defeating replies for multiple user utterances. For instance, a user can carry on a conversation and with follow-up utterances, each of which can be addressed by autonomous agent 114.

At block 1701, process 1700 involves accessing a user utterance that includes fragments of text. Each fragment can be an elementary discourse unit, which can be identified as such during formation of a discourse tree, for instance at block 1702.

For illustrative purposes, process 1700 is discussed with respect to the following example. This example relates to customer support in finance, specifically, to foreign transaction fees. An example user utterance is as follows:

'I am an American expat living in the Republic of Panama. I just want you to know that I am thoroughly disgusted with the way you do business, because you charged me an overdraft fee, although I have Overdraft Protection. In spite of that your customer Non-Service wrote to tell me I should watch my balances! Despite of that you charged me several times for late fees on Sunday due dated bills, although they have paid on Monday! Why are you now charging a Foreign Transaction Fee of 3%? I asked about this but the form letter sent to me told me about fees for withdrawing from ATMs. However I have never in my life used an ATM, because I do not want to pay to withdraw my own money!'.

As can be seen, the user is upset that he has been charged banking fees, including overdraft fees and foreign transaction fees. However, as will be discussed, banks do charge certain fees, and autonomous agent 114 can explain to the user that the fees may be justified, thereby "defeating" the user's assertions that the fees are baseless.

At block 1702, process 1700 involves generating, from the user utterance, a first discourse tree. Discourse trees are discussed, for example, with respect to FIG. 10. As discussed, a discourse tree represents rhetorical relationships between the fragments of text of the user utterance. Continuing the example, a discourse tree for the utterance is shown in FIG. 18.

Figure 18:
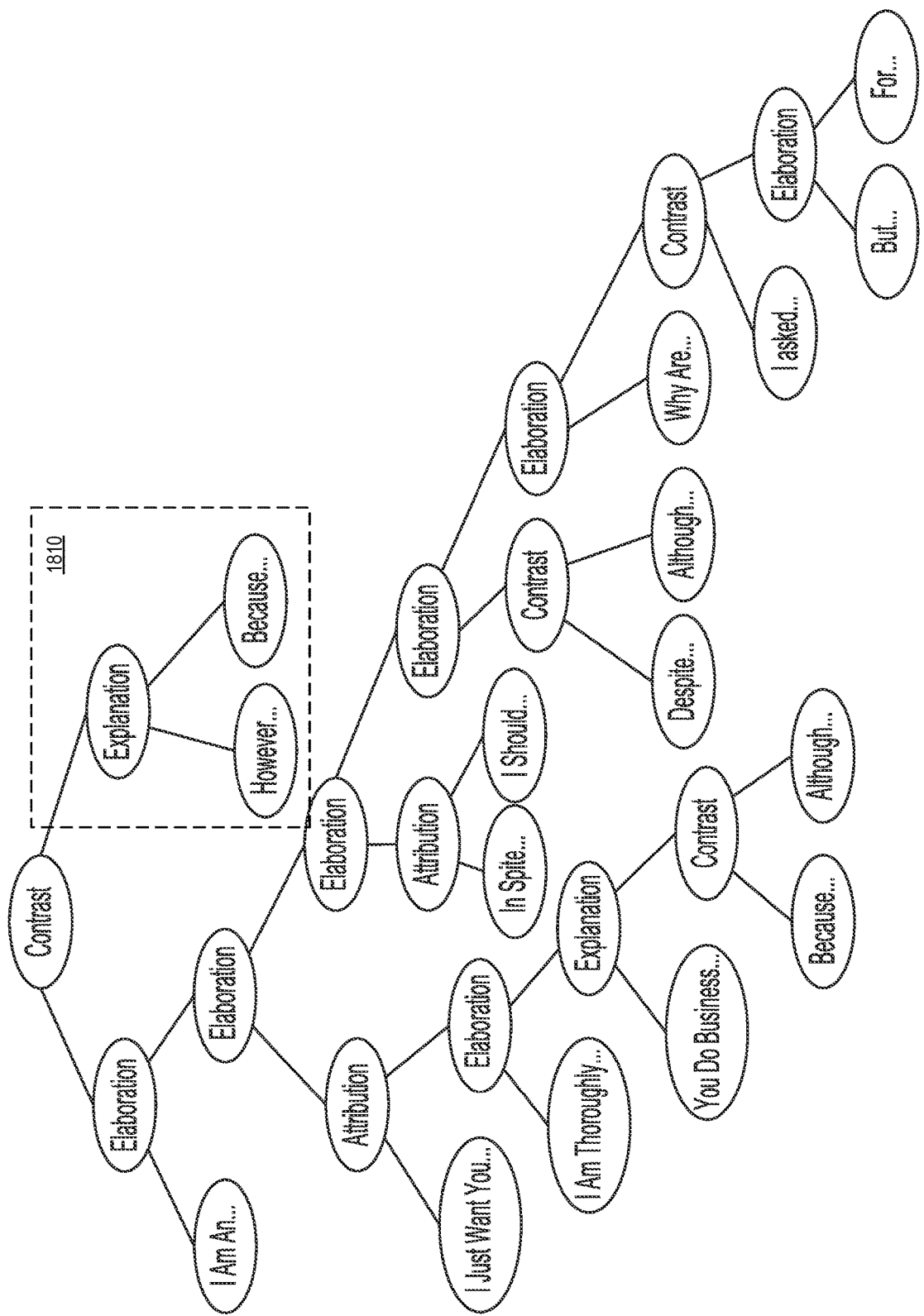
FIG. 18 illustrates a discourse tree for an utterance in accordance with an aspect.

FIG. 18 illustrates a discourse tree for an utterance in accordance with an aspect. FIG. 18 depicts discourse tree 1800, which includes various rhetorical relations and terminal nodes representing elementary discourse units (EDUs). A text-based discourse tree, which can illustrate more information relative to a graphic representation of a discourse tree, is shown below:

```
contrast (LeftToRight)
   elaboration (LeftToRight)
      TEXT:'I am an American expat living in the Republic of Panama .
      elaboration (LeftToRight)
         attribution (RightToLeft)
            TEXT:I just want you to know
            elaboration (LeftToRight)
               TEXT:that I am thoroughly disgusted with the way
               explanation (LeftToRight)
                  TEXT:you do business ,
                  contrast (LeftToRight)
                     TEXT:because you charged me an overdraft fee ,
                     TEXT:although I have Overdraft Protection .
```

```
        elaboration (LeftToRight)
            attribution (RightToLeft)
                TEXT:In spite of that Your customer Non-Service wrote to tell me
                TEXT:I should watch my balances !
            elaboration (LeftToRight)
                contrast (LeftToRight)
                    TEXT:Despite of that you charged me several times for late fees on Sunday
due dated bills,
                    TEXT:although they have paid on Monday !
                elaboration (LeftToRight)
                    TEXT:Why are you now charging a Foreign Transaction Fee of 3% ?
                    contrast (RightToLeft)
                        TEXT:I asked about this
                        elaboration (LeftToRight)
                            TEXT:but the form letter told me about fees
                            TEXT:for withdrawing from ATMs .
    explanation (LeftToRight)
TEXT:However I have never in my life used an ATM,
TEXT:because I do not want to pay to withdraw my own money !
```

Note that the user uses texts with heavy argumentation. The user also tries to amplify her point with strong negative sentiment (shown with underline), for instance "TEXT: that I am thoroughly disgusted with the way" and "In spite of that Your customer Non-Service wrote to tell me." The user relies on rhetorical relations of Attribution, Explanation and multiple Contrasts to bring her point across: fees should not have been charged.

At block 1703, process 1700 involves constructing, from the discourse tree, a first communicative discourse tree. To produce a more complete representation of an argument structure of a text, discourse trees are extended as communicative discourse trees. Constructing a communicative discourse tree is shown in more detail with respect to FIG. 15. At block 1703, therefore, process 1700 can involve substantially similar operations to process 1500. For instance, autonomous agent 114 matches each fragment that has a verb in the discourse tree with a predetermined verb signature. FIG. 18, as discussed, shows a discourse tree. The first communicative discourse tree, not shown, is a discourse tree annotated with communicative actions. CDTs include communicative actions, which include logical predicates that express the agents involved in the corresponding acts and their subjects. Note that while FIG. 18 does not show communicative actions (e.g., as provided in a communicative discourse tree), FIG. 18 could be annotated as such.

At block 1704, process 1700 involves translating the first communicative discourse tree into a first logical formula. As discussed further, translating a communicative discourse tree into a logical formula can involve identifying one or more specific rhetorical relations or patterns of rhetorical relations within the corresponding communicative discourse tree. In some cases, only one rhetorical relation and associated elementary discourse units (e.g., nucleus, satellite) are identified. In other cases, more complex patterns of rhetorical relations or elementary discourse units of the communicative discourse tree are matched. In some cases, such matching can involve a template that maps to a corresponding logical formula.

In an example, translating each communicative discourse tree includes identifying, from the respective communicative discourse tree, a rhetorical relation that corresponds to a nucleus elementary discourse unit and a satellite elementary discourse unit. Referring again to FIG. 18, discourse tree 1800 includes a sub-tree 1810. Sub-tree 1810 represents a rhetorical relation "elaboration" with two EDUs. A first EDU is the nucleus "However I have never in my life used an ATM." A second EDU is the satellite "because I do not want to pay to withdraw my own money!"

Continuing the example, the translating includes constructing a logical formula from the identified rhetorical relation. The logical formula has a reason and a conclusion. The nucleus elementary discourse unit is mapped to the reason and the satellite elementary discourse unit to the conclusion. Block 1704 is discussed with respect to FIG. 19.

Figure 19:
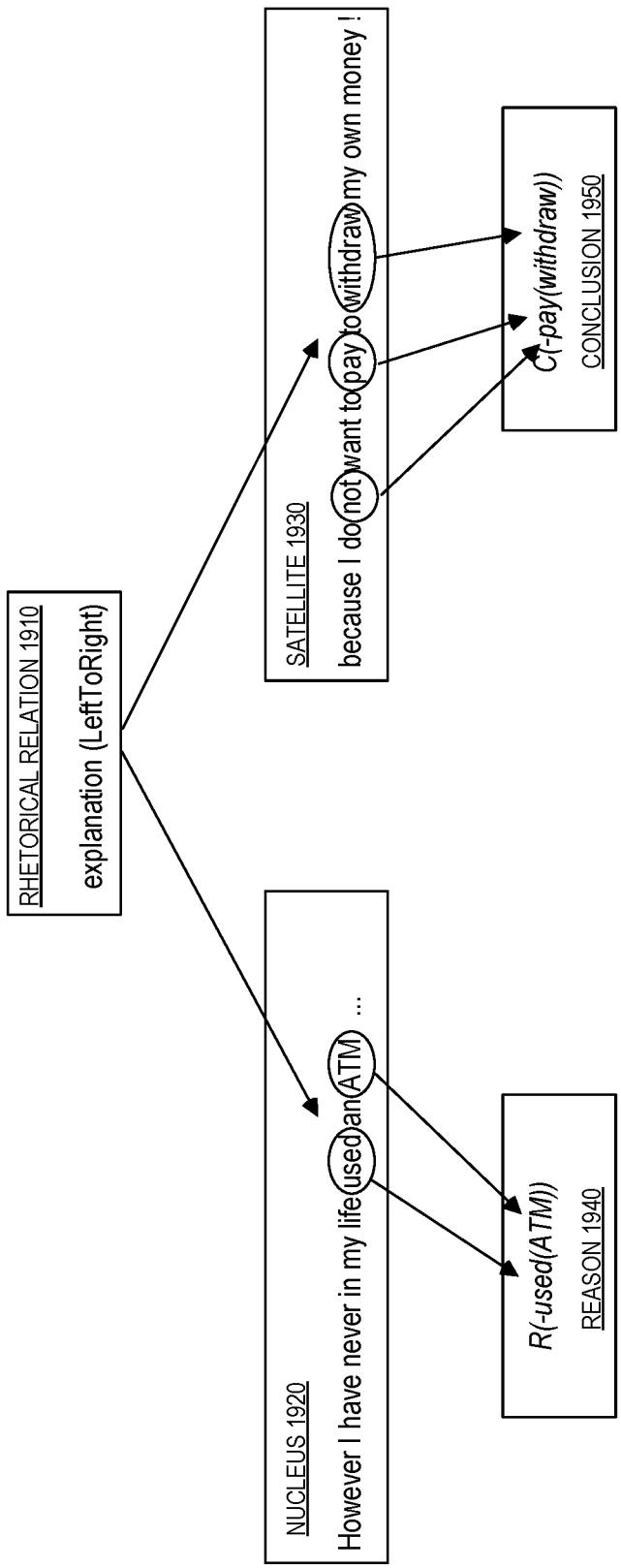
FIG. 19 illustrates an exemplary derivation of logical formulae from discourse trees for an utterance in accordance with an aspect.

FIG. 19 illustrates an exemplary derivation of logical formulae from discourse trees for an utterance in accordance with an aspect. FIG. 19 includes rhetorical relation 1910, nucleus 1920, satellite 1930, reason 1940, and conclusion 1950. Rhetorical relation 1910 is of type explanation. But in an aspect, autonomous agent 114 identifies elementary discourse units that are associated with a rhetorical relation that is of type cause, explanation, condition, or reason. The presence of one or more of these rhetorical relations inform the contents of the reason and the condition of the generated logical formula. [0214] In some cases, a nucleus EDU is mapped to a reason of the logical formula and a satellite EDU to a conclusion of the logical formula. This approach can be appropriate when the EDU has a single atom or in the presence of specific rhetorical relations other than elaboration or joint.

More specifically, autonomous agent 114 identifies a first logical atom from nucleus 1920. As can be seen, identifying a logical atom can include identifying an entity, an action associated with the entity, and a condition associated with the entity. An example of a first logical atom is:

-used(ATM)

For instance, an entity is the "ATM" and the condition is expressed by the verb "used," which occurs under the condition yes or no, e.g., either used or not used. Autonomous agent 114 identifies a second logical atom from satellite 1930. An example of a second logical atom is:

-pay(withdraw)

Autonomous agent 114 substitutes, in the logical formula, the first logical atom for the reason and the second logical atom for the conclusion:

R(-used(ATM)):C(-pay(withdraw))

In another aspect, autonomous agent 114 identifies one or more templates of rhetorical relations. Several examples of such templates are shown in in Table 1. Examples of identifying these patterns are shown further with respect to FIG. 21 (with respect to a candidate answer).

In yet another aspect, autonomous agent 114 can use one or more machine learning models to predict whether a particular elementary discourse unit contains logical atoms that map to a reason or a conclusion. For instance, a machine learning model can be trained with training data and corresponding tags indicating "reason" or "conclusion." The trained model can then predict whether a given EDU contains logical atoms for the "reason" or the "conclusion." Such an approach has benefits including removing a need to formalize rules for different scenarios (e.g., different rhetorical relations or groups of rhetorical relations). Examples of suitable machine learning models are support vector machines and tree kernel learning models.

At block 1705, process 1700 involves identifying topic keywords from the user utterance. To assist with obtaining suitable text from which to obtain a candidate answer, one or more topic keywords are identified from the user utterance or related text (e.g., a previous user utterance). Examples of topic keywords include nouns or entities.

Continuing the example, autonomous agent 114 identifies keywords overdraft, fee, foreign transaction, and ATM from the utterance.

At block 1706, process 1700 involves providing the topic keywords to a search engine. The topic keywords identified at block 1705 are provided to a search engine or other information source that can be queried.

The above text can be returned from the search engine as one or more discrete search results. Therefore, in some cases, autonomous agent 114 obtains the top n search results and uses one or more of the results. In other cases, autonomous agent 114 may obtain a larger block of text from which multiple candidate answers can be identified and separately processed, for instance via blocks 1708-1711.

An answer must address a problem raised in a question in a comprehensive, exhaustive manner. An answer cannot just agree to please the user, be a submission to her demand. Instead, a good answer denies a user demand and instead proposes a solution explained to be beneficial for both parties. To do that, one or another premise in user demand needs to be defeated. The candidate answers provide text from which such defeating answers may originate.

At block 1708, process 1700 involves generating, from the candidate answer, a second discourse tree. At block 1708, process 1700 can involve substantially similar operations as performed at block 1702.

Figure 20:
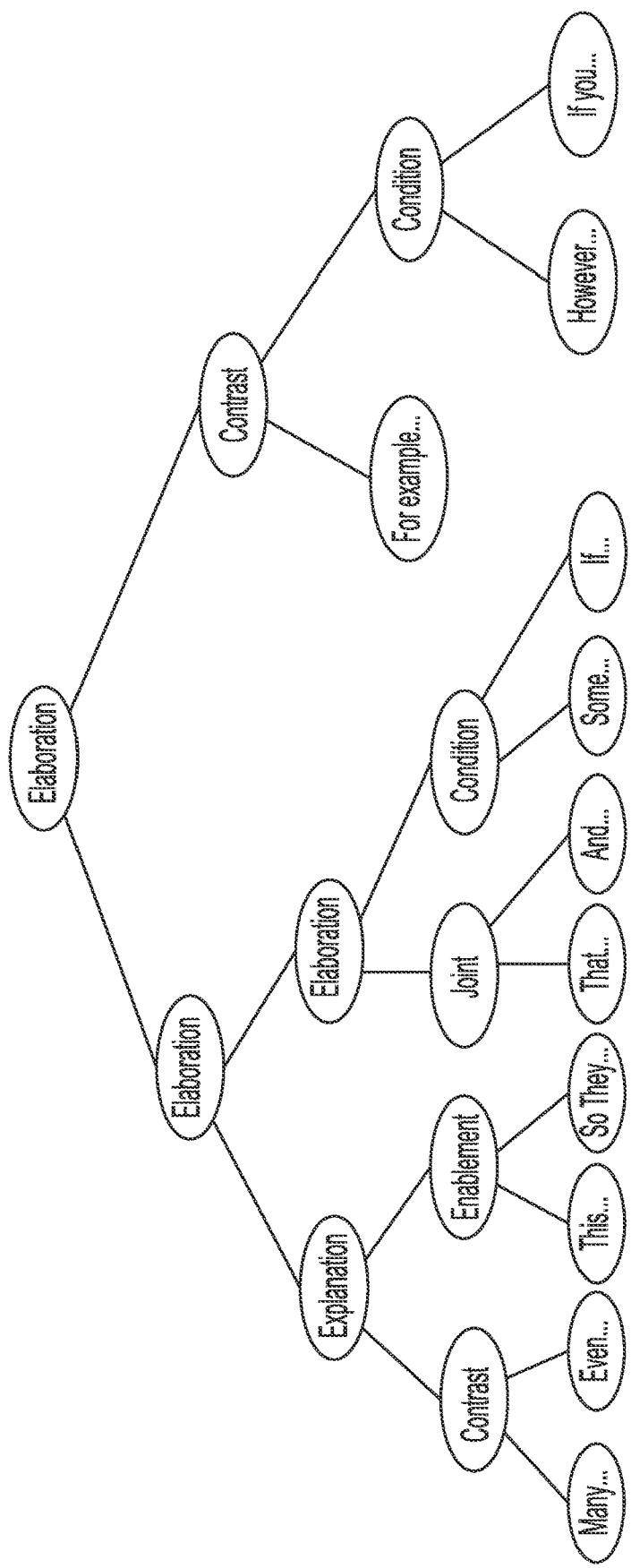
FIG. 20 illustrates a discourse tree for a text representing a candidate defeating reply in accordance with an aspect.

FIG. 20 illustrates a discourse tree for a text representing a candidate defeating reply in accordance with an aspect. Discourse tree 2000 represents text from all of the candidate answers obtained above. A more detailed text representation of discourse tree is below:

```
elaboration (LeftToRight)
    elaboration (LeftToRight)
        explanation (LeftToRight)
            contrast (LeftToRight)
                TEXT:Many banks still charge foreign transaction fees for withdrawing cash at
foreign ATMs ,
                TEXT:even if foreign credit card purchase transactions can occur fee-free .
            enablement (LeftToRight)
                TEXT:This is because banks have to convert your money spent into U.S. dollars
                TEXT:so they can charge your account .
        elaboration (LeftToRight)
            joint
                TEXT:That conversion costs money ,
                TEXT:and therefore , some card-issuing banks pass that cost along to consumers in
the form of foreign transaction fees .
        condition (LeftToRight)
            TEXT:Some banks waive certain fees
            TEXT:if you withdraw money from partner bank ATMs .
    contrast (RightToLeft)
        TEXT:For example , Bank of America generally charges 3% fee to withdraw cash from a
foreign ATM .
        condition
            TEXT:However ,
            TEXT:if you use an ATM at one of the company's GA Partners, then the $5 fee is
waived
```

At block 1707, process 1700 involves obtaining, from the search engine, a candidate answer that includes fragments of text. The search engine can obtain one or more candidate answers, as shown below:

Many banks still charge foreign transaction fees for withdrawing cash at foreign ATMs, even if foreign credit card purchase transactions can occur fee-free.

Banks have to convert your money spent into U.S. dollars so they can charge your account.

That conversion costs money, and some card-issuing banks pass that cost along to consumers in the form of foreign transaction fees.

Some banks waive certain fees if you withdraw money from partner bank ATMs.

For example, Bank of America generally charges a 3 percent fee to withdraw cash from a foreign ATM.

However, if you use an ATM at one of the company's Global Alliance Partners, the $5 fee is waived.

Returning to FIG. 17, at block 1709, process 1700 involves constructing, from the second discourse tree, a second communicative discourse tree. At block 1709, process 1700 can involve substantially similar operations as performed at block 1703.

At block 1710, process 1700 involves translating the second communicative discourse tree into a second logical formula. As discussed with respect to block 1710 and the first logical formula, at block 1710, the translating can involve identifying a nucleus EDU and a satellite EDU or can involve matching more complex templates of rhetorical relations and EDUs.

Figure 21:
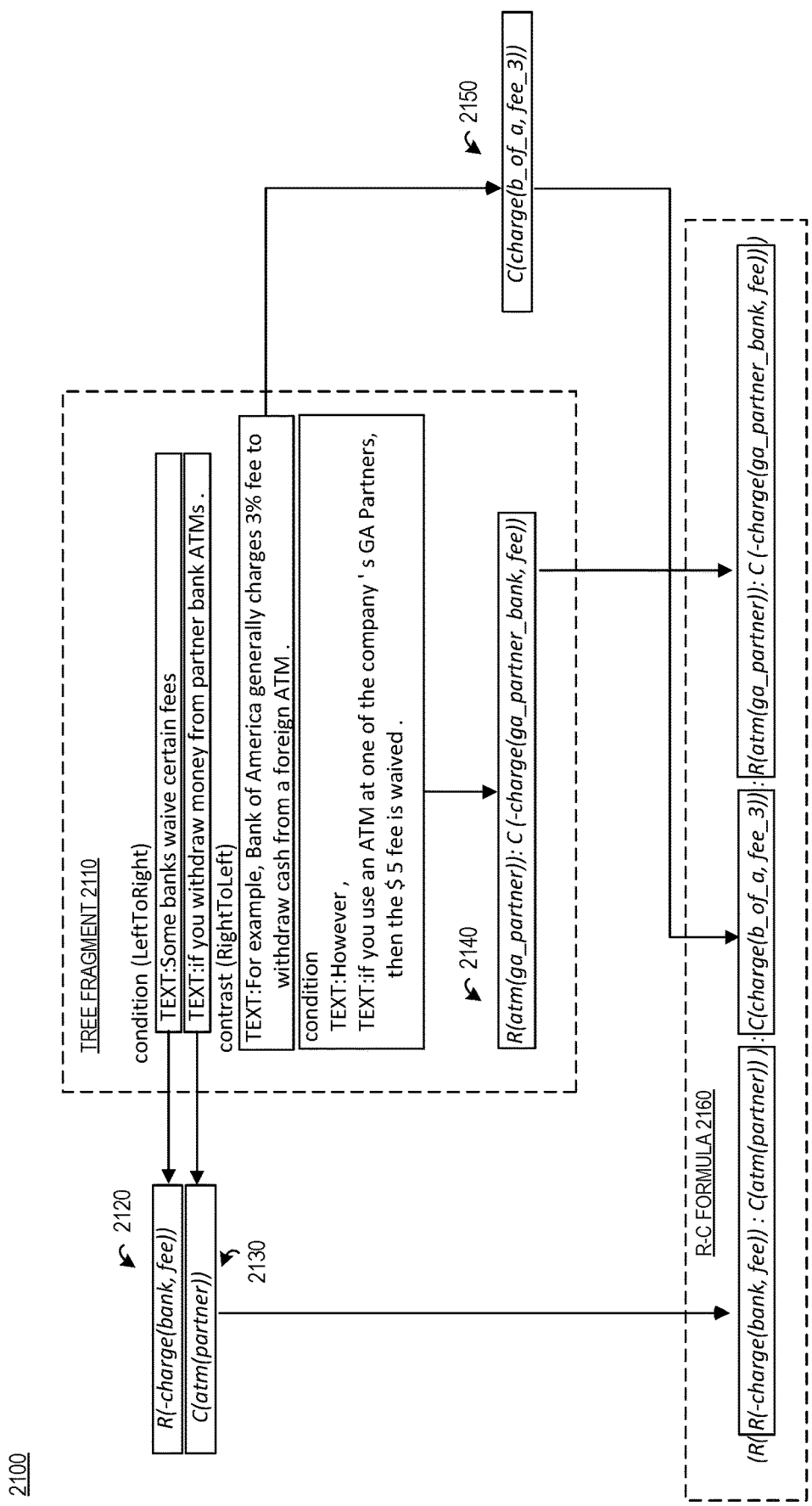
FIG. 21 illustrates an exemplary derivation of logical formulae from discourse trees for a defeating reply in accordance with an aspect.

FIG. 21 illustrates an exemplary derivation of logical formulae from discourse trees for a defeating reply in accordance with an aspect. FIG. 21 depicts tree fragment 2100, which is extracted from discourse tree 2000. Autonomous agent 2100 identifies a pattern of condition, contrast, and (again) condition, as presented below:

```
condition (LeftToRight)
    TEXT:Some banks waive certain fees
    TEXT:if you withdraw money from partner bank ATMs .
contrast (RightToLeft)
    TEXT:For example, Bank of America generally charges 3% fee to withdraw cash
from a foreign ATM .
    condition
        TEXT:However ,
        TEXT:if you use an ATM at one of the company's GA Partners , then the $ 5 fee
is waived .
```

Continuing the example, autonomous agent 114 identifies logical atoms 2120, 2130, 2140 and a from tree fragment 2110. From logical atoms 2120, 2130, 2140 and 2150, autonomous agent 114 identifies R-C formula 2160.

(R(R(-charge(bank, fee):C(atm(partner))):C(charge (b_of_a, fee_3)):(R(atm(ga_partner): C(-charge (ga_partner_bank, fee))

Some additional examples of translating are presented below. Consider the text:

```
contrast (LeftToRight)
    TEXT:Many banks still charge foreign transaction fees for withdrawing
cash at foreign ATMs ,
    TEXT:even if foreign credit card purchase transactions can occur
fee-free .
```

Using nucleus-satellite, the following logical formula is derived.

R(transaction(purchase, foreign, free)):C(charge(bank, foreign-transaction-fees) & withdraw(cash, foreign (atm)))

Consider the following example:

```
TEXT:This is because banks have to convert your money spent into
U.S. dollars
    TEXT:so they can charge your account .
    elaboration (LeftToRight)
        joint
            TEXT:That conversion costs money ,
            TEXT:and therefore, some card-issuing banks pass that cost along
to consumers in the form of foreign transaction fees .
```

The following logical formula is derived:

(R(R(convert(bank, money):C(charge(bank, account)):C (cost(conversion, money))):C(pass(bank, cost, consumers) & card-issuing(bank) & form(cost, foreign-transaction-fee))

The following formula can also be derived if the user actually withdraws as the withdrawal from the partner is free:

R(withdraw):C(withdrawal(from partner)

In another example, a logical formula is derived from the nucleus and satellite of "Some banks waive certain fees if you withdraw money from partner bank ATMs."

R(-pay(withdraw from partner)):C(-pay(withdraw))

Returning to FIG. 17, at block 1711, process 1700 involves determining that the first logical formula is a negation of the second logical formula. Identifying a negation can include, iteratively, for a predefined number of iterations, performing a set of operations. The operations include creating a theorem by applying a set of argumentation rules to a set of axioms (truths) and the second logical formula. Examples of the argumentation rules are discussed with respect to "Reasoning with Arguments Extracted from Text" herein. The theorem is compared to the first logical formula. If the theorem is a negation of the first logical formula, then the first logical formula is identified as a negation of the second logical formula.

One or more of the logical formulas derived above at block 1710 can be used to negate the following formula, discussed at block 1704, the user states that he does not use an ATM because he does not want to pay to withdraw money:

R(-used(ATM)):C(-pay(withdraw))

But this is negated by the above formula derived from the text "Some banks waive certain fees if you withdraw money from partner bank ATMs."

R(-pay(withdraw from partner)):C(-pay(withdraw))

In some cases, one or more of the first logical formula (e.g., derived from the utterance) or the second logical formula (e.g., derived from the candidate answer) also need to be reduced to a minimal form, for example using known axioms.

At block 1712, process 1700 involves providing the candidate answer to a user device responsive to the determining. A reply includes the candidate answer, which is shown to negate one or more of the claims raised in the utterance. In some cases, multiple answers are generated, each rebutting one or more additional claims raised in the utterance.

Continuing the example, autonomous agent 114 outputs the following text: "Some banks waive certain fees if you withdraw money from partner bank ATMs. For example, Bank of America generally charges 3 percent fee to withdraw cash from a foreign ATM. However, if you use an ATM at one of the company's Global Alliance Partners, the $5 fee is waived."

As can be seen, the defeating reply attempts to mimic the discourse of the user claims to defeat them. The reply mentions that banks have to charge foreign transaction fees, but they can be avoided under certain condition (using certain ATMs).

Representing Semantic Expressions of Interest as R-C Formulas

As discussed, expressions of interest (e.g., in a particular domain) can be represented as patterns of elementary discourse units and/or rhetorical relations. These rhetorical patterns can later be matched in utterances or candidate answers. For instance, a disagreement with a problem described by the phrase 'charging a Foreign Transaction Fee' is addressed by the response phrase 'still charge foreign transaction fees'. For the user, this phrase occurs in the EDU corresponding to Elaboration (request to answer a Why question) such that a Contrast relation follows, and for the response attempt to defeat, it occurs in the nucleus of Contrast relation.

Several exemplary patterns are discussed below in Table 1. To build the patterns, a semantic representation for the expressions of interest (e.g., related to banking charges) is constructed. Discourse trees are built and the semantic representation is linked to elementary discourse units. The determined structure of the discourse tree then forms reason-conclusion representations in logic.

TABLE 1

Discourse trees for selected examples

| Type of reasoning | Text descriptions with atoms | Reason-Conclusion (R-C) formula |
|---|---|---|
| My credit card is operational o(c). It is not blocked ¬b(c) | | R (¬b(c)):C(o(c)) |
| My credit card has been compromised m(c). It is blocked | | R(b(c)):C(m(c)) |
| Credit card is operational. Thus, it is not possible to conclude that a charge can be declined (d(c)) | | R(o(c)):–C(d(c)) |
| That debit card can be used u(c) because it is operational, is a reason to conclude that the balance is positive (p(b)) | cause<br>explanation (LeftToRight)<br>TEXT: That debit card can be used,<br>TEXT: because it is operational,<br>cause (LeftToRight)<br>TEXT: is a reason<br>attribution (RightToLeft)<br>TEXT: to conclude<br>TEXT: that the balance is positive | R(R(u(c)):C(o(c))):C(p(b)) |
| That card is not declined because it has a positive balance. It is a reason to conclude that it has not been compromised (m(c)). | | R(R(¬d(c)):C(p(b))):C(¬m(c)) |
| Card is operational because its balance is positive, so we cannot conclude that it was blocked | conclusion (LeftToRight)<br>cause (LeftToRight)<br>TEXT: Card is operational<br>TEXT: because its balance is positive,<br>attribution (RightToLeft)<br>TEXT: so we cannot conclude<br>TEXT: that it was blocked | R(R(p(b)):C(o(c))):–C(b(c)) |
| The balance on the card is negative. Thus the charge or use attempt will lead to non-sufficient fund fee (nsf(c)) | elaboration (LeftToRight)<br>cause (LeftToRight)<br>TEXT: The balance on the card is negative<br>cause(LeftToRight)<br>TEXT: Thus the charge/use attempt will lead to<br>TEXT: non-sufficient fund fee | R(¬b(c)):C(u(c):C(nsf(c))) |
| The fact that a card has been declined in the past is a reason to conclude that having a positive balance is not a sufficient reason for a credit card to always be operational | reason(LeftToRight)<br>elaboration (LeftToRight)<br>TEXT: The fact<br>TEXT: that a card has been declined in the past is a reason<br>conclusion(RightToLeft)<br>TEXT: to conclude<br>cause(LeftToRight)<br>TEXT: that having a positive balance is not a sufficient reason<br>TEXT: for a credit card to always be operational | R(d(c)):C(-R(p(b)):C(o(c))) |
| The fact that all credit cards of team members are operational is a reason for not concluding that a decline charge of a particular high cost transaction h(c) is a reason for team credit cards to be compromised | elaboration (LeftToRight)<br>TEXT: The fact<br>reason(LeftToRight)<br>TEXT: that all credit cards of team members are operational is a reason<br>conclusion(RightToLeft)<br>TEXT: for not concluding<br>cause(LeftToRight)<br>TEXT: that a decline charge of a particular high cost transaction is a reason for team credit cards<br>TEXT: to be compromised | R(o(c)):–C(R(h(c)):C(m(c))) |

TABLE 1-continued

Discourse trees for selected examples

| Type of reasoning | Text descriptions with atoms | Reason-Conclusion (R-C) formula |
|---|---|---|
| Bad credit history (ch(b)) leads to a decline of a credit card application (d(a(c))). Thus once a user is unable to use credit card (u(c)) it is hard to get a loan (l(u)) | cause(LeftToRight) cause(LeftToRight) TEXT: Bad credit history TEXT: leads to a decline of a credit card application. cause (LeftToRight) TEXT: Thus once a user is unable to use credit card TEXT: it is hard to get a loan, | R(R(ch(b)):C(d(a(c)))): C(R(u(c)):C(l(u))) |
| Good credit history (ch(g)) usually tells us that a credit card application is not declined (d(a(c))). However, we cannot imply that successful credit card application leads to a loan approval (other factors play the role as well) | explanation (RightToLeft) cause (RightToLeft) TEXT: Good credit history usually tells us TEXT: that a credit card application is not declined. cause TEXT: However, we cannot imply that successful credit card application TEXT: leads to a loan approval. | R(R(ch(g)):C(d(a(c)))): −C(R(d(a(c))):C(l(u))) |

Representing Nested Arguments by R-C Framework

As discussed with respect to process 1700, logical formulas are derived from communicative discourse trees. A second logical formula, representing logic from a candidate answer, is determined to negate a first logical formula representing logic expressed in an utterance.

To facilitate this determination, an argument representation algorithm can be defined. The formalism is built upon a propositional language L with the connectives ¬, $\vee$, $\circ$, →, ↔. There are also two operators R(.) and C(.) and an additional negation −. Thus, two negation operators are needed: ¬ for denying propositional formulas (¬x denotes that x is false), and − for denying R(.) and C(.).

An argument is a formula of the form R(y): (−)C(x). An argument is a reason for concluding a claim. It has two main parts: premises (the reason) and a conclusion. The functions R and C respectively play the roles of giving reason and concluding. Indeed, an argument is interpreted as follows: its conclusion holds because it follows, according to a given notion, from the premises. The notion refers to the nature of the link between them (e.g., the premises imply the conclusion), formally identified by the colon in the definition. However, the contents may be true while the functions do not hold and vice versa. The intuitive reading is as follows:

R(y):C(x) means that "y is a reason for concluding x"
R(y):−C(x) means that "y is a reason for not concluding x"

Handling nested arguments are important for finding a defeating answer since it is insufficient to handle only object-level or only meta-level layers of argumentation. It is central to handling texts and dialogues: a support for nested arguments and rejections has to be provided. To illustrate some of the expressive richness of our approach, Table 2 is presented with various forms of arguments and rejections allowed by our definitions (x, y, z, t are propositional formulas to simplify matters). The table is not exhaustive, but specifies a representation of applicable arguments (and their rejections). If an argument or rejection occurs in a text or dialogue, then we want it to be mined, and we want to be able to represent it in our language. A list of arguments below shows that all the forms can be used as a target for natural language. It indicates how to use our language, rather than suggesting that there is a canonical translation of text in to the formal target language. Translating a natural language sentence into R-C logic is shown in Table 2.

These examples illustrate that the inner and outer reason R as well as claim C can be potentially identified using argument mining techniques, and then by recursion, the inner reasons and claims can be identified by argument mining techniques as applied to CDTs. Thus, the nested structure appears better suited as a target language for arguments as they arise in natural language dialogues and texts.

The arguments used with respect to process 1700 concern functionality of a credit card. By default, a credit card is operational, especially if there is a positive account balance. However, there are exceptions: for whatever reason a bank may decline a transaction. Table 2 covers some of the exceptions and can be used in a domain-specific solution.

TABLE 2

Discourse representation or arguments and their rejections

| Argument | Text | Logical Formula |
|---|---|---|
| Basic arguments | My credit card is operational o(c). It is not blocked ¬b(c) | R(¬b(c)):C(o(c)) |
| | My credit card has been compromised m(c). It is blocked | R(b(c)):C(m(c)) |
| | Credit card is operational. Thus, it is not possible to conclude that a charge can be declined (d(c) | R(o(c)):−C(d(c)) |
| Single-embedding meta-arguments in reason R | That debit card can be used u(c) because it is operational, is a reason to conclude that the balance is positive (p(b)) | R(R(u(c)):C(o(c))): C(p(b)) |
| | That card is not declined because it has a positive balance is a reason to conclude that it has not been compromised (m(c)). | R(R(¬d(c)): C(p(b))):C(¬m(c)) |

TABLE 2-continued

Discourse representation or arguments and their rejections

| Argument | Text | Logical Formula |
|---|---|---|
| Single-embedding meta-arguments in conclusion C | Card is operational because its balance is positive, so we cannot conclude that it was blocked | R(R(p(b)):C(o(c))): −C(b(c)) |
| | The balance on the card is negative. Thus the charge/use attempt will lead to non-sufficient fund fee (nsf(c)) | R(¬b(c)):C(u(c): C(nsf(c))) |
| | The fact that a card has been declined in the past is a reason to conclude that having a positive balance is not a sufficient reason for a credit card to always be operational | R(d(c)):C(−R(p(b)): C(o(c))) |
| | The fact that all credit cards of team members are operational is a reason for not concluding that a decline charge of a particular high cost transaction h(c) is a reason for team credit cards to be compromised. | R(o(c)):−C(R(h(c)): C(m(c))) |
| Double embedding of meta-arguments | Bad credit history (ch(b)) leads to a decline of a credit card application (d(a(c))). Once a user is unable to use credit card (u(c)) it is hard to get a loan (l(u)) | R(R(ch(b)): C(d(a(c)))): C(R(u(c)):C(l(u))) |
| | Good credit history (ch(g)) usually tells us that a credit card application is not declined (d(a(c))). However, we cannot imply that successful credit card application leads to a loan approval (other factors play the role as well) | R(R(ch(g)): C(d(a(c)))): −C(R(d(a(c))): C(l(u))) |

Reasoning with Arguments Extracted from Text

A reasoning system can take an argument representation of a question and that of an answer and verify that the latter defeats the former. A set of arguments and their rejections can be viewed as a set of formulae which is a subject of a reasoning system application. A consequence operator ⊢ is the least closure of a set of inference rules extended with one meta-rule.

A meta-rule expresses that one can reverse any inference rule:

$$\frac{R(y): F}{-R(y): G}$$

into $$\frac{R(y): G}{-R(y): -F}$$

This inference rule reversing process occurs whenever negation occurs in front of a leftmost "R" so that, in the general case, an inference rule 1 where i, j ∈ {0, 1}. As to the regular inference rules, a starting point is:

$$\frac{R(y): C(x)}{-R(y): -C(x)}$$

$$\frac{R(y): C(x)}{R(y): -C(\neg x)}$$

Reasons are interchangeable. This rules is referred to as mutual support:

$$\frac{R(y): C(x)\ R(x): C(y)\ R(y): C(z)}{R(x): C(z)}$$

The next rule gathers different reasons for the same conclusion within a single argument:

$$\frac{R(y): C(x)\ R(z): C(x)}{R(y \vee z): C(x)}$$

Cautious monotonicity means that the reason of an argument can be expanded with any premise it justifies. Cut expresses a form of minimality of the reason of an argument.

$$\frac{R(y): C(z)\ R(y): C(x)}{R(y \wedge z): C(x)}$$

$$\frac{R(y \wedge z): C(x)\ R(y): C(z)}{R(y): C(x)}$$

The two next rules describe nesting of R(.) and C(.). Exportation shows how to simplify meta-arguments and Permutation shows that for some forms of meta-arguments, permutations of reasons are possible:

$$\frac{R(y): C(R(z): C(x))}{R(y \wedge z): C(x)}$$

$$\frac{R(y): C(R(z): C(x))}{R(z): C(R(y): C(x))}$$

When is the smallest inference relation obeying the rules above, reflexivity, monotonicity and cut hold, meaning that with the consequence relation, manipulation of arguments by the inference rules is well-founded (Tarski 1956). Indeed Let Δ be a set of (rejections of) arguments. Let α, and β be arguments.

Δα if α ∈ Δ (Reflexivity)

Δ∪{α} β if Δβ (Monotonicity)

Δβ if Δ∪{α} β and Δα (Cut)

Also, the consequence relation is paraconsistent in the sense that it is not trivialized by contradiction: not all formulae in language L follow from contradiction. A domain ontology may be needed for this reasoning component. The domain ontology can be constructed manually or mined from a corpus of documents or from the web.

Evaluation

A three-step evaluation was conducted:

1) Manual evaluation of communicative discourse tree (CDT) construction, R-C representation and reasoning;
2) Automated evaluation of overall recognition accuracy for defeating answers;
3) Assessment of how learned feature of defeating answers matches intuition of search users in terms of how they score these answers in a social search environment.

Table 3 shows results for the argumentation extraction component. Whereas CDT are built and corrected reasonably well, R-C representation accuracy is almost 10% lower since there is an ambiguity transitioning from CDT to R-C representation mapping rhetorical relation into either R or C. Adequate inference is achievable in almost 60%: further five percent are adequately represented but inadequately being reasoned about.

TABLE 3

Resultant accuracies for each step of argument representation algorithm

| | Correctly represented CDT of a question | Correctly represented CDT of a defeating reply | Correctly represented logical argument of a question | Correctly represented logical argument of a defeating reply | Sound inference matching arguments for Q and A |
|---|---|---|---|---|---|
| Customer complaints | 75.4 | 73.4 | 66.0 | 65.4 | 58.9 |
| Auto Repair | 79.2 | 78.1 | 69.9 | 71.1 | 64.2 |
| Financial Recommendation | 69.0 | 72.5 | 67.6 | 68.6 | 62.8 |
| Yahoo! Answers | 82.7 | 77.8 | 75.2 | 73.2 | 66.7 |

The results of the end-to-end evaluation for both reasoning and ML system are shown in Table 4. Hypothetical dialogues are formed from customer complaints and select the final, defeating reply by a company representative. The complaint text are split into utterances based on indirect speech indicators and communicative actions ('I said' . . . 'they replied'). The last utterance is frequently the reason complaints arise, so these company replies should have managed to bring their points across and upsetting customer at the same time. From these utterances, the real-world rhetorical and argumentative structure used by customer support representatives is learned.

One or more machine learning models can be trained to determine whether a body of text such as an answer is defeating or not. Such a model can be trained using positive (e.g., defeating) and negative (e.g., not defeating) training pairs.

To assess classifying an answer as defeating, given a question or an arbitrary utterance, complaint texts are represented as unordered sets of question/answer pairs concealing the actual sequence for testing. Each company response is classified as final or not final, assuming that the final response is defeating: the customer gave up on further communicating with the opponent company and resorted to other means to fix his problem.

Similar considerations are applied to the auto repair dataset. The final response usually either solves the problem or convinces the user that something else needs to be done and it is reasonable to leave the auto repair conversational thread. In this respect, the last utterance in an auto repair thread is also a defeating answer since a user is convinced not to continue the thread for whatever reason. In both these datasets, random classifier achieves about 33% accuracy: there are 3.3 utterance pairs for customer complaint and 2.8 utterance pairs for auto repair.

TABLE 4

Evaluation of the stand-alone and hybrid defeating answer recognition system

| | P argument | R argument | F1 argument | P ML | R ML | F1 ML | F1 hybrid |
|---|---|---|---|---|---|---|---|
| Customer complaints | 73 | 74 | 73.6 | 67 | 71 | 69.8 | 77.2 |
| Auto Repair | 80 | 78 | 79.4 | 79 | 82 | 81.0 | 84.6 |
| Yahoo! Answers | 75 | 72 | 73.5 | 77 | 75 | 76.2 | 81.5 |

One can observe that 75% of argument-based accuracy and 77% learning-based accuracy complement each other to achieve 5% higher accuracy of the hybrid system. There is a strong deviation of the performances of both components in distinct domains due to a variability of the complexity of argumentation patterns.

Defeating replies are rated highly by readers of a conversation or answer. The Yahoo! Answers dataset helps assess if defeating replies are rated higher than non-defeated, based on human assessment and based on our model trained and verified on Complaints and Car Repair datasets.

Percentages of most defeating answers from the list of user answers which have the highest rating are shown in Table 5. These percentages estimate our intuition that defeating answers are frequently wanted by users who want to solve the problem, ready to get to the final solution or appeal to the last instance.

TABLE 5

Discovering correlation between a defeating answer and the one with the highest rating.

| | As determined by logical argumentation component | As determined by ML component | As determined by the hybrid system |
|---|---|---|---|
| Business | 21.7 | 19.6 | 23.8 |
| Job-related | 12.6 | 14.0 | 15.4 |
| Travel and entertainment | 27.3 | 22.4 | 29.4 |
| Personal life | 16.8 | 21.0 | 24.5 |
| Sports | 22.4 | 23.8 | 27.3 |
| Shopping | 23.8 | 21.7 | 25.9 |

One can see that in different domains the users of Yahoo!Answers have different expectations concerning how an answer should defeat a point of a novice user who initiates a thread, being not knowledgeable. In highly opinionated travel, entertainment and shopping domains, readers accept that a point raised by an initial question is defeated. At the same time, in less opinionated domains, the answers with highest rating do not defeat the claim or opinion of a thread initiator, but instead support it and provide useful information without trying to make the thread initiator look as someone possessing limited knowledge.

Whereas chatbot algorithms in general belong to such computer science discipline as search engineering and general-purpose NLP, automated building of conclusive answers fall under the content generation area of AI. Automating answer creation, it is hard to compete with how human domains experts would do it; however, chatbots are expected to be capable of building tens of thousands of conclusive answers per a vertical domain on the fly.

In the modern society, writing and creating content is one of the most frequent human activities. An army of content creators, from students to professional writers, produces various kinds of documents for various audiences. Not all of these documents are expected to be innovative, breakthrough or extremely important. The target of the tool being proposed is assistance with routine document creation process where most information is available on the web and needs to be collected, integrated and properly referenced.

A number of content generation software systems are available in specific business domains. Most content generation software are template-based which limits their efficiency and volume of produced content. An interesting class of content generation system is based on verbalizing some numerical data. Also, content generation for computer game support turned out to be fruitful. Deep-learning-based generation of a sequence of words has a limited applicability for large-scale content production industrial systems. Researchers built a content compilation assistance system that was suitable for producing a report that can be subject to manual editing by students and researchers in various fields in science, engineering, business and law.

Previous work on content generation in general and specifically related to web content relied heavily on manually annotated information of Wikipedia categories. Articles in Wikipedia consist of sections. Researchers retrieved content from the web on articles belonging to a certain category of diseases by using the most frequent section titles as keywords to retrieve relevant web search snippets, utilizing web mining, similar to what we do for chatbot answers. The most informative excerpts were selected using a perceptron-based framework and populated into the built web article. In a recent work, researchers proposed WikiKreator where contents in the Wikipedia sections were represented by topic-distribution features using Latent Dirichlet Allocation.

To build a document from multiple sources, sentences selected and paraphrased from multiple documents must be ordered such that the resulting article is coherent. Existing summarization systems did not tackle coherence, so discourse level consideration proposed in Chap. 1 Volume 2 needs to be utilized.

The discourse tree representation used in our content compilation system is a reduction of what is called parse thicket, a combination of parse trees for sentences with discourse-level relationships between words and parts of the sentence in one graph. The straight edges of this graph are syntactic relations, and curvy arcs—discourse relations, such as anaphora, same entity, sub-entity, rhetoric relation and communicative actions. This graph includes much richer information than just a combination of parse trees for individual sentences would.

Researchers) introduced the tool that has been advertised using Google AdWords and used by thousands of users searching for "free essay writing" to compile content for a variety of domains, including natural sciences and humanities. In this section, the proposed and evaluated technique found a new application area in building answers for chatbots.

Proper recognition of rhetorical relations in a specific domain such as argumentation is associated with the task of predicting discourse connectives. The authors believe that a dialog system might assemble a long and informative answer by sampling passages extracted from different documents retrieved from various sources. In this study, on the contrary, we demonstrated how a dialog can be driven in terms of its genre to a defeating answer completing this dialogue and attempting to convince a user with authoritative answer.

Certain people behavior forms are associated with question answering activities on sites such as Yahoo! Answers. A number of studies have looked at the structure of the community and the interaction between askers and responders. Studies of user typology on the site have revealed that some user category (specialists) answer from personal knowledge, and others prefer to use external sources to construct answers. Observing a social network of Yahoo! Answer users, it turns out that it is possible to distinguish "answer people" from "discussion people" with the former found in specialist categories for factual information, such as mathematics and the latter more common in general interest categories, such as relationship and travel. They also show that answer length is a good predictor of "best answer" choice. Looking at the comments given by users on choosing best answers, one can observe that the most significant criteria) are as follows:

1) content completeness,
2) solution feasibility and
3) personal agreement/confirmation.

What we assessed in this study is the first item. There are multiple strategies people use to defeat their opponents, such as what us referred to as Straw Man approach. Sometimes it helps to misrepresent an argument so that one can more easily defeat it. Just as a straw man is easier to knock down than a real man, so a distorted version of an argument is easier to defeat than the actual argument. If an argument is over-generalized, then it is easier to find a counter-argument for it:

'My wife recently told me I should take out the trashcan. I responded, "Why do I have to do everything? If I spent my entire weekend doing housework, I would not have any time to work on my book"'

This is like a straw man fallacy because the original claim (that I should do something (i.e. take out the trash)) was taken and over-generalized and misrepresented towards the statement that I should "do everything."

We demonstrated that answers defeating users' claims can be filtered out, if available, relying on hybrid reasoning+ML approach. Here we focused on the former components and evaluated both of them, confirming that they complement each other.

Relevance support for CRM have become critical to a modern workplace. Finding, documenting, and knowing things in an environment where data is dispersed, employees are always on the fly, and career paths change fast must be intuitive, simple, and seamless (Wade 2018). Finding content in a site structure requires a mental roadmap of where things live. Search may provide good results, but not direct answers; the answer is usually in the file it returns, meaning more time digesting to understand. Chatbots give users a chance to jump straight to the answer while pointing them to the source for reference, saving everyone time and bridging what is becoming a major gap in content delivery.

Researchers proposed an IR-chatbot that incorporates a concept-based knowledge model and an index-guided traversal through it to ensure the discovery of information relevant for users and coherent to their preferences. The proposed approach not only supports a search session, but also helps users to discover properties of items and sequentially refine an imprecise query.

Modeling of a few paragraphs to make it a coherent text with a high-level structure remains an open problem as most deep learning algorithms can only accurately generate word-by-word summaries. These algorithms cannot think ahead and map out a good story plot. The focus of deep learning NLP community has mainly been on teaching machines how to write a good sentence. This is a seemingly simple task that not every human can accomplish well enough every time. Researchers have recently attempted to raise the bar further and decided to experiment with hierarchical storytelling. The team sourced over third of a million human written stories from Reddit and fed that data to a neural network. The algorithm, after learning what and how others wrote, was tasked with creating a multi-stage story that would be relevant to a particular writing prompt. After applying several different approaches to teaching the network the basics of writing and helping it optimize the output, the team received over one hundred short stories drafted by AI. Although the resultant texts are coherent, they are overall meaningless. There is a lack of deep learning-based content generation demos to avoid spoiling expectations of an audience. As an example of generated paragraph, let us look at the following:

The man was an accountant. He had to be. He had to be the next president. I looked back over the top and saw that his wife was crying in the kitchen. I looked at the clock. It seemed to be coming slower, but I knew if I did it would not be long before I was in my own home. I wasn't sure. I had a hard time finding the right words to say.

Although the words are formed in a syntactically correct sequence, the text is meaningless and it is hard to see potential application for such sentence generation (Fan et al 2018).

Knowing how to compose unique responses and even quick storylines translates to better micro and macro sales conversations in the future. AI-powered chat and customer support bots would become capable of holding more effective discussions and intelligently responding to customer queries, no matter how complex they are. Additionally, new algorithms could help marketers deal with such tasks as creating product image captions and product descriptions for images; or better—producing descriptive content for the visually impaired in a matter of clicks. Creative machines can also help marketers achieve a new level of personalization, especially for conversational UIs.

With a chatbot, the CMS manager is expected to predict what users want to see and provide direct responses and direct answers. From the users standpoint, the information is not organized either (even though on the back end it is) nor does it provide organic options like search. Instead, the chatbot gives the best answer it has and also does it in a conversational way. This direct method of providing information means the user does less work for the same information gain and can perform the task over and over as necessary.

With search, the users are given the results that just recently combined everything that they have access to. Even a user who knows searching best practices on top of a system with a smart search setup including promoted ones and customer refined personalized ones, the user still has to deal with extraneous results that simply are not always relevant. From keywords that overlap (e.g., "extension" for files info or telephone numbers) to outdated information, one must sift through plenty of hits in search due to the nature of its organic results. It can lead to an overall negative impact on the overall search experience.

With chatbots, the information available is fully specified by the developers who tune the information in the bot CMS. Chatbot developers direct users to the source information they seek. A good chatbot with relevant CMS has answers to most common questions for each group or department in an organization, actually answers the question being asked (rather than solely providing a source for the answer), and links back to the source as a reference for further information. An open source content generator has been available as a part of (OpenNLP 2020) project. According to a research from Juniper, banking, healthcare, social, eCommerce and retail organizations are saving $20-25 million annually using chatbots, with a savings of $8 billion per year expected by 2022. Making content accessible and versatile is now more important than ever for CRM content producers.

Exemplary Computing Systems

Figure 22:
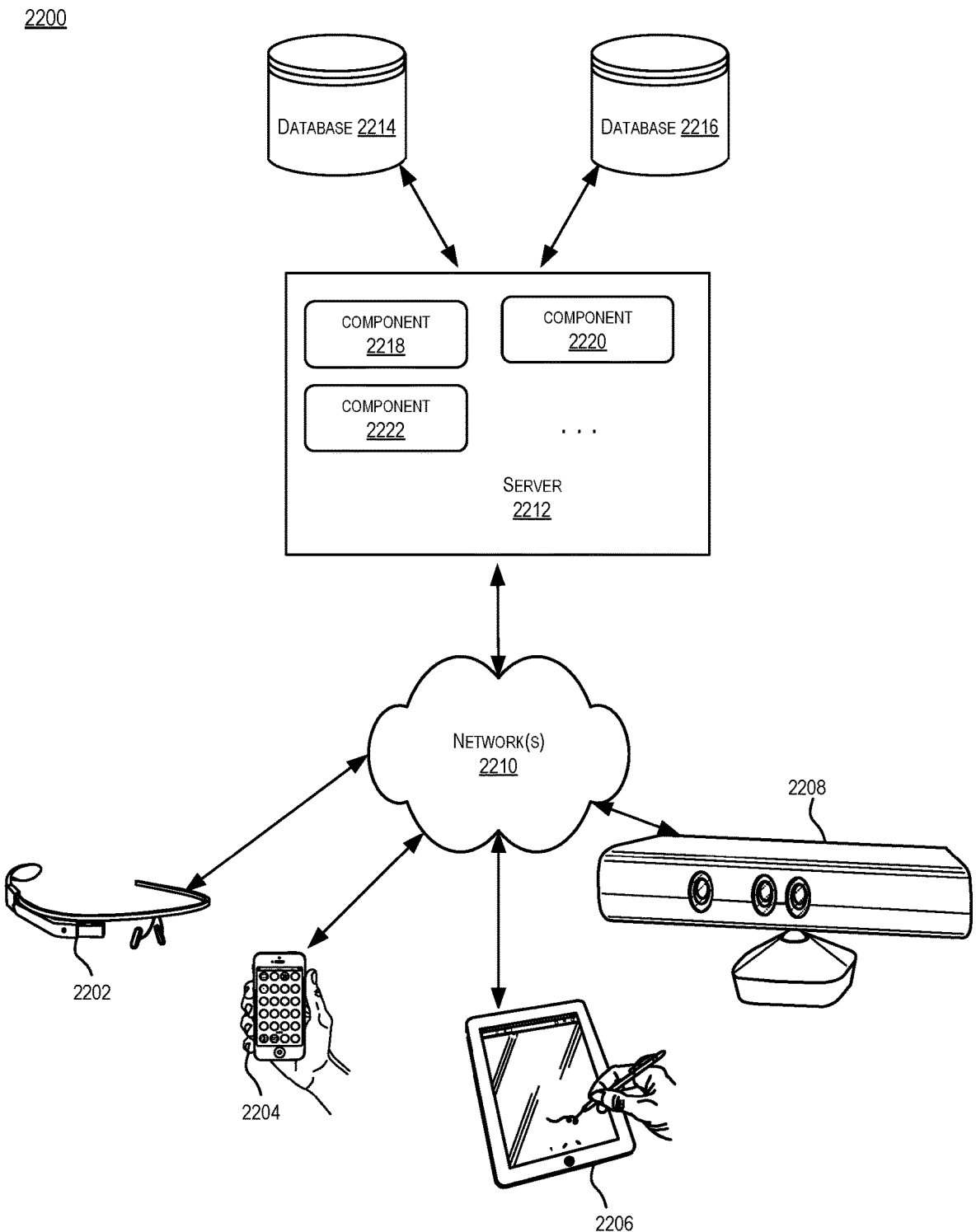
FIG. 22 depicts a simplified diagram of a distributed system for implementing one of the aspects.

FIG. 22 depicts a simplified diagram of a distributed system 2200 for implementing one of the aspects. In the illustrated aspect, distributed system 2200 includes one or more client computing devices 2202, 2204, 2206, and 2208, which are configured to execute and operate a client application such as a web browser, proprietary client (e.g., Oracle Forms), or the like over one or more network(s) 2210. Server 2212 may be communicatively coupled with remote client computing devices 2202, 2204, 2206, and 2208 via network 2210.

In various aspects, server 2212 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2202, 2204, 2206, and/or 2208. Users operating client computing devices 2202, 2204, 2206, and/or 2208 may in turn utilize one or more client applications to interact with server 2212 to utilize the services provided by these components.

In the configuration depicted in the figure, the software components 2218, 2220 and 2222 of system 2200 are shown as being implemented on server 2212. In other aspects, one or more of the components of distributed system 2200 and/or the services provided by these components may also be implemented by one or more of the client computing devices 2202, 2204, 2206, and/or 2208. Users operating the client computing devices may then utilize one or more client applications to use the services provided by these components. These components may be implemented in hardware, firmware, software, or combinations thereof. It should be appreciated that various different system configurations are possible, which may be different from distributed system 2200. The aspect shown in the figure is thus one example of a distributed system for implementing an aspect system and is not intended to be limiting.

Client computing devices 2202, 2204, 2206, and/or 2208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including, without limitation, the variety of GNU/Linux operating systems, such as for example, Google Chrome OS. Alternatively, or in addition, client computing devices 2202, 2204, 2206, and 2208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2210.

Although exemplary distributed system 2200 is shown with four client computing devices, any number of client computing devices may be supported. Other devices, such as devices with sensors, etc., may interact with server 2212.

Network(s) 2210 in distributed system 2200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2210 can be a local area network (LAN), such as one based on Ethernet, Token-Ring and/or the like. Network(s) 2210 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics (IEEE) 802.22 suite of protocols, Bluetooth®, and/or any other wireless protocol); and/or any combination of these and/or other networks.

Server 2212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2212 can include one or more virtual machines running virtual operating systems, or other computing architectures involving virtualization. One or more flexible pools of logical storage devices can be virtualized to maintain virtual storage devices for the server. Virtual networks can be controlled by server 2212 using software defined networking. In various aspects, server 2212 may be adapted to run one or more services or software applications described in the foregoing disclosure. For example, server 2212 may correspond to a server for performing processing described above according to an aspect of the present disclosure.

Server 2212 may run an operating system including any of those discussed above, as well as any commercially available server operating system. Server 2212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 2212 may include one or more applications to analyze and consolidate data feeds and/or event updates received from users of client computing devices 2202, 2204, 2206, and 2208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 2212 may also include one or more applications to display the data feeds and/or real-time events via one or more display devices of client computing devices 2202, 2204, 2206, and 2208.

Distributed system 2200 may also include one or more databases 2214 and 2216. Databases 2214 and 2216 may reside in a variety of locations. By way of example, one or more of databases 2214 and 2216 may reside on a non-transitory storage medium local to (and/or resident in) server 2212. Alternatively, databases 2214 and 2216 may be remote from server 2212 and in communication with server 2212 via a network-based or dedicated connection. In one set of aspects, databases 2214 and 2216 may reside in a storage-area network (SAN). Similarly, any necessary files for performing the functions attributed to server 2212 may be stored locally on server 2212 and/or remotely, as appropriate. In one set of aspects, databases 2214 and 2216 may include relational databases, such as databases provided by Oracle, that are adapted to store, update, and retrieve data in response to SQL-formatted commands.

Figure 23:
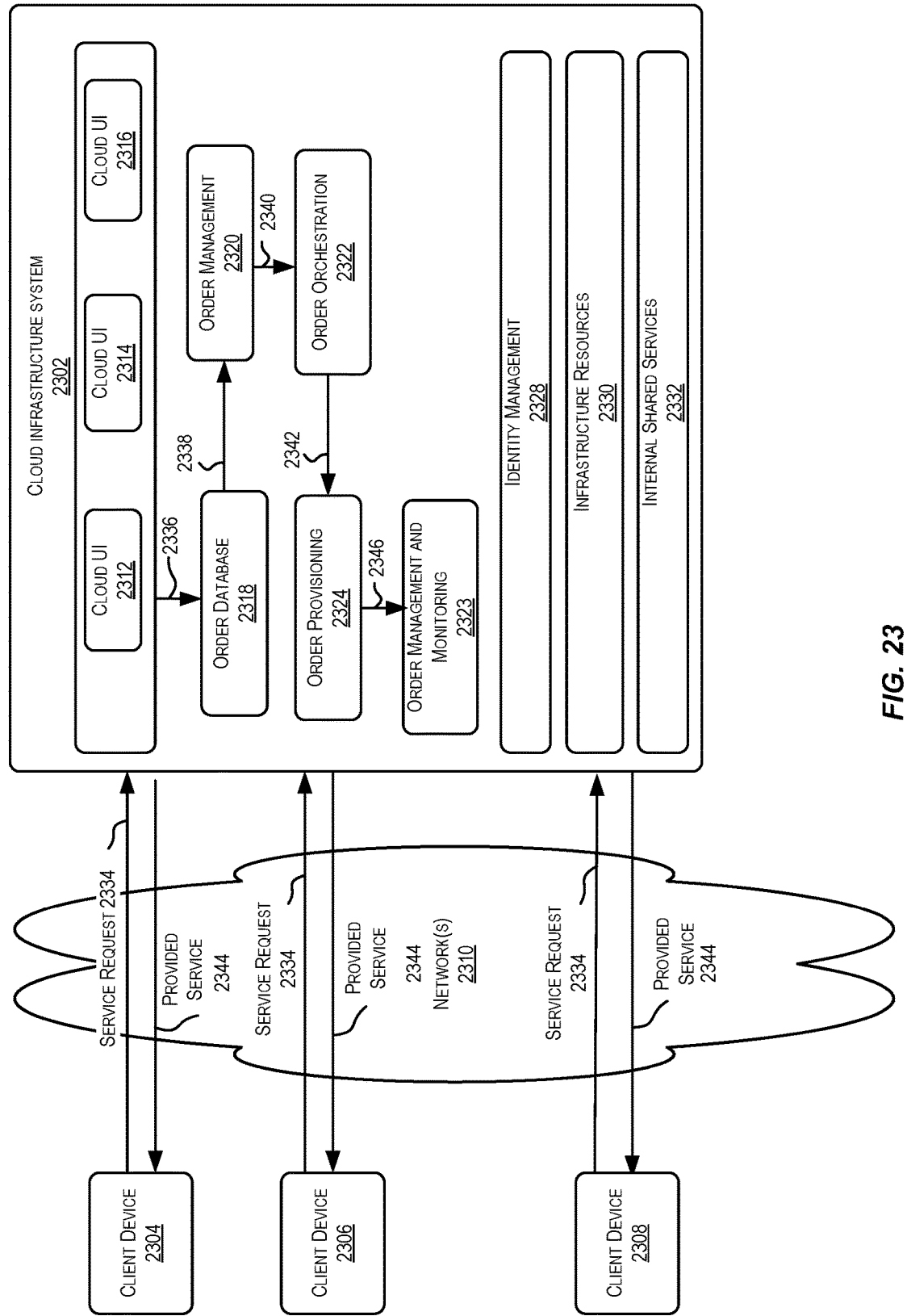
FIG. 23 is a simplified block diagram of components of a system environment by which services provided by the components of an aspect system may be offered as cloud services in accordance with an aspect.

FIG. 23 is a simplified block diagram of one or more components of a system environment 2300 by which services provided by one or more components of an aspect system may be offered as cloud services, in accordance with an aspect of the present disclosure. In the illustrated aspect, system environment 2300 includes one or more client computing devices 2304, 2306, and 2308 that may be used by users to interact with a cloud infrastructure system 2302 that provides cloud services. The client computing devices may be configured to operate a client application such as a web browser, a proprietary client application (e.g., Oracle Forms), or some other application, which may be used by a user of the client computing device to interact with cloud infrastructure system 2302 to use services provided by cloud infrastructure system 2302.

It should be appreciated that cloud infrastructure system 2302 depicted in the figure may have other components than those depicted. Further, the aspect shown in the figure is only one example of a cloud infrastructure system that may incorporate an aspect of the invention. In some other aspects, cloud infrastructure system 2302 may have more or fewer components than shown in the figure, may combine two or more components, or may have a different configuration or arrangement of components.

Client computing devices 2304, 2306, and 2308 may be devices similar to those described above for client computing devices 2202, 2204, 2206, and 2208.

Although exemplary system environment 2300 is shown with three client computing devices, any number of client computing devices may be supported. Other devices such as devices with sensors, etc. may interact with cloud infrastructure system 2302.

Network(s) 2310 may facilitate communications and exchange of data between clients computing devices 2304, 2306, and 2308 and cloud infrastructure system 2302. Each network may be any type of network familiar to those skilled in the art that can support data communications using any of a variety of commercially-available protocols, including those described above for network(s) 2210.

Cloud infrastructure system 2302 may comprise one or more computers and/or servers that may include those described above for server 2212.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2302 may be adapted to automatically provision, manage and track a customer's subscription to services offered by cloud infrastructure system 2302. Cloud infrastructure system 2302 may provide the cloud services via different deployment models. For example, services may be provided under a public cloud model in which cloud infrastructure system 2302 is owned by an organization selling cloud services (e.g., owned by Oracle) and the services are made available to the general public or different industry enterprises. As another example, services may be provided under a private cloud model in which cloud infrastructure system 2302 is operated solely for a single organization and may provide services for one or more entities within the organization. The cloud services may also be provided under a community cloud model in which cloud infrastructure system 2302 and the services provided by cloud infrastructure system 2302 are shared by several organizations in a related community. The cloud services may also be provided under a hybrid cloud model, which is a combination of two or more different models.

In some aspects, the services provided by cloud infrastructure system 2302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2302. Cloud infrastructure system 2302 then performs processing to provide the services in the customer's subscription order.

In some aspects, the services provided by cloud infrastructure system 2302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2302 may also include infrastructure resources 2330 for providing the resources used to provide various services to customers of the cloud infrastructure system. In one aspect, infrastructure resources 2330 may include pre-integrated and optimized combinations of hardware, such as servers, storage, and networking resources to execute the services provided by the PaaS platform and the SaaS platform.

In some aspects, resources in cloud infrastructure system 2302 may be shared by multiple users and dynamically re-allocated per demand. Additionally, resources may be allocated to users in different time zones. For example, cloud infrastructure system 2302 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2332 may be provided that are shared by different components or modules of cloud infrastructure system 2302 and by the services provided by cloud infrastructure system 2302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2302 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2302, and the like.

In one aspect, as depicted in the figure, cloud management functionality may be provided by one or more modules, such as an order management module 2320, an order orchestration module 2322, an order provisioning module 2324, an order management and monitoring module 2323, and an identity management module 2328. These modules may include or be provided using one or more computers and/or servers, which may be general purpose computers, specialized server computers, server farms, server clusters, or any other appropriate arrangement and/or combination.

In exemplary operation 2334, a customer using a client device, such as client computing device 2304, 2306 or 2308, may interact with cloud infrastructure system 2302 by requesting one or more services provided by cloud infrastructure system 2302 and placing an order for a subscription for one or more services offered by cloud infrastructure system 2302. In certain aspects, the customer may access a cloud User Interface (UI), cloud UI 2312, cloud UI 2314 and/or cloud UI 2316 and place a subscription order via these UIs. The order information received by cloud infrastructure system 2302 in response to the customer placing an order may include information identifying the customer and one or more services offered by the cloud infrastructure system 2302 in which the customer intends to subscribe.

After an order has been placed by the customer, the order information is received via the cloud UIs, 2323, 2314 and/or 2316.

At operation 2336, the order is stored in order database 2318. Order database 2318 can be one of several databases operated by cloud infrastructure system 2302 and operated in conjunction with other system elements.

At operation 2338, the order information is forwarded to an order management module 2320. In some instances, order management module 2320 may be configured to perform billing and accounting functions related to the order, such as verifying the order, and upon verification, booking the order.

At operation 2340, information regarding the order is communicated to an order orchestration module 2322. Order orchestration module 2322 may utilize the order information to orchestrate the provisioning of services and resources for the order placed by the customer. In some instances, order orchestration module 2322 may orchestrate the provisioning of resources to support the subscribed services using the services of order provisioning module 2324.

In certain aspects, order orchestration module 2322 enables the management of business processes associated with each order and applies business logic to determine whether an order should proceed to provisioning. At operation 2342, upon receiving an order for a new subscription, order orchestration module 2322 sends a request to order provisioning module 2324 to allocate resources and configure those resources needed to fulfill the subscription order. Order provisioning module 2324 enables the allocation of resources for the services ordered by the customer. Order provisioning module 2324 provides a level of abstraction between the cloud services provided by cloud infrastructure system 2302 and the physical implementation layer that is used to provision the resources for providing the requested services. Order orchestration module 2322 may thus be isolated from implementation details, such as whether or not services and resources are actually provisioned on the fly or pre-provisioned and only allocated/assigned upon request.

At operation 2344, once the services and resources are provisioned, a notification of the provided service may be sent to customers on client computing devices 2304, 2306 and/or 2308 by order provisioning module 2324 of cloud infrastructure system 2302.

At operation 2346, the customer's subscription order may be managed and tracked by an order management and monitoring module 2323. In some instances, order management and monitoring module 2323 may be configured to collect usage statistics for the services in the subscription order, such as the amount of storage used, the amount data transferred, the number of users, and the amount of system up time and system down time.

In certain aspects, cloud infrastructure system 2302 may include an identity management module 2328. Identity management module 2328 may be configured to provide identity services, such as access management and authorization services in cloud infrastructure system 2302. In some aspects, identity management module 2328 may control information about customers who wish to utilize the services provided by cloud infrastructure system 2302. Such information can include information that authenticates the identities of such customers and information that describes which actions those customers are authorized to perform relative to various system resources (e.g., files, directories, applications, communication ports, memory segments, etc.). Identity management module 2328 may also include the management of descriptive information about each customer and about how and by whom that descriptive information can be accessed and modified.

Figure 24:
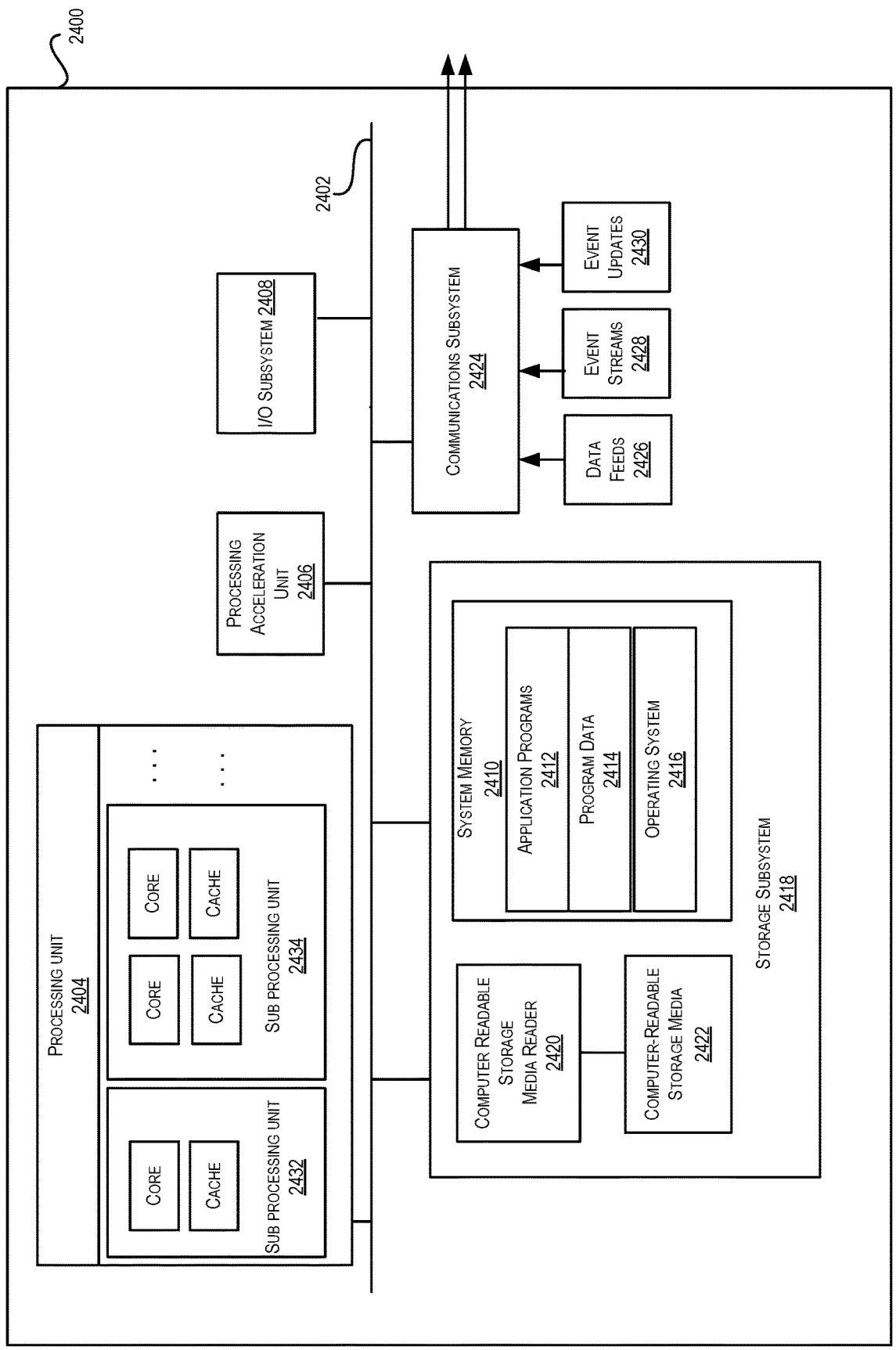
FIG. 24 illustrates an exemplary computing subsystem, in which various aspects of the present invention may be implemented.

FIG. 24 illustrates an exemplary computing subsystem 2400, in which various aspects of the present invention may be implemented. The computing subsystem 2400 may be used to implement any of the computing subsystems described above. As shown in the figure, computing subsystem 2400 includes a processing unit 2404 that communicates with a number of peripheral subsystems via a bus subsystem 2402. These peripheral subsystems may include a processing acceleration unit 2406, an I/O subsystem 2408, a storage subsystem 2418 and a communications subsystem 2424. Storage subsystem 2418 includes tangible computer-readable storage media 2422 and a system memory 2410.

Bus subsystem 2402 provides a mechanism for letting the various components and subsystems of computing subsystem 2400 communicate with each other as intended. Although bus subsystem 2402 is shown schematically as a single bus, alternative aspects of the bus subsystem may utilize multiple buses. Bus subsystem 2402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2486.1 standard.

Processing unit 2404, which can be implemented as one or more integrated circuits (e.g., a conventional microprocessor or microcontroller), controls the operation of computing subsystem 2400. One or more processors may be included in processing unit 2404. These processors may include single-core or multicore processors. In certain aspects, processing unit 2404 may be implemented as one or more independent processing units 2432 and/or 2434 with single or multicore processors included in each processing unit. In other aspects, processing unit 2404 may also be implemented as a quad-core processing unit formed by integrating two dual-core processors into a single chip.

In various aspects, processing unit 2404 can execute a variety of programs in response to program code and can maintain multiple concurrently executing programs or processes. At any given time, some or all of the program code to be executed can be resident in processor(s) 2404 and/or in storage subsystem 2418. Through suitable programming, processor(s) 2404 can provide various functionalities described above. Computing subsystem 2400 may additionally include a processing acceleration unit 2406, which can include a digital signal processor (DSP), a special-purpose processor, and/or the like.

I/O subsystem 2408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing subsystem 2400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computing subsystem 2400 may comprise a storage subsystem 2418 that comprises software elements, shown as being currently located within a system memory 2410. System memory 2410 may store program instructions that are loadable and executable on processing unit 2404, as well as data generated during the execution of these programs.

Depending on the configuration and type of computing subsystem 2400, system memory 2410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2404. In some implementations, system memory 2410 may include multiple different types of memory, such as static random access memory (SRAM) or dynamic random access memory (DRAM). In some implementations, a basic input/output system (BIOS), containing the basic routines that help to transfer information between elements within computing subsystem 2400, such as during start-up, may typically be stored in the ROM. By way of example, and not limitation, system memory 2410 also illustrates application programs 2412, which may include client applications, Web browsers, mid-tier applications, relational database management systems (RDBMS), etc., program data 2414, and an operating system 2416. By way of example, operating system 2416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2418 may also provide a tangible computer-readable storage medium for storing the basic programming and data constructs that provide the functionality of some aspects. Software (programs, code modules, instructions) that when executed by a processor, provides the functionality described above and may be stored in storage subsystem 2418. These software modules or instructions may be executed by processing unit 2404. Storage subsystem 2418 may also provide a repository for storing data used in accordance with the present invention.

Storage subsystem 2418 may also include a computer-readable storage media reader 2420 that can further be connected to computer-readable storage media 2422. Together and, optionally, in combination with system memory 2410, computer-readable storage media 2422 may comprehensively represent remote, local, fixed, and/or removable storage devices plus storage media for temporarily and/or more permanently containing, storing, transmitting, and retrieving computer-readable information.

Computer-readable storage media 2422 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2400.

By way of example, computer-readable storage media 2422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2422 may include, but is not limited to, Zip® drives, flash memory cards, universal serial bus (USB) flash drives, secure digital (SD) cards, DVD disks, digital video tape, and the like. Computer-readable storage media 2422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computing subsystem 2400.

Communications subsystem 2424 provides an interface to other computing subsystems and networks. Communications subsystem 2424 serves as an interface for receiving data from and transmitting data to other systems from computing subsystem 2400. For example, communications subsystem 2424 may enable computing subsystem 2400 to connect to one or more devices via the Internet. In some aspects, communications subsystem 2424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.22 family standards, or other mobile communication technologies, or any combination thereof), global positioning system (GPS) receiver components, and/or other components. In some aspects, communications subsystem 2424 can provide wired network connectivity (e.g., Ethernet) in addition to or instead of a wireless interface.

In some aspects, communications subsystem 2424 may also receive input communication in the form of structured and/or unstructured data feeds 2426, event streams 2428, event updates 2430, and the like on behalf of one or more users who may use computing subsystem 2400.

By way of example, communications subsystem 2424 may be configured to receive unstructured data feeds 2426 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2424 may also be configured to receive data in the form of continuous data streams, which may include event streams 2428 of real-time events and/or event updates 2430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2424 may also be configured to output the structured and/or unstructured data feeds 2426, event streams 2428, event updates 2430, and the like to one or more databases that may be in communication with one or more streaming data source computers coupled to computing subsystem 2400.

Computing subsystem 2400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computing subsystem 2400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for negating a claim within an utterance, the method comprising:
   accessing, via a user device, a user utterance comprising elementary discourse units;
   generating, from the user utterance, a first discourse tree that represents rhetorical relationships between the elementary discourse units, wherein a discourse tree comprises a plurality of nodes, each nonterminal node representing a rhetorical relationship between two of the elementary discourse units, each terminal node of the nodes of the discourse tree being associated with one of the elementary discourse units;
   translating the first discourse tree into a first logical formula that includes a reason and a conclusion; and
   identifying topic keywords from the user utterance;
   accessing, based on the topic keywords, a candidate answer;
   generating, from the candidate answer, a second discourse tree;
   translating the second discourse tree into a second logical formula;
   determining that the first logical formula is a negation of the second logical formula, the determining comprising, iteratively, for a predefined number of iterations:
      creating a theorem by applying a set of argumentation rules to a set of axioms and the second logical formula;
      comparing the theorem to the first logical formula; and
      responsive to determining that the theorem is a corresponding negation of the first logical formula, identifying the first logical formula as the negation of the second logical formula; and
   responsive to the determining, providing the candidate answer to the user device, wherein the user device presents the candidate answer as a response to the user utterance.

2. The method of claim 1, wherein translating a discourse tree into a logical formula comprises identifying, from the respective discourse tree, a corresponding rhetorical relation that (i) corresponds to a nucleus elementary discourse unit and a satellite elementary discourse unit and (ii) includes one of cause, explanation, condition, or reason.

3. The method of claim 1, wherein translating a discourse tree into a logical formula comprises mapping a nucleus elementary discourse unit to a corresponding reason and a satellite elementary discourse unit to a corresponding conclusion, the mapping comprising using a machine learning model that is trained to predict whether an elementary discourse unit contains logical atoms associated with the corresponding reason or the corresponding conclusion.

4. The method of claim 3, wherein one or more of the logical atoms are compatible with logical atomism.

5. The method of claim 1, wherein the translating a discourse tree into a logical formula comprises:
   identifying, from a nucleus elementary discourse unit of the discourse tree, a first logical atom that corresponds to text of the nucleus elementary discourse unit;
   identifying, from a satellite elementary discourse unit of the discourse tree, a second logical atom that corresponds to text of the satellite elementary discourse unit;
   substituting, in the logical formula, the first logical atom for the reason; and
   substituting, in the logical formula, the second logical atom for the conclusion.

6. The method of claim 5, wherein identifying a logical atom comprises identifying an entity, an action associated with the entity, and a condition associated with the entity.

7. The method of claim 5, wherein identifying a logical atom comprises identifying an entity, an action associated with the entity, and a condition associated with the entity.

8. A non-transitory computer-readable storage medium storing computer-executable program instructions, wherein when executed by a processing device, the program instructions cause the processing device to perform operations comprising:
   accessing, via a user device, a user utterance comprising elementary discourse units;
   generating, from the user utterance, a first discourse tree that represents rhetorical relationships between the elementary discourse units, wherein a discourse tree comprises a plurality of nodes, each nonterminal node representing a rhetorical relationship between two of the elementary discourse units, each terminal node of the nodes of the discourse tree being associated with one of the elementary discourse units;
   translating the first discourse tree into a first logical formula that includes a reason and a conclusion; and
   identifying topic keywords from the user utterance;
   accessing, based on the topic keywords, a candidate answer;
   generating, from the candidate answer, a second discourse tree;
   translating the second discourse tree into a second logical formula;
   determining that the first logical formula is a negation of the second logical formula, the determining comprising, iteratively, for a predefined number of iterations:

creating a theorem by applying a set of argumentation rules to a set of axioms and the second logical formula;

comparing the theorem to the first logical formula; and responsive to determining that the theorem is a corresponding negation of the first logical formula, identifying the first logical formula as the negation of the second logical formula; and responsive to the determining, providing the candidate answer to the user device, wherein the user device presents the candidate answer as a response to the user utterance.

9. The non-transitory computer-readable storage medium of claim 8, wherein translating a discourse tree into a logical formula comprises identifying, from the respective discourse tree, a corresponding rhetorical relation that (i) corresponds to a nucleus elementary discourse unit and a satellite elementary discourse unit and (ii) includes one of cause, explanation, condition, or reason.

10. The non-transitory computer-readable storage medium of claim 8, wherein translating a discourse tree into a logical formula comprises mapping a nucleus elementary discourse unit to a corresponding reason and a satellite elementary discourse unit to a corresponding conclusion, the mapping comprising using a machine learning model that is trained to predict whether an elementary discourse unit contains logical atoms associated with the corresponding reason or the corresponding conclusion.

11. The non-transitory computer-readable storage medium of claim 10, wherein one or more of the logical atoms are compatible with logical atomism.

12. The non-transitory computer-readable storage medium of claim 8, wherein the translating a discourse tree into a logical formula comprises:

identifying, from a nucleus elementary discourse unit of the discourse tree, a first logical atom that corresponds to text of the nucleus elementary discourse unit;

identifying, from a satellite elementary discourse unit of the discourse tree, a second logical atom that corresponds to text of the satellite elementary discourse unit;

substituting, in the logical formula, the first logical atom for the reason; and substituting, in the logical formula, the second logical atom for the conclusion.

13. The non-transitory computer-readable storage medium of claim 12, wherein identifying a logical atom comprises identifying an entity, an action associated with the entity, and a condition associated with the entity.

14. A system comprising:

a non-transitory computer-readable medium storing computer-executable program instructions; and a processing device communicatively coupled to the non-transitory computer-readable medium for executing the computer-executable program instructions, wherein executing the computer-executable program instructions configures the processing device to perform operations comprising:

accessing, via a user device, a user utterance comprising elementary discourse units;

generating, from the user utterance, a first discourse tree that represents rhetorical relationships between the elementary discourse units, wherein a discourse tree comprises a plurality of nodes, each nonterminal node representing a rhetorical relationship between two of the elementary discourse units, each terminal node of the nodes of the discourse tree being associated with one of the elementary discourse units;

translating the first discourse tree into a first logical formula that includes a reason and a conclusion; and identifying topic keywords from the user utterance;

accessing, based on the topic keywords, a candidate answer;

generating, from the candidate answer, a second discourse tree;

translating the second discourse tree into a second logical formula;

determining that the first logical formula is a negation of the second logical formula, the determining comprising, iteratively, for a predefined number of iterations:

creating a theorem by applying a set of argumentation rules to a set of axioms and the second logical formula;

comparing the theorem to the first logical formula; and responsive to determining that the theorem is a corresponding negation of the first logical formula, identifying the first logical formula as the negation of the second logical formula; and responsive to the determining, providing the candidate answer to the user device, wherein the user device presents the candidate answer as a response to the user utterance.

15. The system of claim 14, wherein translating a discourse tree into a logical formula comprises identifying, from the respective discourse tree, a corresponding rhetorical relation that ($i$) corresponds to a nucleus elementary discourse unit and a satellite elementary discourse unit and (ii) includes one of cause, explanation, condition, or reason.

16. The system of claim 14, wherein translating a discourse tree into a logical formula comprises mapping a nucleus elementary discourse unit to a corresponding reason and a satellite elementary discourse unit to a corresponding conclusion, the mapping comprising using a machine learning model that is trained to predict whether an elementary discourse unit contains logical atoms associated with the corresponding reason or the corresponding conclusion.

17. The system of claim 16, wherein one or more of the logical atoms are compatible with logical atomism.

18. The system of claim 14, wherein the translating a discourse tree into a logical formula comprises:

identifying, from a nucleus elementary discourse unit of the discourse tree, a first logical atom that corresponds to text of the nucleus elementary discourse unit;

identifying, from a satellite elementary discourse unit of the discourse tree, a second logical atom that corresponds to text of the satellite elementary discourse unit;

substituting, in the logical formula, the first logical atom for the reason; and substituting, in the logical formula, the second logical atom for the conclusion.

19. The system of claim 18, wherein identifying a logical atom comprises identifying an entity, an action associated with the entity, and a condition associated with the entity.

20. The system of claim 18, wherein identifying a logical atom comprises identifying an entity, an action associated with the entity, and a condition associated with the entity.

* * * * *

UNITED STATES PATENT AND TRADEMARK OFFICE
CERTIFICATE OF CORRECTION

Page 1 of 2

PATENT NO. : 12,361,223 B2
APPLICATION NO. : 18/456138
DATED : July 15, 2025
INVENTOR(S) : Galitsky It is certified that error appears in the above-identified patent and that said Letters Patent is hereby corrected as shown below:

On the Title Page

On page 2, Column 2, under item (56), Other Publications, Line 25, delete "at" and insert -- at: --, therefor.

On page 2, Column 2, under item (56), Other Publications, Line 27, delete "Vis ual" and insert -- Visual --, therefor.

On page 3, Column 1, under item (56), Other Publications, Line 40, delete "80" and insert -- 8C --, therefor.

On page 6, Column 1, under item (56), Other Publications, Line 32, delete "MachineLearning Techniques" and insert -- MachineLearningTechniques --, therefor.

In the Drawings

On sheet 12 of 24, in FIG. 12, Line 1, above "elaboration" insert -- 1200 --.

In the Specification

In Column 2, Line 61, delete "fragment" and insert -- fragment. --, therefor.

In Column 3, Line 67, delete "mto" and insert -- to --, therefor.

In Column 11, Line 1, delete "are.''" and insert -- are.' --, therefor.

In Column 11, Line 10, delete "Slack,®" and insert -- Slack®, --, therefor.

Signed and Sealed this
Thirtieth Day of December, 2025

John A. Squires
*Director of the United States Patent and Trademark Office*

CERTIFICATE OF CORRECTION (continued)
U.S. Pat. No. 12,361,223 B2

In Column 15, Line 32, delete "a1," and insert -- a2, --, therefor.

In Column 17, Line 23, delete "1908." and insert -- 1908, --, therefor.

In Column 17, Line 29, delete "1190," and insert -- 1200, --, therefor.

In Column 17, Line 46, delete "1190," and insert -- 1200, --, therefor.

In Column 19, Line 18, delete "sustain." and insert -- sustain). --, therefor.

In Column 21, Line 14, delete "action1," and insert -- actioni, --, therefor.

In Column 28, Line 39, after "formula." delete "[0214]".

In Column 28, Lines 39-44, delete "In some cases, a nucleus EDU is mapped to a reason of the logical formula and a satellite EDU to a conclusion of the logical formula. This approach can be appropriate when the EDU has a single atom or in the presence of specific rhetorical relations other than elaboration or joint." and insert the same on Column 28, Line 40, as a new paragraph, therefor.

In Column 28, Line 63, delete "in in" and insert -- in --, therefor.

In Column 41, Line 57, delete "Researchers)" and insert -- Researchers --, therefor.

In Column 42, Line 23, delete "criteria)" and insert -- criteria --, therefor.

In Column 45, Line 29, delete "Internet" and insert -- Internetwork --, therefor.

In Column 45, Line 38, delete "infra-red" and insert -- infrared --, therefor.

In Column 54, Line 39, delete "tion)," and insert -- tion)), --, therefor.